(12) United States Patent
Sugimoto

(10) Patent No.: US 7,702,231 B2
(45) Date of Patent: Apr. 20, 2010

(54) AUTOFOCUS CONTROL APPARATUS AND METHOD OF CONTROLLING THE SAME

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 745 days.

(21) Appl. No.: 11/471,621

(22) Filed: Jun. 21, 2006

(65) Prior Publication Data
US 2007/0064145 A1 Mar. 22, 2007

(30) Foreign Application Priority Data
Jun. 22, 2005 (JP) ............... 2005-181614
Feb. 23, 2006 (JP) ............... 2006-046123

(51) Int. Cl.
*G03B 3/10* (2006.01)
*H04N 5/232* (2006.01)
(52) U.S. Cl. ..................... 396/123; 348/345
(58) Field of Classification Search ......... 396/121–123; 348/345, 349; 382/118
See application file for complete search history.

(56) References Cited

U.S. PATENT DOCUMENTS

2003/0063212 A1* 4/2003 Watanabe et al. ........... 348/349
2005/0088538 A1* 4/2005 Nozaki et al. ............. 348/229.1
2007/0003267 A1* 1/2007 Shibutani .................. 396/123

FOREIGN PATENT DOCUMENTS

| JP | 11-146405 A | 5/1999 |
|----|-------------|--------|
| JP | 2005-117530 A | 4/2005 |
| JP | 2005-117531 A | 4/2005 |
| JP | 2006-208558 A | 8/2006 |

* cited by examiner

*Primary Examiner*—W. B. Perkey
*Assistant Examiner*—Minh Q Phan
(74) *Attorney, Agent, or Firm*—Birch, Stewart, Kolasch & Birch, LLP

(57) ABSTRACT

When an imaging mode is set, a subject is imaged, and image data representing a subject image is obtained. Continuous AF is operated such that the subject image represented by the obtained image data is focused. Ranges ahead of and behind the focusing position of an imaging lens obtained in the continuous AF are determined as a focusing range. A formal search is conducted in the determined focusing range. A focusing position is determined from a graph of focusing integrated values obtained in the formal search. The imaging lens is put at the determined focusing position.

49 Claims, 54 Drawing Sheets

*Fig. 20*

FACE DETECTION RESULT INFORMATION

| RESULTS OF FACE DETECTION | REMARKS |
|---|---|
| NUMBER OF DETECTED FACES | UP TO PREDETERMINED UPPER LIMIT |
| POSITION OF EACH FACE | CENTER COORDINATES OF EACH FACE (COORDINATE SYSTEM OF NORMALIZED IMAGE) |
| SIZE OF EACH FACE | HALF OF ONE SIDE OF RECTANGLE: DISTANCE BETWEEN CENTER AND SIDE (COORDINATE SYSTEM OF NORMALIZED IMAGE) |
| DETECTION SCORE OF EACH FACE | INDEX OF LIKENESS TO FACE |
| DIRECTION OF EACH FACE | FORWARD, RIGHTWARD, LEFTWARD, UPWARD, DOWNWARD, ETC. |
| INCLINATION OF EACH FACE | DETERMINE ROTATION ANGLE OF ELECTED TO INCLINED FACE |

LEFTWARD FACE IMAGE PORTION

FRONT FACE IMAGE PORTION

RIGHTWARD FACE IMAGE PORTION

*Fig.22A*  *Fig.22B*  *Fig.22C*  *Fig.22D*
FACE IMAGE PORTION HAVING INCLINATION OF ZERO°
FACE IMAGE PORTION HAVING INCLINATION OF 30°
FACE IMAGE PORTION HAVING INCLINATION OF 60°
FACE IMAGE PORTION HAVING INCLINATION OF 90°
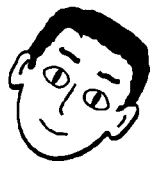

Fig. 38

| ITEM | NAME OF VARIABLE | DOWNWARD EXTENSION PROCESSING | LEFTWARD EXTENSION PROCESSING | UPWARD EXTENSION PROCESSING | RIGHTWARD EXTENSION PROCESSING |
|---|---|---|---|---|---|
| FACE INCLINATION | In-plane (DEGREE) | 0, 330, 30 | 90, 60, 120 | 180, 150, 210 | 270, 240, 300 |
| WIDTH OF ONE AREA | AFHWD | | | $Q2x-Q1x$ | |
| HEIGHT OF ONE AREA | AFVWD | | | $Q3y-Q1y$ | |
| HORIZONTAL STARTING POINT CALCULATION VARIABLE | Kx | | | INT($Q1x$/AFHWD) | |
| VERTICAL STARTING POINT CALCULATION VARIABLE | Ky | | | INT($Q3y$/AFVWD) | |
| HORIZONTAL STARTING POINT | AFHST | | | $Q1x-Kx \times$ AFHWD | |
| VERTICAL STARTING POINT | AFVST | | | $Q1y-Ky \times$ AFVWD | |
| HORIZONTAL AREA CALCULATION VARIABLE | Nx | | | INT(($w_{AF}$−AFHST)/AFHWD)+1 | |
| VERTICAL AREA CALCULATION VARIABLE | Ny | | | INT(($h_{AF}$−AFVST)/AFVWD)+1 | |
| NUMBER OF AREAS IN HORIZONTAL DIRECTION | Hnum | 1 | Nx | 1 | Nx |
| NUMBER OF AREAS IN VERTICAL DIRECTION | Vnum | Ny | 1 | Ny | 1 |
| HPF INTEGRATION AREA ARRANGEMENT | Area | Area[0][0] | Area[Nx−1][0] | Area[Hnum][Vnum] | |
| FACE AREA AF EVALUATED VALUE | Face_AFvalue | Area[0][0] | Area[Nx−1][0] | Area[0][Ny−1] | Area[0][0] |

AUTOFOCUS CONTROL APPARATUS AND METHOD OF CONTROLLING THE SAME

BACKGROUND OF THE INVENTION

1. Field of the Invention

The present invention relates to an autofocus control apparatus and a method of controlling the same.

2. Description of Background Art

A skin color area included in a subject image is detected, and the detected skin color area is taken as a focusing area (see JP-A-11-146405).

Even in a case where a skin color area is detected, however, it is difficult to accurately detect the skin color area when a subject image itself whose skin color should be detected is extremely defocused. Therefore, the skin color area cannot, in some cases, be accurately focused even as a focusing area. The same is true for a case where an object is detected from only light and dark (gradation) information without using color information. When an object is extremely defocused, it is difficult to accurately detect the object.

SUMMARY OF THE INVENTION

An object of the present invention is to relatively accurately allow focusing.

An autofocus control apparatus according to a first invention is characterized by comprising a solid-state electronic imaging device that images a subject and outputs image data representing a subject image formed by an imaging lens that is provided ahead of a light receiving surface of the solid-state electronic imaging device and is movable along its optical axis; a first control device that controls the solid-state electronic imaging device so as to image the subject in response to an imaging command and output the image data representing the subject image before formal imaging; an object area detection device that detects an object area including the whole or a part of an object in the subject image represented by the image data outputted from the solid-state electronic imaging device under the control of the first control device; and a position control device that controls the position of the imaging lens so as to move to a focusing position on the basis of data corresponding to the object area detected by the object area detection device.

The first invention also provides a method suitable for the autofocus control apparatus. That is, the method comprises the steps of imaging a subject using a solid-state electronic imaging device in response to an imaging command (setting of an imaging mode), to obtain image data representing a subject image formed by an imaging lens that is provided ahead of a light receiving surface of the solid-state electronic imaging device and is movable along its optical axis; detecting an area of an object included in the subject image represented by the image data obtained from the solid-state electronic imaging device; and controlling the position of the imaging lens so as to move to a focusing position on the basis of data corresponding to the detected object area.

According to the first invention, the subject is imaged in response to the imaging command, so that the image data representing the subject image is obtained. The object area included in the subject image represented by the image data is detected. The position of the imaging lens is controlled so as to move to the focusing position on the basis of the data corresponding to the detected area.

According to the first invention, the imaging is performed before formal imaging (imaging for recording), and the position of the imaging lens is controlled such that the object area included in the subject image obtained by the imaging is focused. A subject image that is focused on a desired object is obtained.

The autofocus control apparatus may further comprise a recording control device that records on a recording medium the image data outputted from the solid-state electronic imaging device by positioning the imaging lens using the position control device and formally imaging the subject image in response to a formal imaging command (in response to a recording command such as turn-on of a shutter release button).

The autofocus control apparatus may further comprise an AF object area determination device that determines one or a plurality of AF object areas each including the whole or a part of the object area detected by the object area detection device and being of the same or different sizes, and a weighting factor determination device that determines a weighting factor, which increases toward the object area, in the one or plurality of AF object areas determined by the AF object area determination device. In this case, the position control device will control the position of the imaging lens so as to adjust the level of data corresponding to each of the one or plurality of AF object areas in response to the weighting factor determined by the weighting factor determination device and move to the focusing position on the basis of the adjusted data.

The weighting factor determination device may be determined on the basis of at least one of the likeness to the object, the size of the object, the brightness of the object, and the position of the object.

The autofocus control apparatus may further comprise an imaging mode setting device, and a third control device that controls the solid-state electronic imaging device so as to image the subject in a predetermined period depending on the setting of the imaging mode by the imaging mode setting device and output through image data representing the subject image in a predetermined period. Although a through image representing the subject image may, in some cases, be obtained by imaging the subject before recording the subject image on the recording medium, the focusing position of the imaging lens can be determined utilizing the through image.

The autofocus control apparatus may further comprise a focusing range determination device that determines a focusing range in which the imaging lens moves under the control of the position control device on the basis of the through image data outputted from the solid-state electronic imaging device under the control of the third control device. Since the imaging lens moves within the focusing range, the position of the imaging lens can be controlled relatively quickly.

The position control device may be so adapted that the imaging lens moves within a focusing range determined on the basis of the position of the imaging lens in a case where the through image data is outputted from the solid-state electronic imaging device under the control of the third position control device.

The position control device moves the imaging lens within a predetermined focusing range.

The autofocus control apparatus may further comprise a manual focus dial that positions the imaging lens. In this case, the focusing range will be determined on the basis of the manual focus dial.

An example of the imaging lens may be a zoom lens. In this case, the focusing range may be determined on the basis of a focusing position corresponding to the position of the zoom lens.

The object area detected by the object area detection device may be detected on the basis of at least one of the likeness to the object, the size of the object, the brightness of the object, and the position of the object.

The autofocus control apparatus may further comprise a display device that displays the subject image represented by the image data outputted from the solid-state electronic imaging device, and a display control device that controls the display device such that the object area detected by the object area detection device is clearly shown on the subject image displayed on the display device.

An example of an image of the object may be an image of a face or eyes.

The object area detection device may comprise an AE control device that carries out AE control on the basis of luminance data obtained from the image data outputted from the solid-state electronic imaging device under the control of the first control device. In this case, the object area will be detected on the basis of the luminance data.

The autofocus control apparatus may further comprise an exposure amount calculation device that calculates the amount of exposure of the solid-state electronic imaging device on the basis of the data corresponding to the object area detected by the object area detection device, and a fourth control device that controls the solid-state electronic imaging device so as to control exposure such that the amount of exposure of the solid-state electronic imaging device becomes the amount of exposure calculated by the exposure amount calculation device and image the subject to output the image data representing the subject image. In this case, the position control device will control the position of the imaging lens so as to move to the focusing position on the basis of the data corresponding to the data corresponding to the object area detected by the object area detection device in the image data outputted from the solid-state electronic imaging device under the control of the fourth control device.

The autofocus control apparatus may further comprise an AF object area determination device that determines an AF object area on the basis of the object area detected by the object area detection device. In this case, the exposure amount calculation device will calculate the amount of exposure of the solid-state electronic imaging device on the basis of data corresponding to the AF object area determined by the AF object area determination device.

An example of the AF object area determination device is one that determines the AF object area such that the AF object area is within the object area.

The AF object area determination device may be one that determines the AF object area on the basis of the object area assigned a high priority in a case where a plurality of object areas are detected by the object area detection device.

An example of the object area assigned a high priority is an object area of the largest size, an object area having the strongest likeness to the object, or the object area closest to the center of the subject image.

The AF object area determination device may determine, when the plurality of object areas are detected by the object area detection device, the AF object area on the basis of the weighted average of the brightnesses of a plurality of object image portions.

The weighted average may be taken using at least one of the size of the object, the likeness to the object, and the position from the center of the subject image.

The autofocus control apparatus can further comprise an exposure amount correction device that corrects the amount of exposure calculated by the exposure amount calculation device such that the difference between the amount of exposure at the time of the formal imaging and the amount of exposure in a case where the subject is imaged before the formal imaging is within a predetermined range.

The autofocus control apparatus may further comprise an AF object area determination device that determines an AF object area on the basis of the object area detected by the object area detection device. In this case, the position control device will control the position of the imaging lens so as to move to the focusing position on the basis of data corresponding to the AF object area determined by the AF object area determination device.

An example of the AF object area determination device is one that determines the AF object area on the basis of at least one of the inclination and the direction of the object.

A range that can be covered by the AF object area determined by the AF object area determination device may be previously determined on the basis of the object image portions.

The autofocus control apparatus may further comprise a digital filter whose filter characteristics can be changed and that passes a desired frequency band component of the data corresponding to the object area detected by the object area detection device, and a filter control device that controls the digital filter such that the filter characteristics are changed on the basis of the size of the object area detected by the object area detection device. In this case, the position control device will control the position of the imaging lens so as to move to the focusing position on the basis of the desired frequency band component of the data, which has been passed through the digital filter, corresponding to the object area. The digital filter that passes through the desired frequency band component is generally formed of a band-pass filter or a high-pass filter.

The filter control device may control the digital filter so as to have such filter characteristics that the desired frequency band that passes through the digital filter in a case where the size of the object area detected by the object area detection device is small is higher than that in a case where it is large.

It is preferable that when the object is a face, the autofocus control apparatus further comprises a body area detection device that detects a body area of the face on the basis of the object area detected by the object area detection device, and an AF object area determination device that determines an AF object area on the basis of the object area detected by the object area detection device and the area of the body portion detected by the body area detection device. The position control device will control the position of the imaging lens so as to move to the focusing position on the basis of the data corresponding to the AF object area determined by the AF object area determination device.

When the object is a face, the autofocus control apparatus may further comprise a body area detection device that detects a body area of the face on the basis of the object area detected by the object area detection device, and a digital filter that passes a desired frequency band component of the data corresponding to the object area detected by the object area detection device and a desired frequency band component of data corresponding to the body area detected by the body area detection device. In this case, the position control device will carry out the focusing position control on the basis of the desired frequency band component corresponding to the object area or the desired frequency band components corresponding to both the object area and the body area.

When the object is a face, the autofocus control apparatus may further comprise a body area detection device that detects a body area of the face on the basis of the object area detected by the object area detection device, a digital filter that previously passes a desired frequency band component of the data corresponding to the object area detected by the object area detection device and a desired frequency band component of data corresponding to the body area detected by the body area detection device, and a focusing position control judgment device that judges whether or not focusing position control of the imaging lens can be carried out on the basis of the desired frequency band component corresponding to the object area that has been passed by the digital filter. In this case, it is preferable that the position control device carries out the focusing position control on the basis of the desired frequency band component corresponding to the object area depending on the judgment that the focusing position control can be carried out by the focusing position control judgment device and carries out the focusing position control on the basis of the desired frequency band component corresponding to the body area that has been previously passed depending on the judgment that the focusing position control cannot be carried out by the position control judgment device.

When the object is a face, the autofocus control apparatus may further comprise a body area detection device that detects a body area of the face on the basis of the object area detected by the object area detection device, a digital filter that passes a desired frequency band component of the data corresponding to the object area detected by the object area detection device and a desired frequency band component of data corresponding to the body area detected by the body area detection device, and a brightness judgment device that judges whether or not the brightness of the subject image or the object area detected by the object area detection device is not more than a predetermined value. In this case, the position control device will carry out the focusing control on the basis of the desired frequency band component corresponding to the object area and the desired frequency band component corresponding to the body area, which have been passed through the digital filter, depending on the judgment that the brightness is not more than the predetermined value by the brightness judgment device.

The autofocus control apparatus further comprises a storage device that previously stores the relationship among the ratio of the subject image in a case where the subject is imaged to the object included in the subject image, the focal length of the lens in a case where the subject is imaged, and the distance to the subject, a first ratio calculation device that calculates a first ratio of the object area detected by the object area detection device to the subject image, and a distance calculation device that calculates the distance to the subject on the basis of the first ratio calculated by the first ratio calculation device, the focal length of the lens in a case where the first ratio is calculated by the first ratio calculation device, and the ratio, the focal length, and the distance to the subject that are stored in the storage device.

The autofocus control apparatus can further comprise a movement range determination device that determines the movement range of the imaging lens by the position control device on the basis of the distance to the subject that is calculated by the distance calculation device.

The first ratio calculation device may calculate, when a plurality of object areas are detected by the object area detection device, the two first ratios using the object area of the largest size and the object area of the smallest size. In this case, the distance calculation device will calculate two distances to the subject on the basis of the two first ratios, and the movement range determination device will determine the movement range of the imaging lens on the basis of the two distances to the subject.

The position control device may control the position of the imaging lens so as to move to the focusing position on the basis of the distance calculated by the distance calculation device.

The first ratio calculation device may calculate, when a plurality of object areas are detected by the object area detection device, the one or plurality of first ratios using the one or plurality of object areas each assigned a high priority. In this case, the distance calculation device may calculate the one or plurality of distances to the subject on the basis of the one or plurality of first ratios, and the position control device may control the position of the imaging lens so as to move to the focusing position on the basis of the one or plurality of distances.

The priority depends on at least one of the size of the object, the likeness to the object, and the position, the brightness, the inclination, and the direction of the object, for example.

The position control device may control the position of the imaging lens on the basis of a value obtained by the weighted average of the plurality of distances.

The autofocus control apparatus may further comprise an area definition device that defines, when the size of an AF image for obtaining data corresponding to the object area used for the position control of the imaging lens in the position control device and the size of the subject image used for the detection processing in the object detection device differ from each other, an area corresponding to the object area detected by the object area detection device on the AF image. In this case, the position control device will control the position of the imaging lens so as to move to the focusing position on the basis of data corresponding to the area defined by the area definition device.

The position control device may control, when a plurality of object areas are detected by the object area detection device, the position of the imaging lens so as to move to the focusing position on the basis of data corresponding to the one or plurality of object areas each assigned a high priority.

The priority depends on at least one of the size of the object, the likeness to the object, and the position, the brightness, the inclination, and the direction of the object, for example.

The autofocus control apparatus may further comprise an exposure control device that controls, when a plurality of object areas are detected by the object area detection device, the amount of exposure of the solid-state electronic imaging device on the basis of data corresponding to any one or more of the plurality of object areas. In this case, the position control device will position the imaging lens so as to move to the focusing position on the basis of the data corresponding to the object area used for the exposure control in the exposure control device.

The exposure amount calculation device may calculate, when a plurality of object areas are detected by the object area detection device, the amount of exposure of the solid-state electronic imaging device on the basis of data corresponding to any one or more of the plurality of object areas.

The position control device may control, when a plurality of object areas are detected by the object area detection device, the position of the imaging lens so as to move to the focusing position on the basis of data corresponding to the plurality of object areas.

The position control device may put the imaging lens at the farthest position on the NEAR side out of the positions of the imaging lens that are determined on the basis of the data corresponding to the plurality of object areas.

The position control device may move the imaging lens a predetermined distance at a time toward the INF side from the NEAR side, detects the level of a desired frequency band component of the data corresponding to the object area obtained by imaging the subject for each movement position, and put the imaging lens at a position where the maximal value is first given.

The position control device may put the imaging lens at a position intermediate between the farthest position on the NEAR side and the farthest position on the INF side out of the positions of the imaging lens that are determined on the basis of the data corresponding to the plurality of object areas.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 shows information related to the results of face detection;

FIGS. 22A, 22B, 22C, and 22D respectively show a face image portion having an inclination of zero degree, a face image portion having an inclination of 30 degrees, a face image portion having an inclination of 60 degrees, and a face image portion having an inclination of 90 degrees;

FIG. 38 is a table showing a plurality of items used for AF area enlargement processing and a way of calculating the items;

DESCRIPTION OF THE PREFERRED EMBODIMENTS

Figure 1:
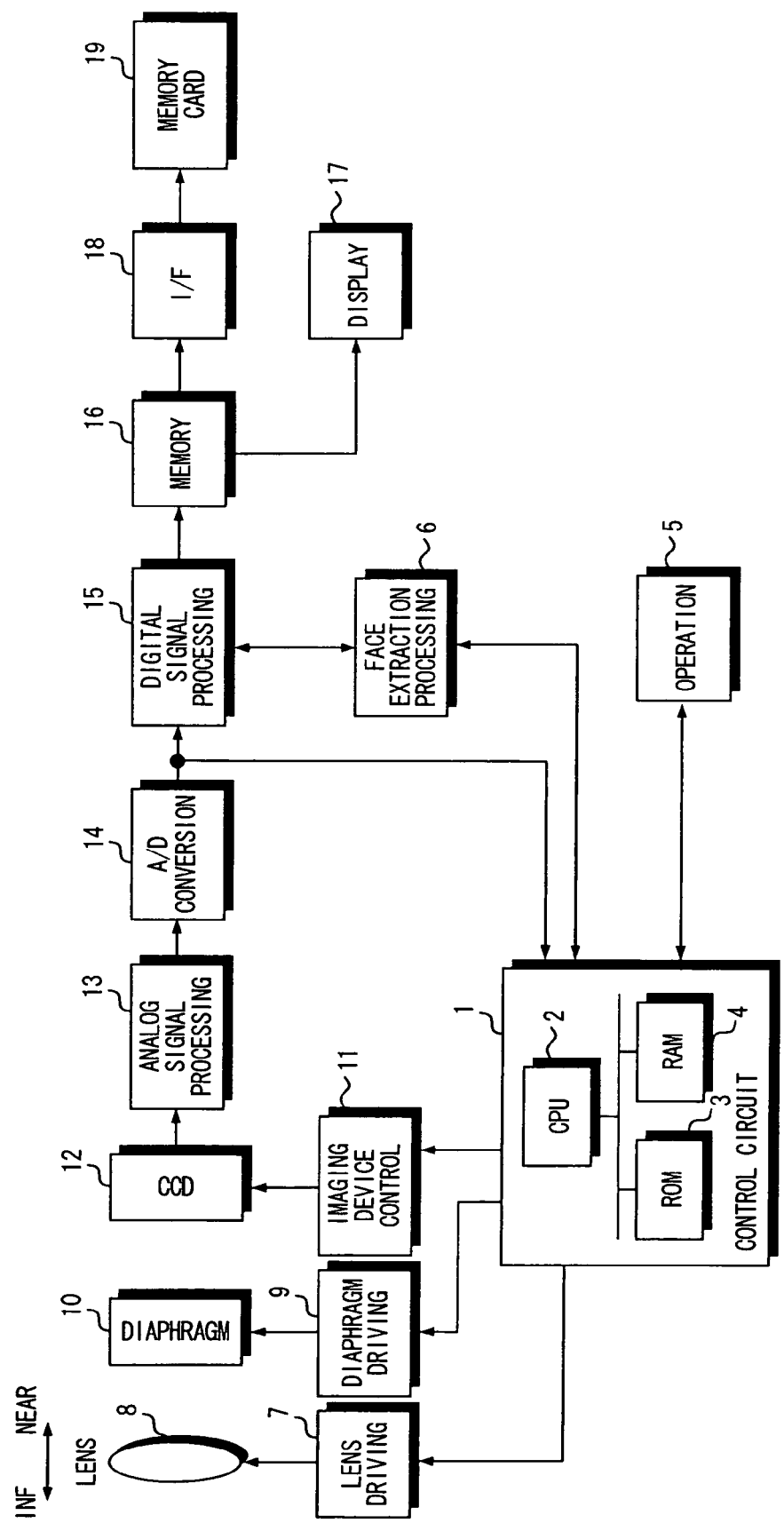
FIG. 1 is a block diagram showing the electrical configuration of a digital still camera.

FIG. 1 is a block diagram showing the electrical configuration of a digital still camera according to an embodiment of the present invention.

The digital still camera according to the present embodiment is so adapted that a face portion of a subject is suitably focused.

The overall operation of the digital still camera is supervised by a control circuit 1. The control circuit 1 comprises a CPU 2, a ROM 3 storing an operation program of the digital still camera, predetermined data, and so on, and a RAM 4 temporarily storing data.

The digital still camera is provided with an operation device 5 comprising a mode setting switch for setting a mode such as an imaging mode or a reproduction mode, a button such as a shutter release button, and a switch. An operation signal outputted from the operation device 5 is fed to the control circuit 1.

A diaphragm 10 and an imaging lens 8 are provided ahead of a CCD 12. The imaging lens 8 is supported so as to be movable along its optical axis (the side of the CCD 12 is the NEAR side, and the opposite side is the INF side), and the lens position thereof is controlled such that a subject image (in a case where the subject image includes a face, as described later, the face) is focused onto a light receiving surface of the CCD 12 by a lens driving circuit 7. The f-stop value of the diaphragm 10 is controlled such that a proper amount of exposure is obtained by a diaphragm driving circuit 9. When a subject is imaged (picked up), a video signal representing a subject image formed on the light receiving surface of the CCD 12 is outputted under the control of an imaging (pickup) device control circuit 11. The video signal outputted from the CCD 12 is inputted to an analog signal processing circuit 13. The lens driving circuit 7, the diaphragm driving circuit 9, and the imaging device control circuit 11 are controlled by the control circuit 1.

The video signal is subjected to predetermined analog signal processing such as white balance adjustment in the analog signal processing circuit 13. The video signal outputted from the analog signal processing circuit 13 is converted into digital image data in an analog/digital conversion circuit 14, and is inputted to a digital signal processing circuit 15 and the control circuit 1.

In the control circuit 1, a high-frequency component is extracted from the inputted digital image data, to obtain focusing data. The obtained focusing data are integrated within an area that is the whole or a part of an image, to obtain a focusing evaluated value. The imaging lens 8 is controlled by the lens driving circuit 7 at such a position that the subject image is focused onto the light receiving surface of the CCD 12 on the basis of the obtained focusing evaluated value.

The digital image data is subjected to predetermined digital signal processing such as gamma correction in the digital signal processing circuit 15. Image data outputted from the digital signal processing circuit 15 is applied to a display device 17 through a memory 16. The subject image is displayed on a display screen of the display device 17. The image data outputted from the digital signal processing circuit 15 is also inputted to a face extraction processing circuit 6. In the face extraction processing circuit 6, a face included in the subject image represented by the image data outputted from the digital signal processing circuit 15 is extracted. Data representing an image of the extracted face and data representing the position, the size, etc. of an area of the extracted face are applied to the control circuit 1. Specifically, focusing control is carried out using data representing the whole of the subject image or the face in the subject image, described later.

When the shutter release button is pressed, the image data outputted from the digital signal processing circuit 15 in the above-mentioned manner is applied to the memory 16, and is temporarily stored therein. The image data is read from the memory 16, is applied to a memory card 19 through an interface 18, and is recorded thereon.

Figure 2:
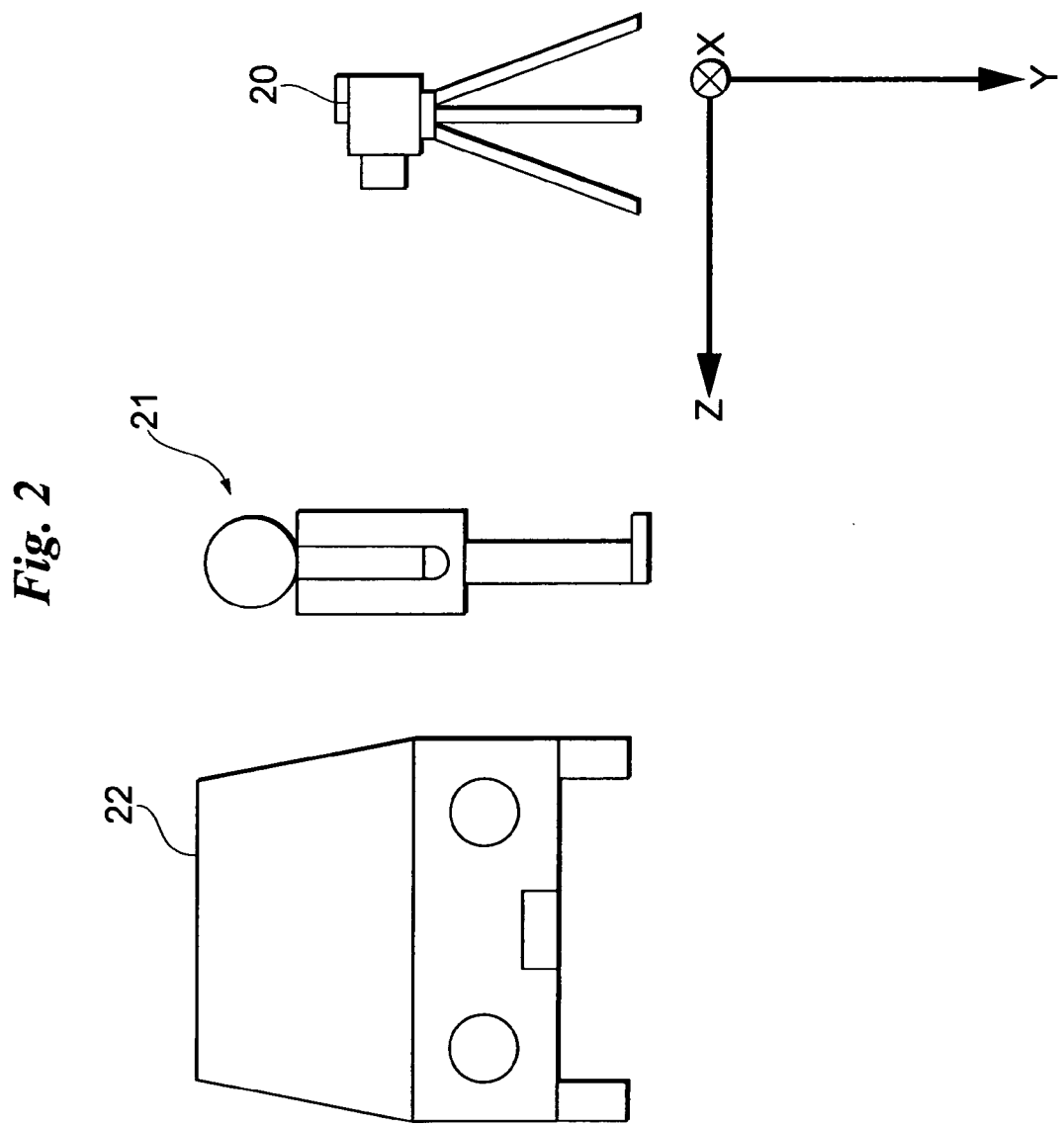
FIG. 2 shows the relationship between a digital still camera and a subject.

FIG. 2 shows the relationship between a subject and a digital still camera.

A digital still camera 20 is arranged, directed toward a subject 21 and a subject 22. The subject 21 is a person, and the subject 22 is an automobile.

In the present embodiment, the direction in which an imaging lens in the digital still camera 20 moves along an optical axis of the imaging lens is defined along a Z-axis. A plane having the Z-axis as a normal line is defined as an XY-plane.

Figure 3:
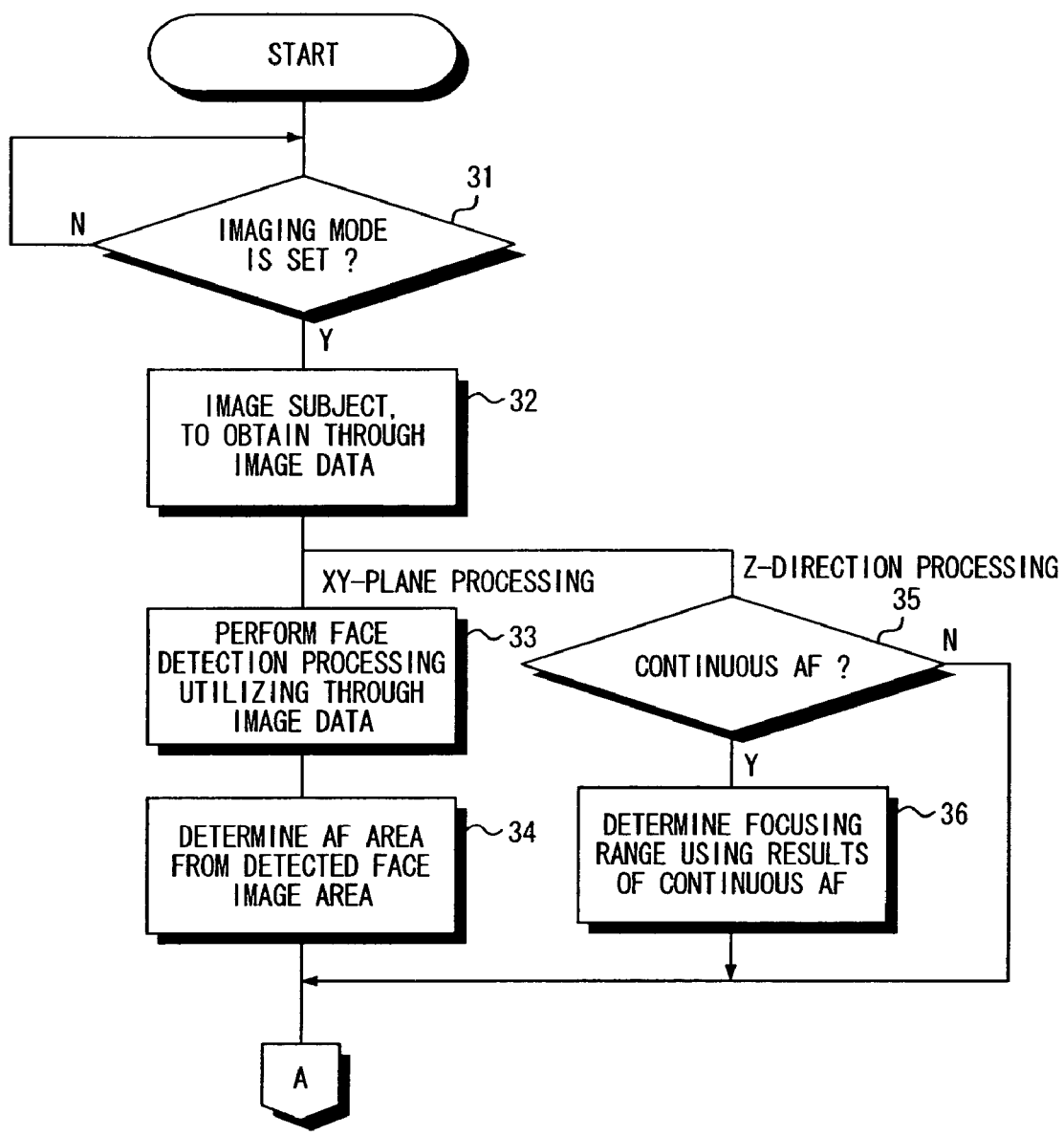
FIGS. 3 and 4 are respectively flow charts showing the procedure for recording processing.
Figure 4:
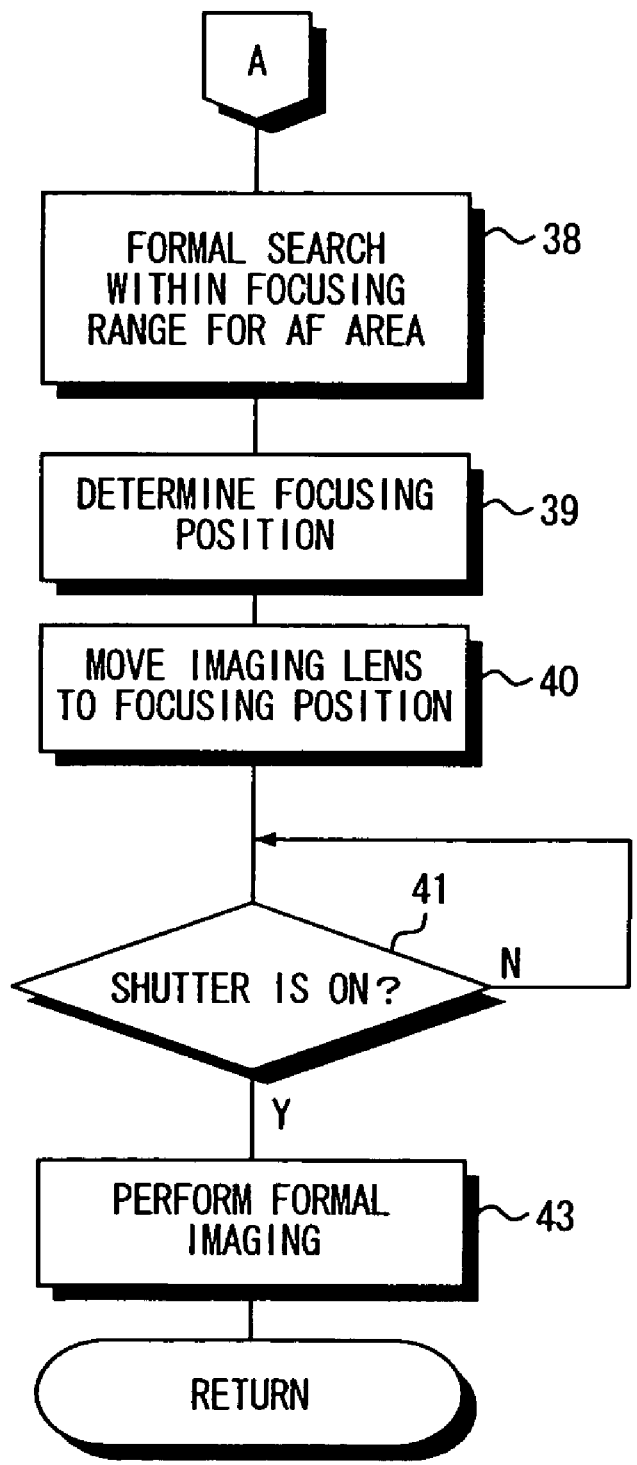

FIGS. 3 and 4 are respectively flow charts showing the procedure for recording processing of the digital still camera.

In the recording processing, an image of a face included in a subject image is detected using a through image obtained before recording. A formal search is conducted such that the detected face image is accurately focused. In a case where the digital still camera is one using continuous AF (Autofocus), a movement range (focusing range) of the imaging lens 8 along the optical axis is determined utilizing the results of the continuous AF, and the imaging lens is moved within the determined focusing range so that the formal search is conducted.

When an imaging mode is set by a mode switch (YES in step 31), a subject is imaged in a predetermined period, and through image data representing a subject image is outputted from the CCD 12 in a predetermined period (step 32). Consequently, XY-plane processing and Z-direction processing are performed in parallel. They may be performed not in parallel but in order.

In the XY-plane processing, face detection processing for detecting the image of the face included in the subject image is performed utilizing the through image data (step 33). An AF area to be focused in the formal search is determined from an area of the detected face image (step 34).

Figure 5A:
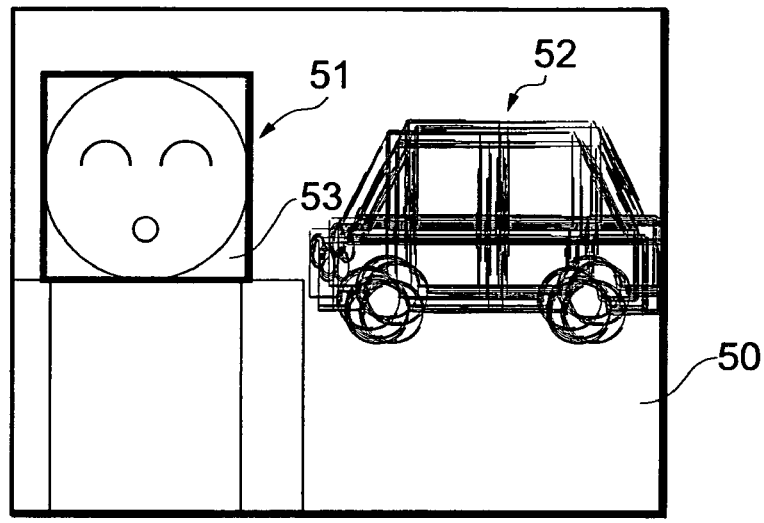
FIGS. 5A and 6A and FIGS. 5B and 6B respectively show an example of a subject image and an example of a face detection object area.
Figure 5B:
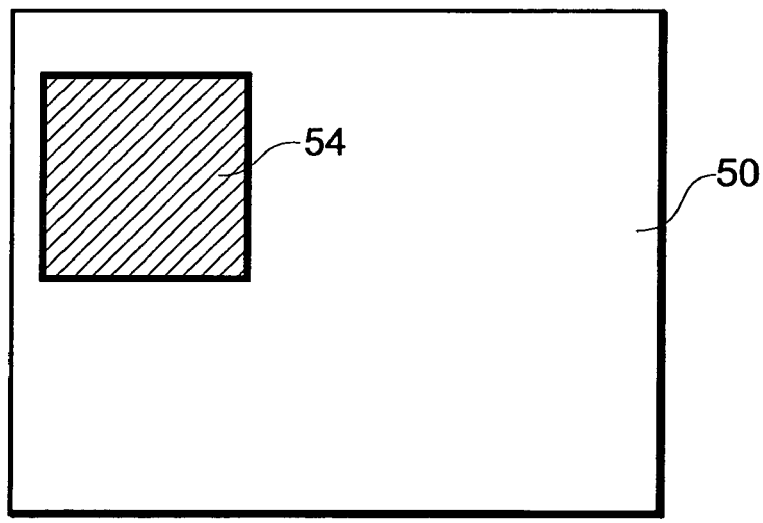
Figure 6A:
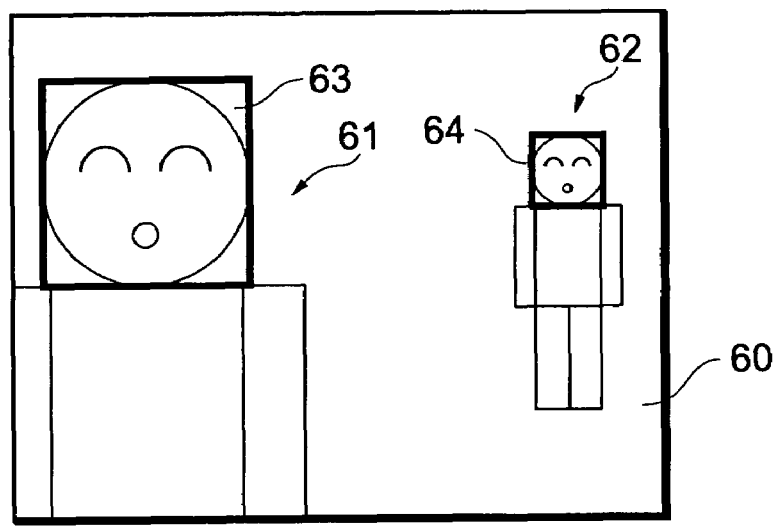
Figure 6B:
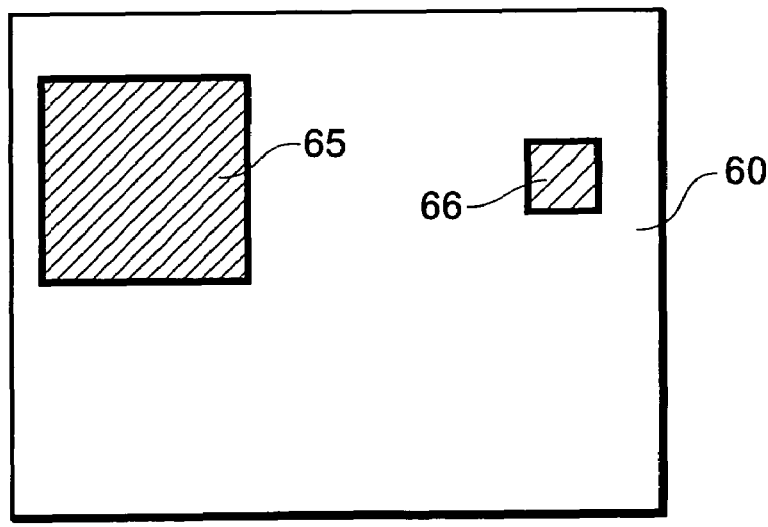

FIGS. 5A and 6A respectively show examples of subject images 50 and 60 represented by through image data. FIGS. 5B and 6B respectively show examples of determined AF areas 54 and 65 and 66.

Referring to FIG. 5A, the subject image 50 includes a person image 51 and an automobile image 52. When the subject image 50 is obtained, and face detection processing is performed therein, a face image area 51 is detected. The AF area 54 is determined, as shown in FIG. 5B, from the detected face image area 51.

Similarly, referring to FIG. 6A, the subject image 60 includes a first person image 61 and a second person image 62. When face detection processing is performed in the subject image 60, two face image areas 61 and 64 are obtained. The two AF areas 65 and 66, as shown in FIG. 6B, are determined from the detected two face image areas 63 and 64.

The size of the AF area may be the same as the size of the detected face area, or may be larger or smaller than the size of the face area. The detected face area may not be used for determining the AF area in a case where it is small or large to some extent.

Returning to FIG. 3, in the Z-direction processing, it is confirmed whether or not the digital still camera is one using continuous AF (step 35). In a case where the digital still camera is one using continuous AF (YES in step 35), a focusing range serving as a movement range of the imaging lens 8 is determined in a formal search using the results of the continuous AF (step 36). Unless the digital still camera is one using continuous AF (NO in step 35), the processing in the step 36 is skipped.

Figure 7:
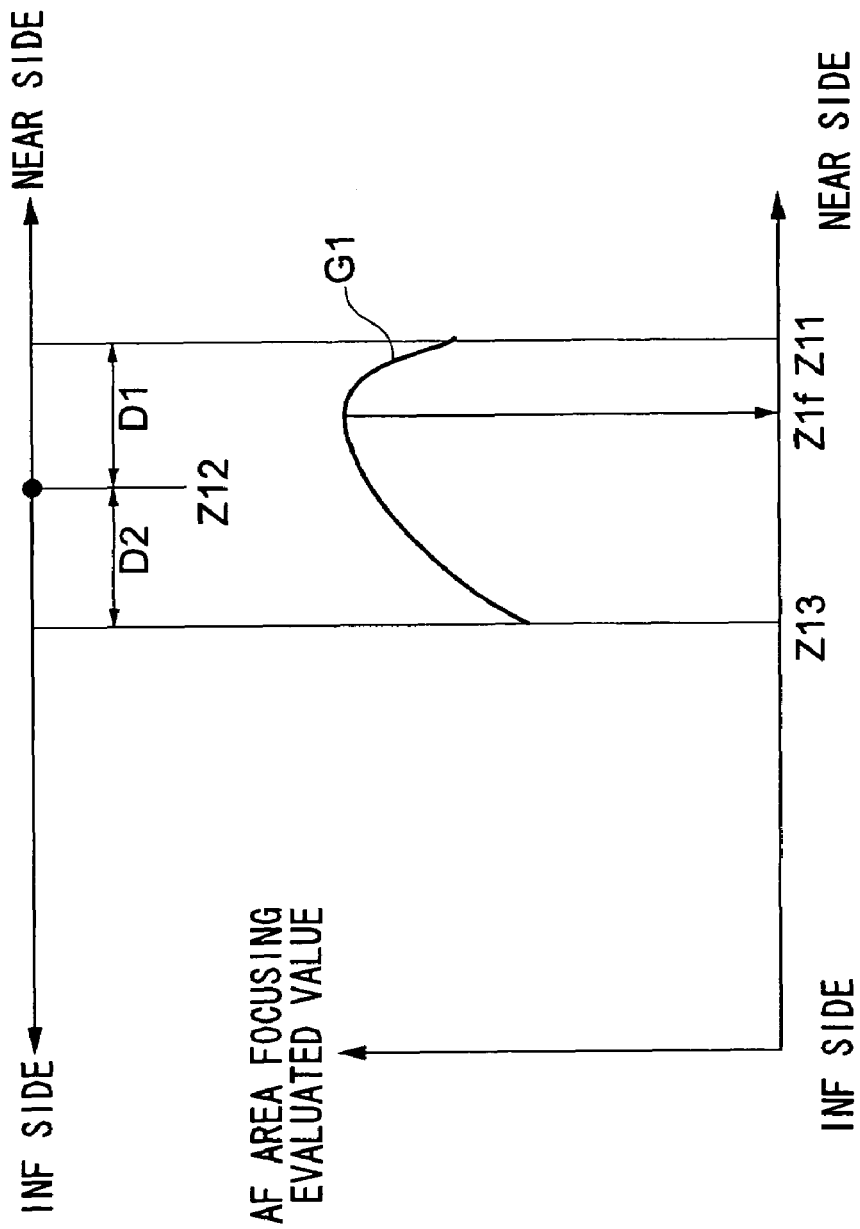
FIG. 7 shows the relationship between the position of an imaging lens and an AF area focusing integrated value.

FIG. 7 shows the results of the continuous AF (on the upper side) and the way the formal search is conducted (on the lower side).

Referring to the upper side of FIG. 7, when the continuous AF is carried out using through image data, a position Z12 of the imaging lens 8 in a case where a through image is focused is obtained. A distance D1 on the NEAR side away from the position Z12 of the imaging lens 8 and a distance D2 on the INF side away therefrom are determined as a focusing range. The continuous AF causes a position $Z1f$ of the imaging lens

8 to move depending on the change of the subject, so that the focusing range will be also determined in consideration of the movement.

Since a position at the distance D1 on the NEAR side away from the position Z12 of the imaging lens 8 is a position Z11, and a position at the distance D2 on the INF side away therefrom is a position Z13, a focusing range representing a range in which the imaging lens 8 moves in the formal search is from Z11 to Z13.

Referring to FIG. 4, the formal search is conducted within the determined focusing range for the AF area determined in the above-mentioned manner (step 38), and a position (focusing position) of the imaging lens 8 where the image of the face included in the subject image is focused is determined (step 39).

Referring to the lower side of FIG. 7, the focusing range is a range defined by the positions Z11 to Z13 of the imaging lens 8, as described above. In the focusing range from Z11 to Z13, the imaging lens 8 is moved a predetermined distance at a time, so that the subject is imaged for each movement position. Focusing data is extracted from data corresponding to an AF area within the subject image obtained by the imaging. An integrated value of the extracted focusing data is obtained as an AF area focusing evaluated value. The AF area focusing evaluated value is obtained while the imaging lens 8 is being moved within the focusing range from Z11 to Z13, so that a graph G1 of the AF area focusing evaluated value is obtained. This is a formal search, described above. The position Z1$f$ of the imaging lens 8 where the AF area focusing evaluated value reaches its maximum in the graph G1 obtained by the formal search is determined as the focusing position Z1$f$.

Returning to FIG. 4, when the focusing position is determined (step 39), the imaging lens 8 is moved so as to be put at the determined focusing position (step 40). A position to which the imaging lens 8 is moved is such a position that the image of the face in the subject image is most focused.

When the shutter release button is pressed (YES in step 41), formal imaging is performed. Image data obtained by the formal imaging is recorded on the memory card 19.

Figure 8:
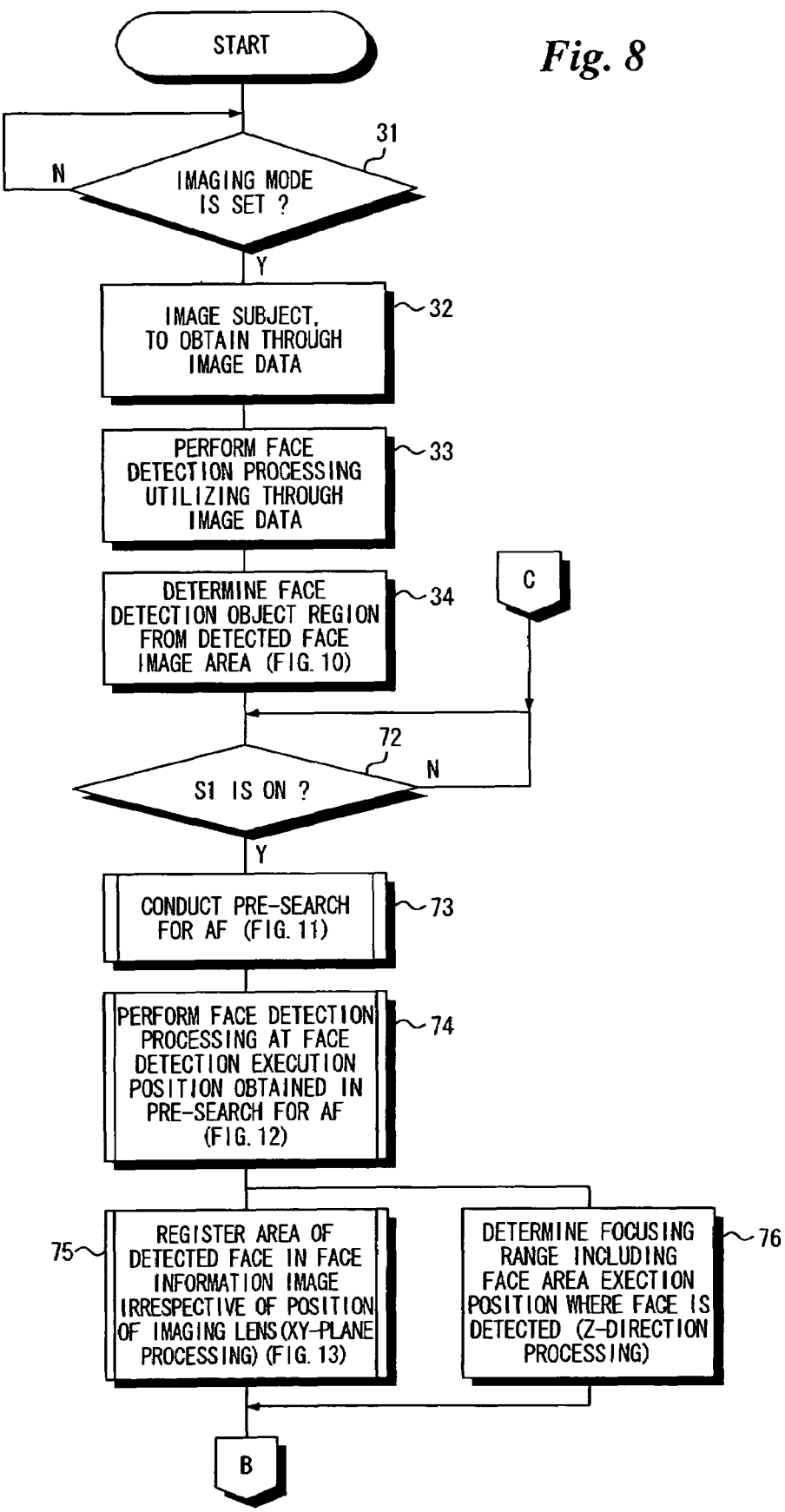
FIGS. 8 and 9 are respectively flow charts showing the procedure for recording processing, showing another embodiment.
Figure 9:
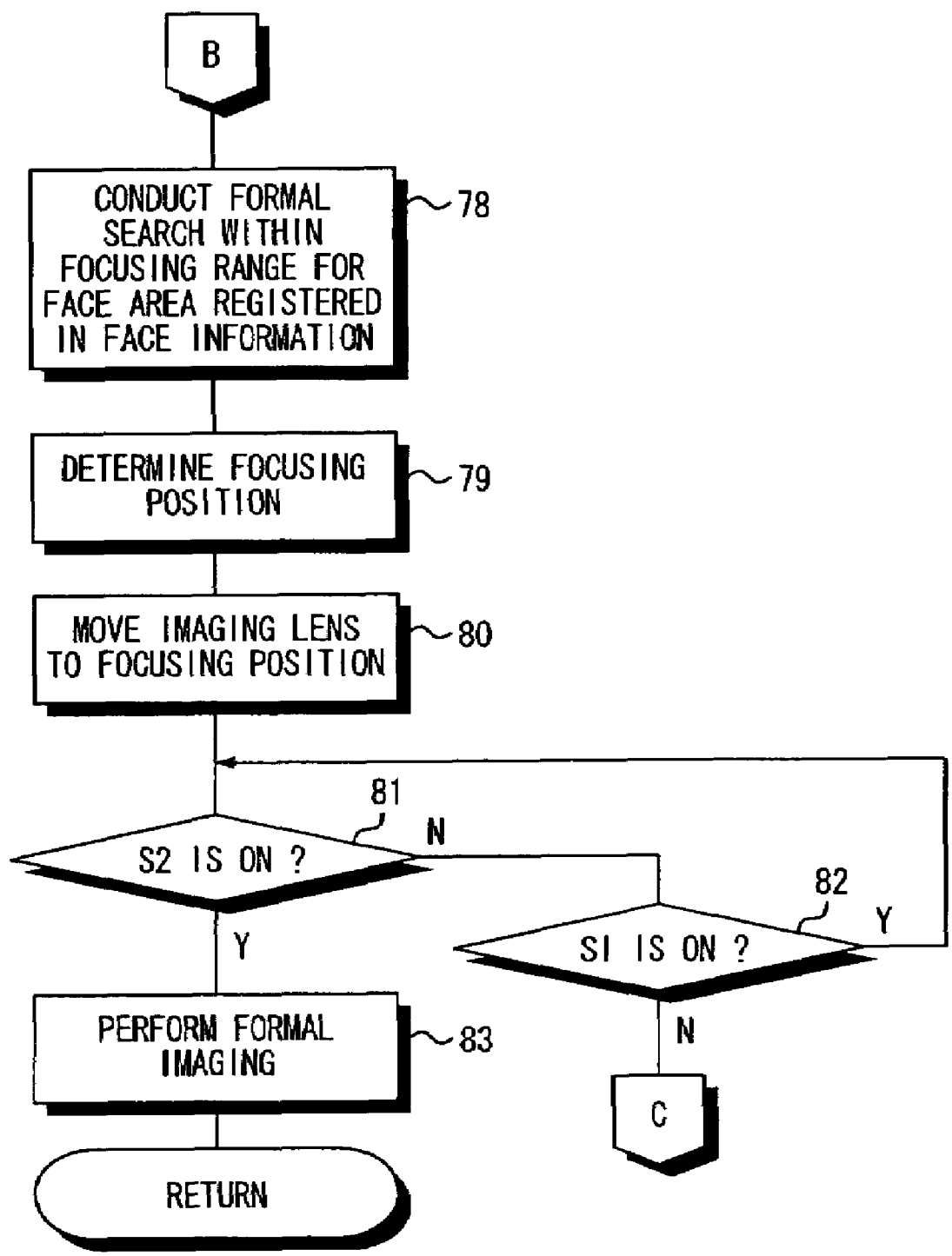

FIGS. 8 and 9 are respective flow charts showing the procedure for recording processing of a digital still camera, showing another embodiment.

In the procedure for processing, face detection processing is performed utilizing through image data, so that a face detection object area is determined. A pre-search for AF is conducted using data corresponding to the determined face detection object area. Thereafter, a formal search is conducted. Alternatively, a shutter release button of a two-stage stroke type is utilized.

When an imaging mode is set, as described above (YES in step 31), a subject is imaged, to obtain through image data (step 32). Face detection processing is performed from the through image data (step 33), and a face detection object area is determined from an area of a detected face (step 71).

Figure 10A:
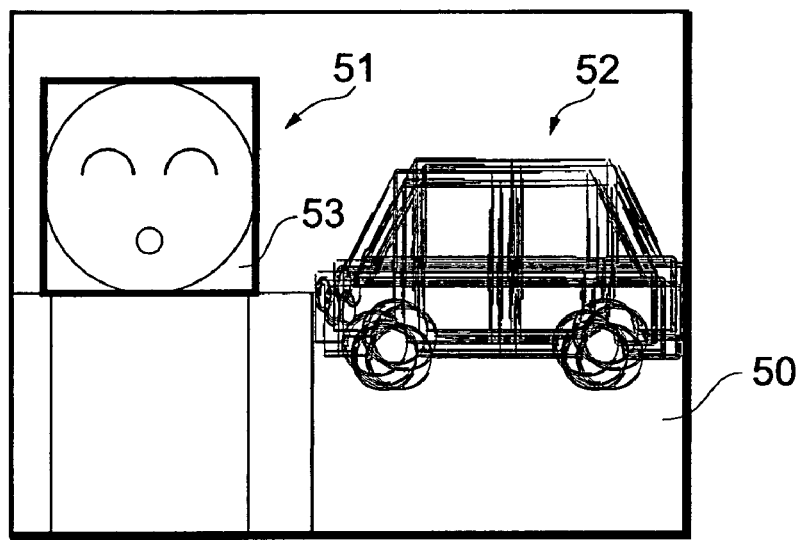
FIGS. 10A and 10B respectively show a subject image and an example of a face detection object area.
Figure 10B:
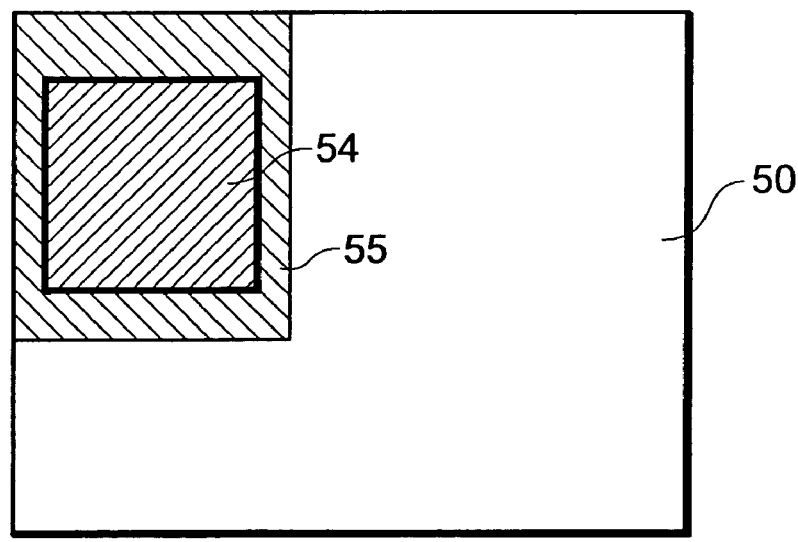

FIG. 10A shows a subject image, and FIG. 10B shows a face detection object area.

Referring to FIG. 10A, a subject image 50 represented by through image data is obtained. The subject image 50 includes a person image 51 and an automobile image 52, and a face image 53 is detected.

Referring to FIG. 10B, an area 55 including an area (AF area) 54 corresponding to the face image 53 and surrounding the area 54 is determined as a face detection object area (AF area) 55.

Returning to FIG. 8, when the shutter release button is pressed in the first stage (YES in step 72), a pre-search for AF is conducted (step 73).

Figure 11:
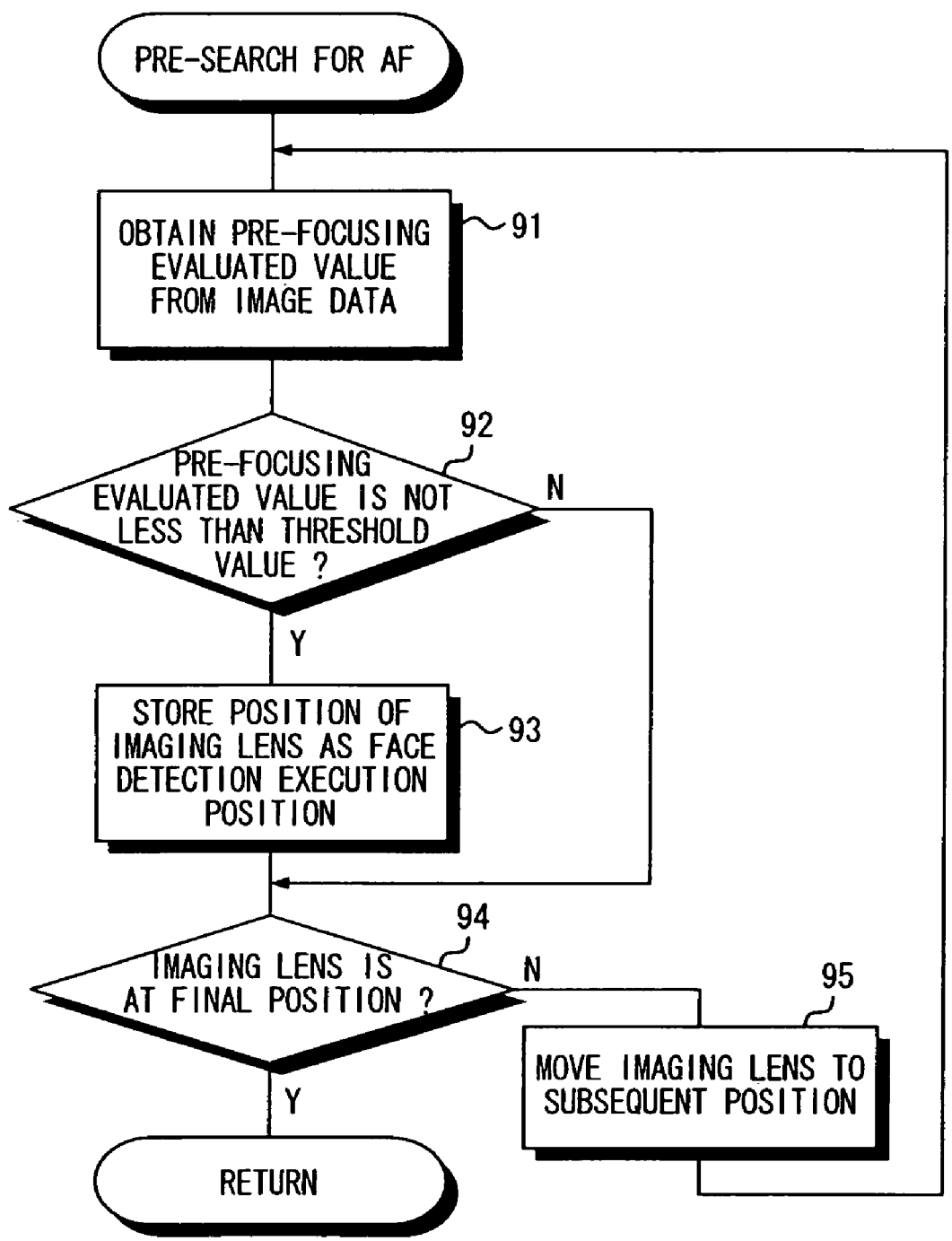
FIG. 11 is a flow chart showing the procedure for pre-search processing for AF.

FIG. 11 is a flow chart showing the procedure for the pre-search for AF.

The imaging lens 8 is movable within a predetermined range in the Z-direction, and is put at an initial position. A subject is imaged in a state where the imaging lens 8 is at the initial position, to obtain image data representing the whole I of a subject image. High-frequency components are extracted from the obtained image data and are integrated, to obtain a pre-focusing evaluated value (step 91).

If the obtained pre-focusing evaluated value is not less than a predetermined threshold value (YES in step 92), it is considered that a subject image obtained at a position of the imaging lens 8 in a case where the pre-focusing evaluated value is obtained is relatively focused. Therefore, the position of the imaging lens 8 is stored as a face detection execution position (step 93). In the face detection execution position, processing for detecting a face from the determined face detection object area is performed, as described later. When the face is detected, high-frequency components are extracted from the detected face, to obtain evaluated values. The imaging lens 8 is positioned by taking the position of the imaging lens 8 at the face detection execution position where the maximum evaluated value is obtained as a most focused position. If the obtained pre-focusing evaluated value is less than the threshold value (NO in step 92), the processing in the step 93 is skipped.

Unless the imaging lens 8 is at a final position in a movement range (NO in step 94), the imaging lens 8 is moved by a predetermined distance and put at the subsequent position (step 95). Until the imaging lens 8 reaches the final position in the movement range (YES in step 94), the processing in the steps 91 to 93 is repeated.

Figure 14A:
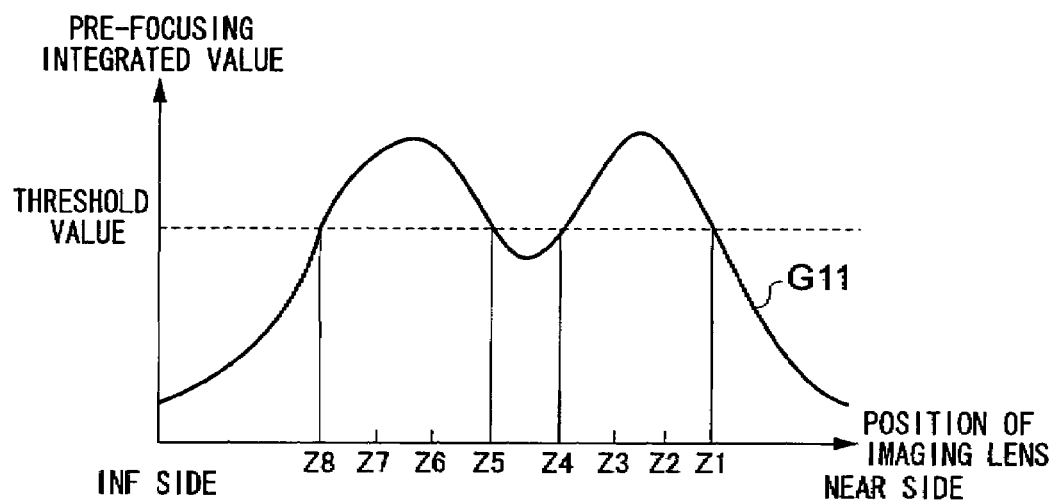
FIGS. 14A and 14B respectively show the relationship between the position of an imaging lens and a pre-focusing evaluated value and the relationship between the position of an imaging lens and a face area focusing integrated value.

FIG. 14A shows a pre-focusing evaluated value obtained by the pre-search for AF and a face detection execution position.

In FIG. 14A, the horizontal axis is a movement direction (Z-direction) of the imaging lens 8, and the vertical axis is an overall focusing evaluated value.

A pre-focusing evaluated value is obtained while the imaging lens 8 is being moved a predetermined distance at a time, as described above, to obtain a graph G11 of the pre-focusing evaluated value. In the graph G11, positions, corresponding to a portion that is not less than a threshold value, of the imaging lens 8 are respectively Z1, Z2, Z3, Z4, Z5, Z6, Z7, and Z8. The positions Z1, Z2, Z3, Z4, Z5, Z6, Z7, and Z8 of the imaging lens 8 are stored as the face detection execution position.

Although in the above-mentioned embodiment, the data corresponding to the whole of the subject image is used so as to obtain the pre-focusing evaluated value, data corresponding to a determined face area may be used. Focusing data is extracted from the data corresponding to the face area, and the extracted focusing data are integrated, to obtain a pre-focusing integrated value.

Returning to FIG. 8, when the pre-search for AF is terminated, face detection processing is performed at the face detection execution position obtained in the pre-search for AF (step 74).

Figure 12:
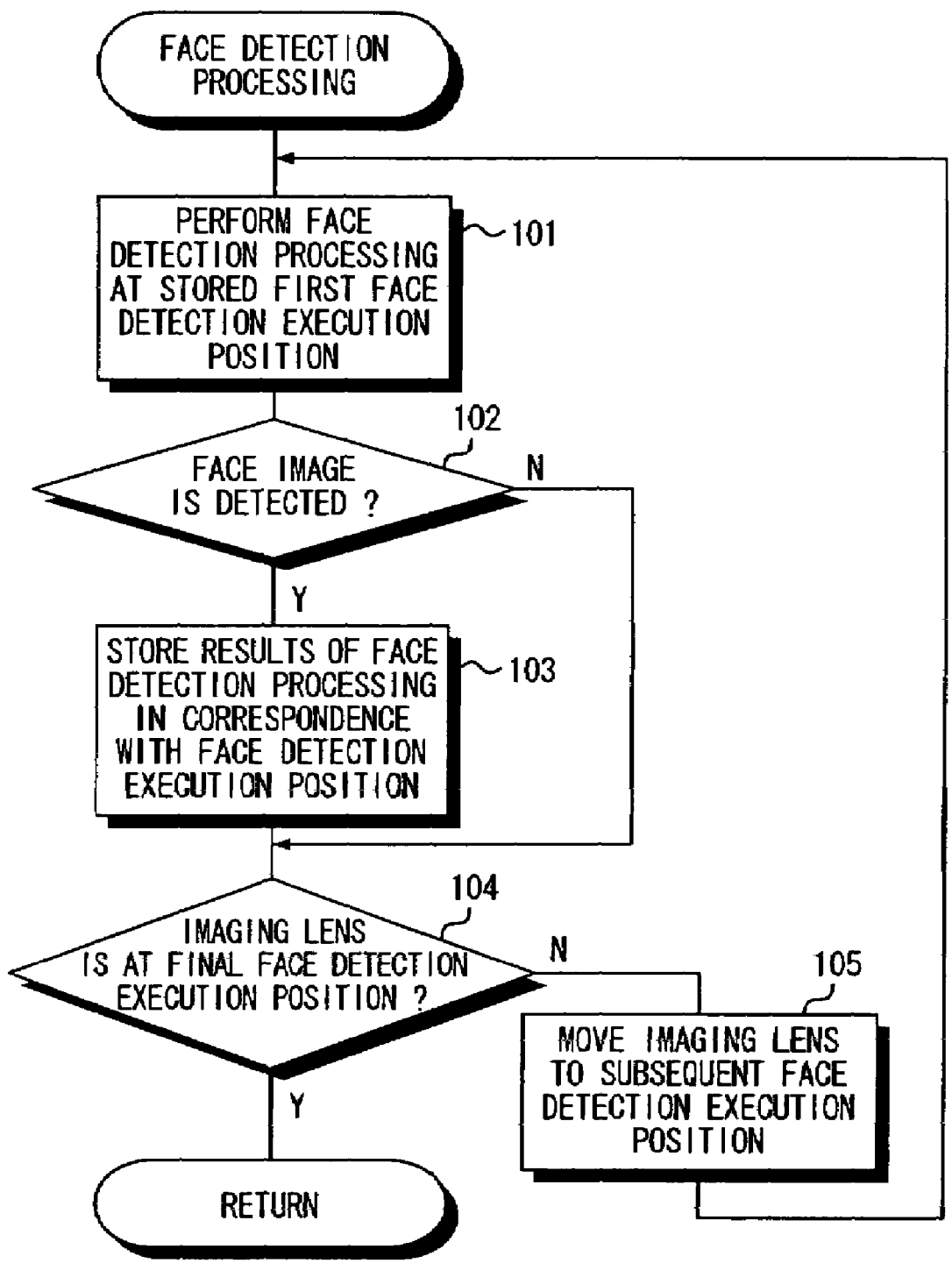
FIG. 12 is a flow chart showing the procedure for face detection processing.

FIG. 12 is a flow chart showing the procedure for the face detection processing.

The imaging lens 8 is put at the first face detection execution position out of the stored face detection execution positions so that a subject is imaged. Image data representing a subject image is inputted to the face extraction processing circuit 6, and a face included in a face detection object area determined in the above-mentioned manner in the subject image is detected (step 101). When the face is detected (YES in step 102), the results of the face detection processing (the position, the size, etc. of a detected face area) are stored in correspondence with the face detection execution position where the imaging lens 8 is positioned (step 103). Unless the face is detected (No in step 102), the processing in the step 103 is skipped.

Unless the imaging lens 8 is at the final face detection execution position (NO in step 104), the imaging lens 8 is moved to the subsequent face detection execution position (step 105). Until the imaging lens 8 reaches the final face detection execution position (YES in step 104), the processing in the steps 101 to 103 is repeated.

Figure 15:
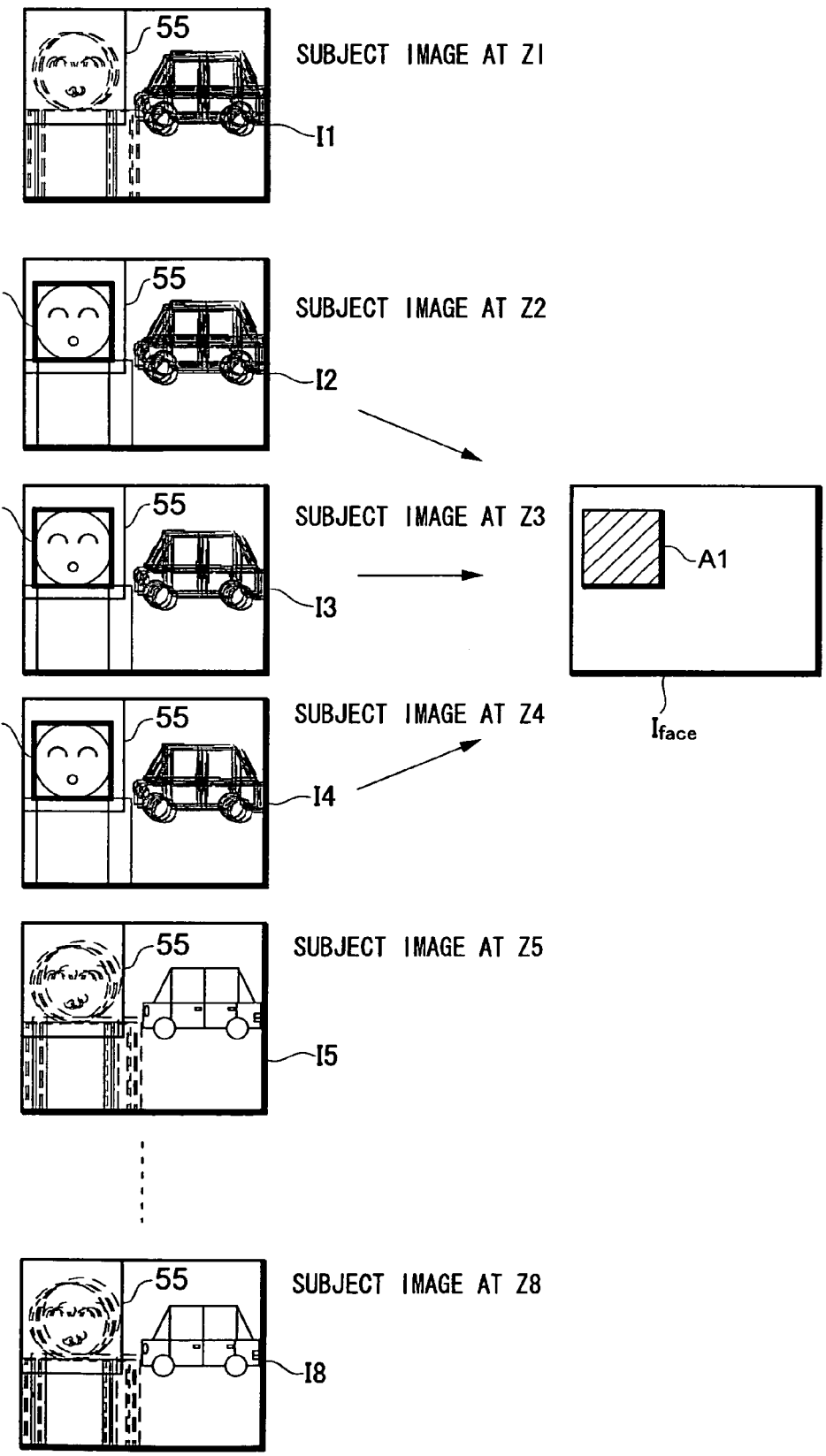
FIG. 15 shows face information image registration processing.

The left side of FIG. 15 is an example of whole images obtained by face detection processing and a face included in each of the whole images.

The imaging lens 8 is put at the face detection execution positions Z1, Z2, Z3, Z4, Z5, A6, Z7, and Z8, as described above, so that a subject is imaged, to obtain subject images I1, I2, I3, I4, I5, I6, I7, and I8. In FIG. 15, faces f2, f3, and f4 are respectively included in face detection object areas 55 in the subject images I2, I3, and I4 out of the subject images I1, I2, I3, I4, I5, I6, I7, and I8 obtained by the imaging.

In the face detection processing, the faces f2, f3, and f4 are respectively stored in correspondence with the face detection execution positions Z2, Z3, and Z4. Since the face detection processing is performed within the face detection object area 55, it is terminated relatively early.

Returning to FIG. 8, processing (XY-plane processing) for registering, when the face detection processing is performed, the area of the detected face (step 75) and processing (Z-direction processing) for determining a focusing range including the face detection execution position where the face is detected are performed.

Figure 13:
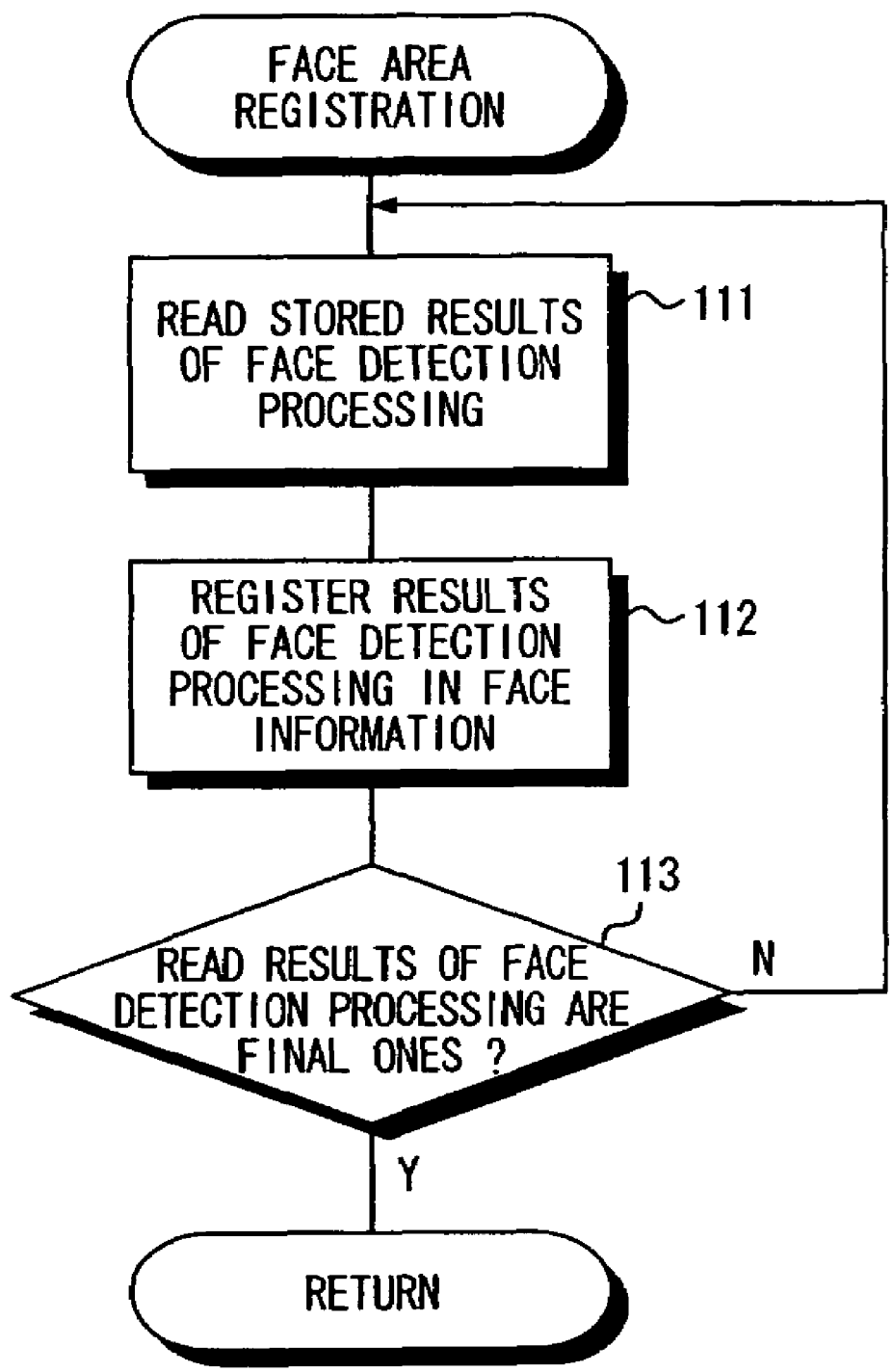
FIG. 13 is a flow chart showing the procedure for face image area registration processing.

FIG. 13 is a flow chart showing the procedure for face area registration processing.

First, the stored results of the face detection processing are read out (step 111). The read results of the face detection processing are registered in face information (step 112). The readout of the results of the face detection processing and the registration of the results of the face detection processing in the face information are continued until the final results of the face detection processing (step 113).

The right side of FIG. 15 shows an example of a face information image.

As described above, the face detection object areas 55 in the subject images I2, I3, and I4 obtained by putting the imaging lens 8 at the face detection execution positions Z2, Z3, and Z4 to image the subject respectively include the faces f2, f3, and f4. The positions, the sizes, etc. of the faces are registered as the results of the face detection processing in the same face information Iface corresponding to one frame.

Faces included in subject images obtained at different positions of the imaging lens 8 are registered in the face information Iface. As a result, a face area A1 formed by overlapping the faces f2, f3, and f4 respectively obtained when the imaging lens 8 is at the face detection execution positions Z2, Z3, and Z4 is registered as an area including a face in the face information Iface.

Returning to FIG. 8, a focusing range including the face image execution position where the face is detected is determined (step 76) in parallel with the face information registration processing (step 75).

Referring to FIG. 14A and the left side of FIG. 10, faces are respectively detected when the imaging lens 8 is at the face detection execution positions Z2, Z3, and Z4 out of the positions Z1 to Z4 and Z5 to Z8 where the pre-focusing integrated value is not less than the threshold value, so that the positions Z5 to Z8 of the imaging lens 8 where the pre-focusing integrated value is not less than the threshold value are determined as the focusing range.

Referring to FIG. 9, a formal search is conducted within the determined focusing range for the face area A1 registered in the face information Iface (step 78), and the position (focusing position) of the imaging lens 8 where the face included in the subject image is focused (step 79).

Figure 14B:
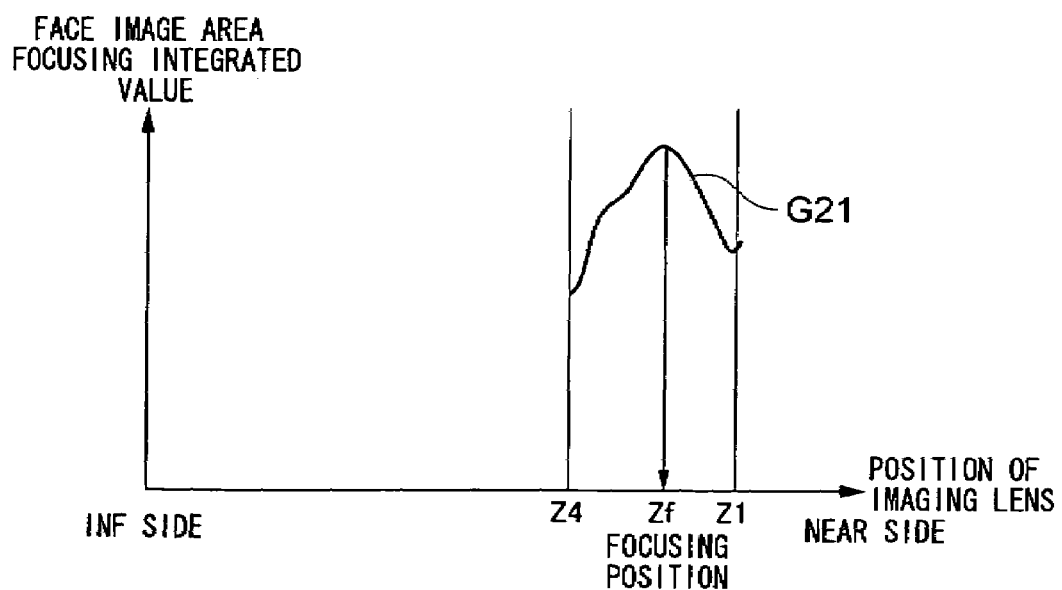

Referring to FIG. 14B, the focusing range is a range defined by the positions Z1 to Z4 of the imaging lens 8. In the focusing range from Z1 to Z4, the imaging lens 8 is moved a predetermined distance at a time, so that a subject is imaged for each movement position. Focusing data is extracted from data corresponding to face areas A1 and A2 in a subject image obtained by the imaging. An evaluated value of the extracted focusing data is obtained as a face image area focusing evaluated value. The face image area focusing evaluated value is obtained while the imaging lens 8 is being moved within the focusing range from Z1 to Z4, so that a graph G22 of the face image area focusing evaluated value is obtained. This is a formal search, described above. The position Zf of the imaging lens 8 where the face image area focusing evaluated value reaches its maximum in the graph G22 obtained by the formal search is determined as a focusing position Zf.

Returning to FIG. 9, when the focusing position is determined, the imaging lens 8 is moved so as to be put at the determined focusing position (step 80). A position to which the imaging lens 8 is moved is such a position that the face in the subject image is most focused.

When the shutter release button is pressed in the second stage (YES in step 81), formal imaging is performed. Image data obtained by the formal imaging is recorded on the memory card 19.

When the shutter release button is not pressed in the second stage (NO in step 81), and the press in the first stage of the shutter release button is maintained (YES in step 82), determination whether or not the shutter release button is pressed in the second stage is repeated. When the shutter release button is not pressed in the second stage (step 81), and the press in the first stage of the shutter release button is released (NO in step 82), the procedure is returned to the processing in the step 72.

In the above-mentioned embodiment, the moving distance of the imaging lens 8 in the pre-search for AF (step 73) may be larger than the moving distance of the imaging lens 8 in the formal search (step 78). A time period required to conduct the pre-search for AF can be shortened.

Figure 16:
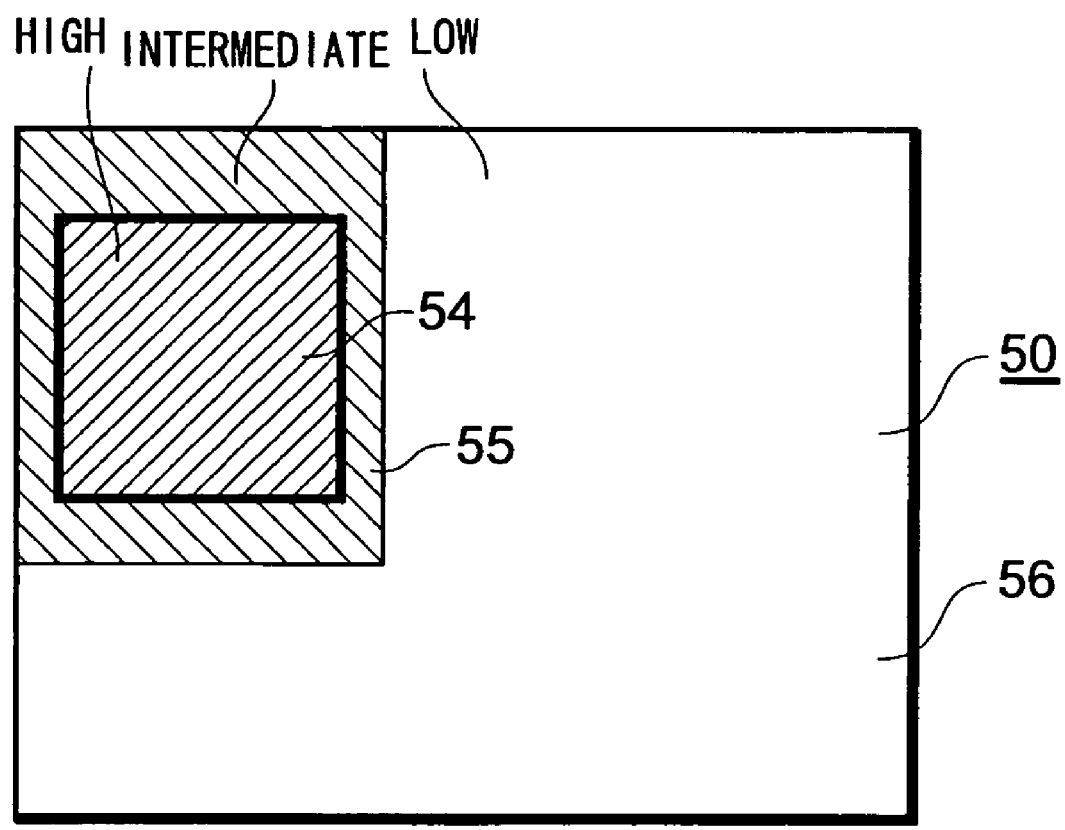
FIG. 16 shows a weighting factor for each area.

FIG. 16 shows an example of an area of the subject image where the pre-focusing evaluated value is obtained.

Although in the above-mentioned embodiment, the area 55 around the area 54 corresponding to the area where the face is detected may be taken as the face detection object area, and the above-mentioned pre-focusing evaluated value may be obtained by extracting focusing data from image data representing an image within the face detection object area 55, a pre-focusing evaluated value may be obtained from focusing data obtained by respectively assigning weighting factors to the areas 54 and 55 and the whole area (AF area) 56 in the subject image 50 and multiplying focusing data obtained from each of the areas by the weighting factor.

The weighting factor is high in the area 54 corresponding to a face image area, is intermediate in the area 55, and is low in the whole area 56. The focusing data obtained from each of the areas is multiplied by the weighting factor, to obtain a pre-focusing integrated value, described above (see FIG. 14A).

Figure 17:
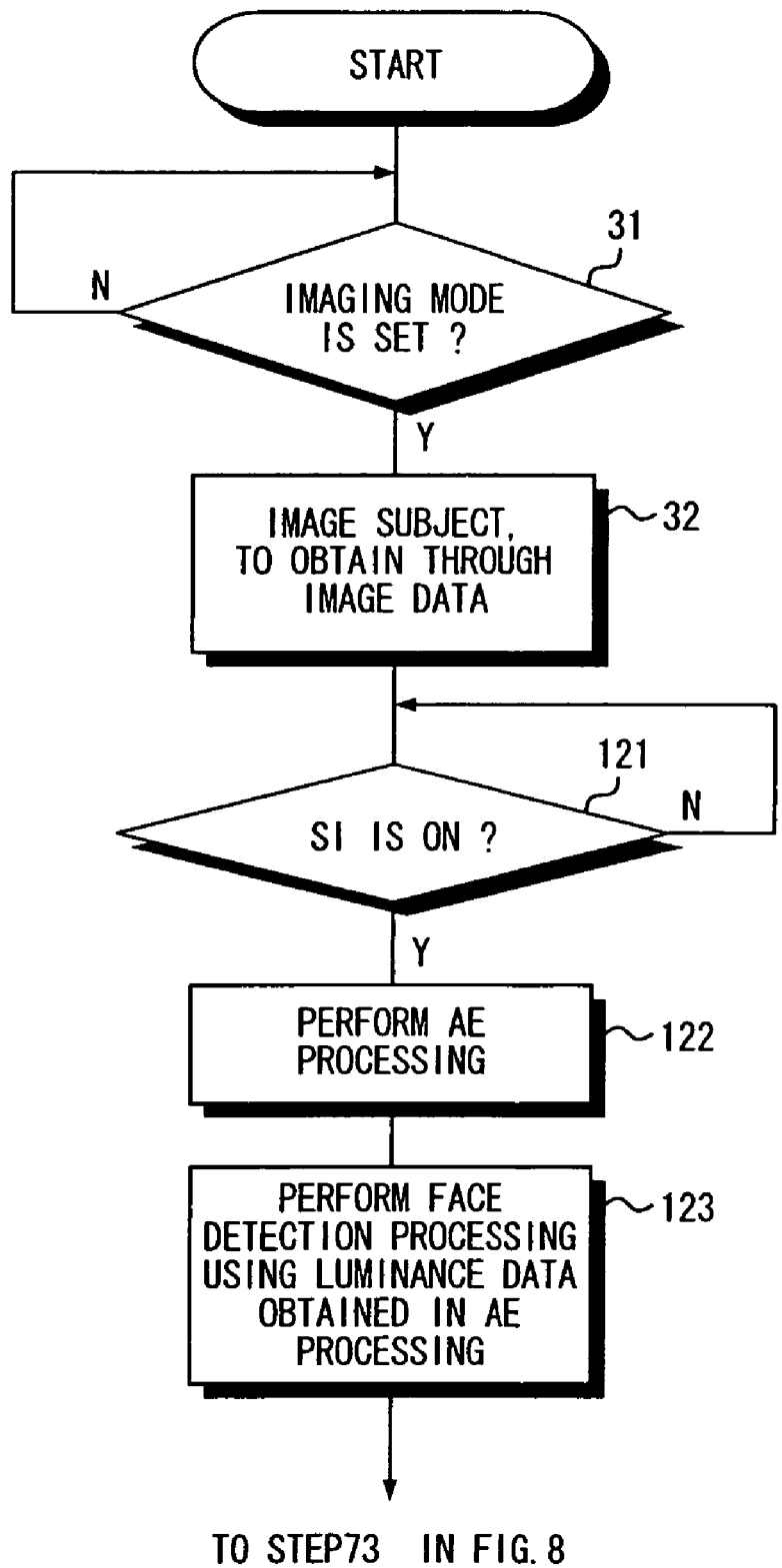
FIG. 17 is a flow chart showing the procedure for recording processing, showing another embodiment.

FIG. 17 is a flow chart showing the procedure for another processing of a digital still camera, showing another embodiment.

An imaging mode is set (YES in step 31), and through image data is obtained (step 32). When a shutter release button is pressed in the first stage (YES in step 121), AE (Automatic Exposure) processing is performed from the obtained through image data (step 122). In the AE processing, the f-stop value of a diaphragm 10 and the shutter speed (a so-called electronic shutter) of a CCD 12 are determined.

In the AE processing, luminance data is obtained, and face detection processing is performed using the obtained luminance data (step 123). In a case where brightness in which a human face can be judged is formed in a predetermined area, for example, the area can be detected as a face image area. In the subsequent processing, a face detection object area is determined from the detected face image area, after which the procedure proceeds to the processing in the step 73 shown in FIG. 8.

In the above-mentioned embodiment, the results of the continuous AF are utilized in a case where a focusing range in which a formal search is conducted is determined. When the digital still camera comprises a zoom lens, a pan focus position is defined in correspondence with each zoom position. Therefore, a formal search may be conducted by determining a range including the pan focus position as a focusing range. Further, a formal search may be conducted by determining a focusing range so as to include a focus position in a case where through image data is merely obtained.

Furthermore, in a case where the digital still camera is provided with a manual focus dial, and the imaging lens is positioned depending on the rotation position of the dial, a predetermined range including the position of the imaging lens positioned depending on the rotation position of the manual focus dial may be determined as the above-mentioned focusing range.

Furthermore, the image of the face may be detected, described above, on the basis of the likeness to the face, the brightness of the image of the face, and the position of the face in the subject image. Not the image of the face but an image of eyes, for example, may be detected (will be detected by the position, the color, etc. of the eyes), to perform the above-mentioned processing on the basis of image data representing the detected image of the eyes.

Furthermore, an area of the detected face image may be displayed on a display screen of the display device 17.

Figure 18:
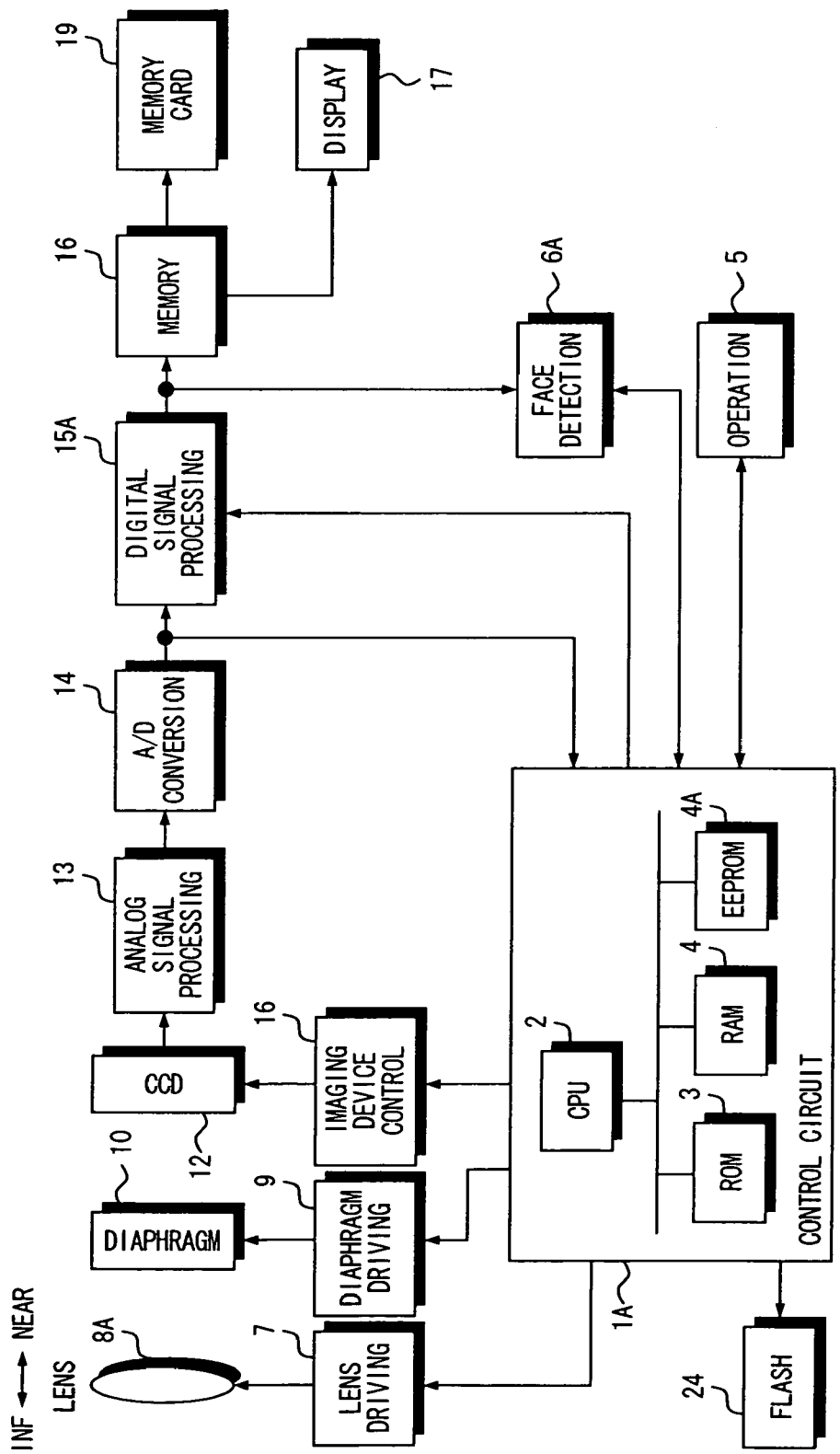
FIG. 18 is a block diagram showing the electrical configuration of a digital still camera.

FIG. 18 is a block diagram showing the electrical configuration of a digital still camera according to another embodiment. In FIG. 18, the same components as those shown in FIG. 1 are assigned the same reference numerals and hence, the description thereof is not repeated.

The digital still camera is provided with a zoom lens 8A. A subject image is formed on a light receiving surface of a CCD 12 by the zoom lens 8A.

Image data outputted from a digital signal processing circuit 15A is inputted to a face detection circuit 6A. In the face detection circuit 6A, a face (a face image portion) is detected from a subject image represented by the inputted image data. Detection result information obtained by the detection is inputted to a control circuit 1A.

The control circuit 1A comprises an EEPROM (electrically erasable programmable read only memory) 4A in addition to a CPU 2, a ROM 3, and a RAM 4, described above. Further, a flash circuit 24 is connected to the control circuit 1A.

Figure 19A:
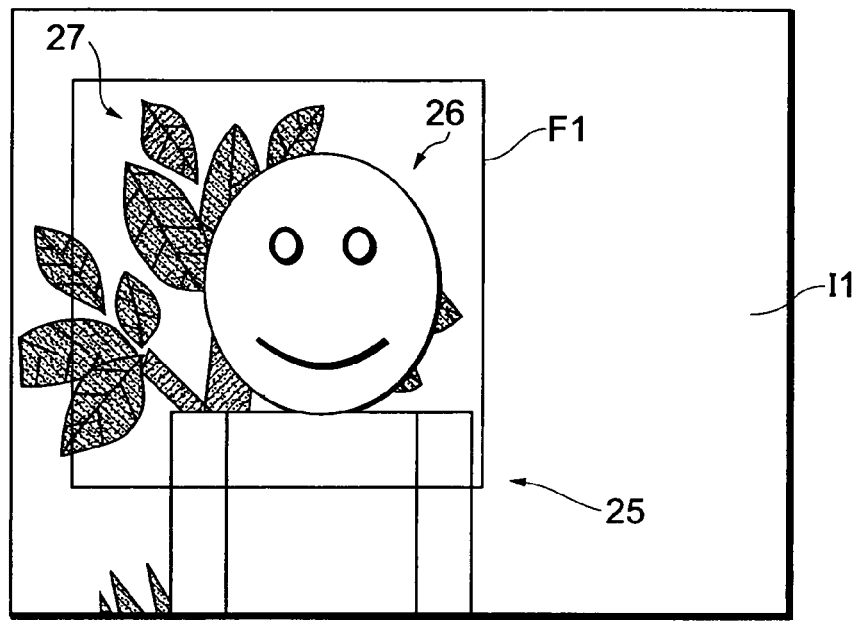
FIGS. 19A and 19B respectively show an example of a subject image and an example of a face detection normalized image.
Figure 19B:
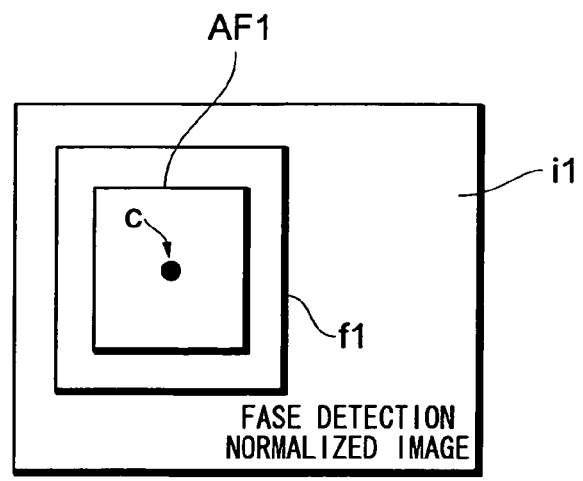

FIG. 19A shows an example of a subject image, and FIG. 19B shows an example of a face detection normalized image.

Referring to FIG. 19A, a subject image I1 includes a person image 25 and a tree image 27. Face detection processing is performed with respect to the subject image I1 so that a portion enclosed by an area F1 in the subject image I1 is detected as a face image portion. Not only a face image portion 26 corresponding to the actual face but also the tree image 27 existing behind a person serving as a subject enters the area F1. Thus, the area F1 does not strictly define only the face image portion 26. When focusing control is carried out such that an image within the area F1 is focused, it may, in some cases, be inaccurate. In the present embodiment, an AF area (an AF object area) utilized for focusing control is determined from the area F1 such that relatively accurate focusing control is carried out. Focusing control is carried out such that an image within the determined AF area is focused.

Referring to FIG. 19B, a face detection normalized image i1 is obtained by normalizing the subject image I1. The subject image I1 is normalized such that the amount of data representing the face detection normalized image i1 is made constant (e.g., 1M byte). In the face detection normalized image i1, an area f1 corresponding to the area F1 detected in the subject image I1 is defined. The area f1 is reduced so that an AF area AF1 is determined. Although the center C of the AF area AF1 coincides with the center of the area f1, they may not always coincide with each other. An AE area AE1 is made smaller than the area f1. Therefore, it could be understood that exposure control is carried out on the basis of an image within the AE area AE1 so that the effect of the tree image 27 is excluded, as described above, and the face image portion is focused.

FIG. 20 shows an example of face detection result information.

Figure 21A:
FIGS. 21A, 21B, and 21C respectively show a leftward face image portion, a front face image portion, and a rightward face image portion.
Figure 21B:
Figure 21C:
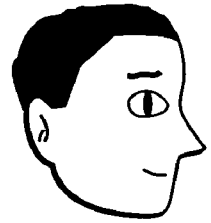

Face detection result information obtained by face detection processing include the number of detected faces (face image portions), and the position, the size, the detection score, the direction, and the inclination of each of the faces. The upper limit is determined for the number of detected faces, and the number up to the determined upper limit becomes detection result information as the number of faces. The position of each of the faces is represented by the center coordinates of the face in a coordinate system of a face detection normalized image. The size of each of the faces is represented by the half of one side of a rectangle of the area f1 detected as a face image portion, that is, the distance between the center of the area f1 and the side of the area f1. The detection score of each of the faces represents an index of the likeness to the face obtained in the face detection processing. The direction of each of the faces indicates which of a leftward image portion, a forward image portion, and a rightward image portion, as respectively shown in FIGS. 21A, 21B, and 21C, is the face image portion. The inclination of each of the faces represents the rotation angle of the face image portion so as to indicate which of a face image portion having an inclination of zero degree (elected), a face image portion having an inclination of 30 degrees, a face image portion having an inclination of 60 degrees, and a face image portion having an inclination of 90 degrees, as respectively shown in FIGS. 22A, 22B, 22C, and 22D, is the face image portion. Although the inclination of each of the faces is represented in units of 30 degrees, for example, it may be represented in a unit other than the unit.

Figure 23:
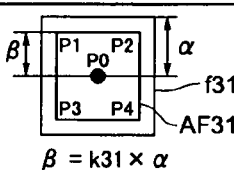
FIG. 23 shows the relationship between an area detected as a face image and an AF area utilized for exposure control.

FIG. 23 shows the relationship between an area detected as a face image and an AF area utilized for exposure control. For easy understanding, a face image portion corresponding to the area detected as the face image is also illustrated.

A case where the direction is zero degree (forward), the direction is 90 degrees (rightward), and the direction is −90 degrees (leftward) is shown separately divided into a case where the inclinations are zero degree, 90 degrees, 180 degrees, and 270 degrees (zero degree or others) and a case where the inclinations are other than zero degree, 90 degrees, 180 degrees, and 270 degrees (other than zero degree or others).

Consider a case where the direction is zero degree and the inclination is zero degree or others, as indicated by a face image portion I31. Letting $\alpha$ be the length of the half of one side of a rectangular area f31 detected as the face image portion, and letting $\beta$ be the length of the half of one side of a rectangular AF area AF31, $\beta = k31 \times \alpha$, where k31 is a constant larger than zero and may be not more than one or not less than one. The coefficient k31 will be determined as a proper value depending on the size of the area f31 detected in face detection processing (the size of a face detection frame used in face detection). When the coordinate positions of the vertexes P1, P2, P3, and P4 of the AF area AF31 are respectively taken as (P1$x$, P1$y$), (P2$x$, P2$y$), (P3$x$, P3$y$), and (P4$x$, P4$y$), and the coordinate position of the center C of the area f31 detected as the face image portion is taken as (P0$x$, P0$y$), P1$x$=P0$x$−$\beta$, P1$y$=P0$y$−$\beta$, P2$x$=P0$x$+$\beta$, P2$y$=P0$y$−$\beta$, P3$x$=P0$x$−$\beta$, P3$y$=P0$y$+$\beta$, P4$x$=P0$x$+$\beta$, and P4$y$=P0$y$+$\beta$.

In a case where the direction is zero degree and the inclination is 30 degrees (−30 degrees), as indicated by a face image portion I32, b=k32×$\alpha$ (k32 is a constant). Letting $\gamma$ be the length of the half of one side of an AF area AF32, when the coordinate positions of the vertexes P1, P2, P3, and P4 of the AF area AF32 are respectively taken as (P1$x$, P1$y$), (P2$x$, P2$y$), (P3$x$, P3$y$), and (P4$x$, P4$y$), and the coordinate position of the center C of an area f32 detected as the face image portion is taken as (P0$x$, P0$y$), P1$x$=P0$x$−$\gamma$, P1$y$=P0$y$−$\gamma$, P2$x$=P0$x$+$\gamma$, P2$y$=P0$y$−$\gamma$, P3$x$=P0$x$−$\gamma$, P3$y$=P0$y$+$\gamma$, P4$x$=P0$x$+$\gamma$, and P4$y$=P0$y$+$\gamma$.

In a case where the direction is 90 degrees (a direction of zero degree or more) and the inclination is zero degree, as indicated by a face image portion I33, an area f33 detected as the face image portion is pentagonal. Letting $\alpha$ be the distance from the center C of the face image portion to the upper side in FIG. 6, letting $\delta$ be the distance from the center of the face image portion to the upper side or the lower side and the left side of a AF area AF33, and letting $\epsilon$ be the distance from the center of the face image portion to the right side of the AF area AF33, $\delta$=k33A×$\alpha$ and $\epsilon$=k33B×$\alpha$ (where k33A and k33B are constants). When the coordinate positions of the vertexes P1, P2, P3, and P4 of the AF area AF33 are respectively taken as (P1$x$, P1$y$), (P2$x$, P2$y$), (P3$x$, P3$y$), and (P4$x$, P4$y$), and the coordinate position of the center C of the area f33 detected as the face image portion is taken as (P0$x$, P0$y$), P1$x$=P0$x$−$\delta$, P1$y$=P0$y$−$\delta$, P2$x$=P0$x$+$\epsilon$, P2$y$=P0$y$−$\delta$, P3$x$=P0$x$−$\delta$, P3$y$=P0$y$+$\delta$, P4$x$=P0$x$+$\epsilon$, and P4$y$=P0$y$+$\delta$. In this case, the face image portion represents a side face. Therefore, the AF area AF33 is shifted leftward such that no background image enters the AF area AF33, so that the center of the AF area AF33 and the center C of the face image portion do not coincide with each other. It goes without saying that they may coincide with each other.

In a case where the direction is 90 degrees and the inclination is 30 degrees (−30 degrees), as indicated by a face image portion I34, an area f34 detected as the face image portion is also pentagonal. Letting $\alpha$ be the distance from the center C of the face image portion to the long sides (sides other than the two short sides) of the area f34, and letting $\zeta$ be the half of one side in a case where the AF area AF34 is made rectangular, $\zeta$=k34$c$×$\alpha$ (where k34 is a constant). When the coordinate positions of the vertexes P1, P2, P3, and P4 of the AF area AF34 are respectively taken as (P1$x$, P1$y$), (P2$x$, P2$y$), (P3$x$, P3$y$), and (P4$x$, P4$y$), and the coordinate position of the center C of the area f34 detected as the face image portion is taken as (P0$x$, P0$y$), P1$x$=P0$x$−$\zeta$, P1$y$=P0$y$−$\zeta$, P2$x$=P0$x$+$\zeta$, P2$y$=P0$y$−$\zeta$, P3$x$=P0$x$−$\zeta$, P3$y$=P0$y$+$\zeta$, P4$x$=P0$x$+$\zeta$, and P4$y$=P0$y$+$\zeta$. Although in FIG. 6, the AF area AF34 is a rectangular, and the direction of each of its sides is a horizontal direction or a vertical direction, it may be inclined in correspondence with the area f34.

In a case where the direction is 90 degrees (a direction of zero degree or more) and the inclination is zero degree, as indicated by a face image portion I35, an area f35 detected as the face image portion is pentagonal. Letting $\alpha$ be the distance from the center C of the face image portion to the upper side in FIG. 6, letting $\delta$ be the distance from the center of the face image portion to the upper side or the lower side and the right side of the AF area AF35, and letting $\epsilon$ be the distance from the center of the face image portion to the left side of the AF area AF35, $\delta$=k35A×$\alpha$ and $\epsilon$=k35B×$\alpha$ (where k33A and k33B are constants). When the coordinate positions of the vertexes P1, P2, P3, and P4 of the AF area AF35 are respectively taken as (P1$x$, P1$y$), (P2$x$, P2$y$), (P3$x$, P3$y$), and (P4$x$, P4$y$), and the coordinate position of the center C of the area f35 detected as the face image portion is taken as (P0$x$, P0$y$), P1$x$=P0$x$−$\epsilon$, P1$y$=P0$y$−$\delta$, P2$x$=P0$x$+$\delta$, P2$y$=P0$y$−$\delta$, P3$x$=P0$x$−$\epsilon$, P3$y$=P0$y$+$\delta$, P4$x$=P0$x$+$\delta$, and P4$y$=P0$y$+$\delta$. In this case, the face image portion represents a side face. Therefore, the AF area AF35 is shifted rightward such that no background image enters the AF area AF35, so that the center of the AF area AF35 and the center C of the face image portion do not coincide with each other. It goes without saying that they may coincide with each other.

In a case where the direction is −90 degrees and the inclination is 30 degrees (−30 degrees), as indicated by a face image portion I36, an area f36 detected as the face image portion is also pentagonal. Letting $\alpha$ be the distance from the center C of the face image portion to the long sides (sides other than the two short sides) of the area f36, and letting $\zeta$ be the half of one side in a case where an AF area AF36 is made rectangular, $\zeta$=k36$c$×$\alpha$(where k36 is a constant). When the coordinate positions of the vertexes P1, P2, P3, and P4 of the AF area AF36 are respectively taken as (P1$x$, P1$y$), (P2$x$, P2$y$), (P3$x$, P3$y$), and (P4$x$, P4$y$), and the coordinate position of the center C of the area f36 detected as the face image portion is taken as (P0$x$, P0$y$), P1$x$=P0$x$−$\zeta$, P1$y$=P0$y$−$\zeta$, P2$x$=P0$x$+$\zeta$, P2$y$=P0$y$−$\zeta$, P3$x$=P0$x$−$\zeta$, P3$y$=P0$y$+$\zeta$, P4$x$=P0$x$+$\zeta$, and P4$y$=P0$y$+$\zeta$. Although in FIG. 6, the AF area AF36 is rectangular, and the direction of each of its sides is a horizontal direction or a vertical direction, it may be inclined in correspondence with the area f36.

In the above-mentioned manner, the AF area AF31 and others used for exposure control are determined from the area f31 and others detected as the face image portion. In a case where the face image portion has the other direction or inclination, the AF area is similarly determined.

Figure 24:
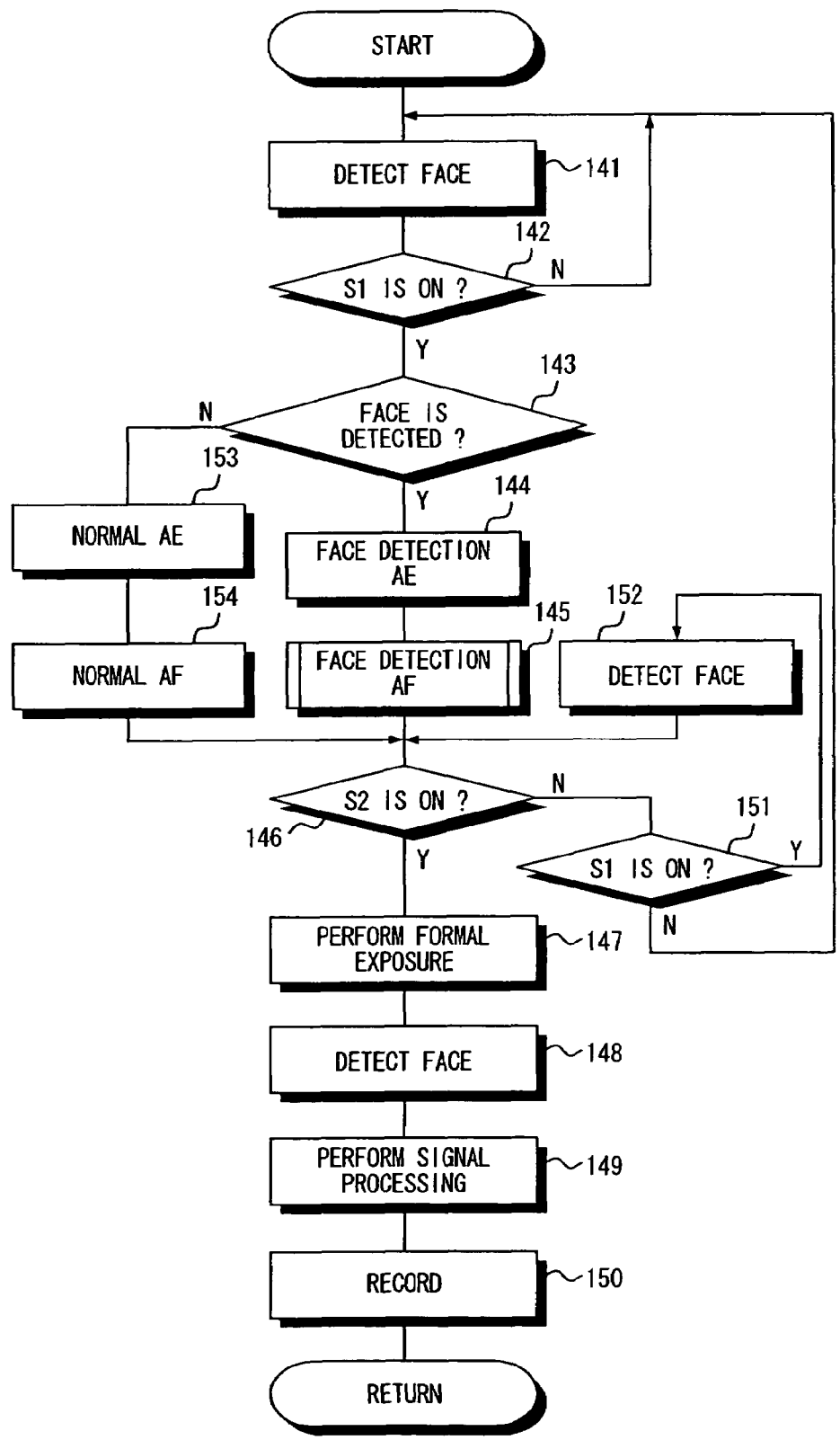
FIG. 24 is a flow chart showing the procedure for processing of a digital still camera.

FIG. 24 is a flow chart showing the procedure for processing of the digital still camera.

When an imaging mode is set, and a subject is imaged, face detection processing for a subject image obtained by the imaging is performed (step 141). When the shutter release button is pressed in the first stage (YES in step 142), it is confirmed whether or not a face image portion is detected by the face detection processing (step 143). When the face image portion is detected (YES in step 143), automatic exposure control (face detection AE) considering the face image portion is carried out (step 144). The face detection AE will be described in detail later. Autofocus control (face detection AF) considering the face image portion is carried out (step 145). Unless the face image portion is detected (NO in step 143), normal AE and AF not considering the face image portion are carried out (steps 153 and 154).

If the shutter release button is not pressed in the second stage (NO in step 146), and the press in the first stage of the shutter release button is still performed (YES in step 151), the face detection processing is performed again (step 152). If the press in the first stage of the shutter release button is released (NO in step 151), the processing in the step 141 and the subsequent steps is repeated again.

When the shutter release button is pressed in the second stage (YES in step 146), formal exposure is performed (step 147). Thereafter, the face image portion is detected again on the basis of image data obtained by the formal exposure (step 148), and signal processing such as color correction is performed such that the detected face image portion becomes a clear image (step 149). Image data that has been subjected to the signal processing is recorded on a memory card (step 150).

Although face detection AF processing is performed depending on the press in the first stage of the shutter release button in FIG. 24, the above-mentioned face detection AF processing can be also performed with respect to an image (a so-called through image) obtained by imaging before the shutter release button is pressed in a case where the imaging mode is set. In a case where the face detection AF processing is performed with respect to the through image, the face detection AF processing will be performed before the shutter release button is pressed.

Figure 25:
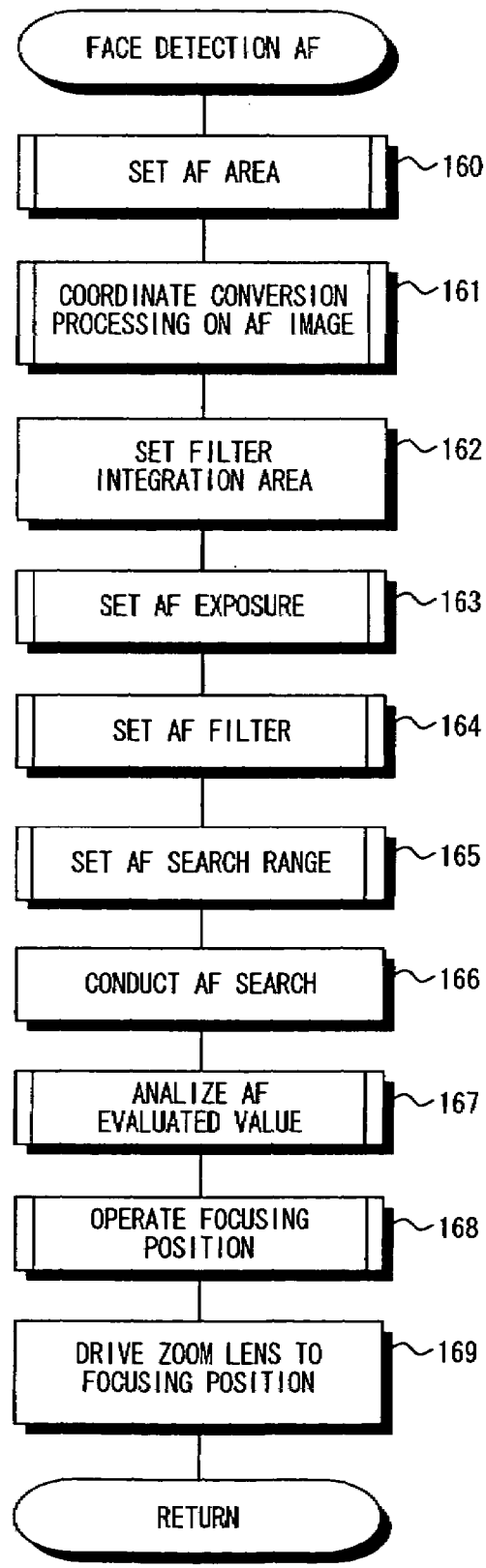
FIG. 25 is a flow chart showing the procedure for face detection AF processing.

FIG. 25 is a flow chart showing the procedure for the face detection AF processing (the procedure for the processing in the step 145 shown in FIG. 24).

An AF area is set in a subject image obtained by imaging or a face detection normalized image (step 160). Consequently, the AF area set in the subject image or the face detection normalized image is coordinate-converted into an AF area on an AF image (step 161). A filter integration area for integrating high-frequency components is set on the AF image on the basis of the AF area obtained by the coordinate-conversion (step 162).

Exposure (AF exposure) in a case where a subject used for focusing control is imaged is set (step 163). A subject image with relatively proper brightness is obtained by the AF exposure, and focusing control can be carried out using the subject image with the proper brightness, so that the subject image can be focused relatively accurately. An AF filter for extracting a high-frequency component from image data obtained by the imaging is set (step 164).

In order to focus the subject image, an AF search range for defining the movement range of a lens constituting the zoom lens 1A is set (step 165), and AF search processing (processing for positioning the lens constituting the zoom lens 1A such that the subject image is focused) is performed in the set AF search range (step 166).

By the AF search processing, the lens constituting the zoom lens 1A is moved a predetermined distance at a time, and the high-frequency component of the image data is extracted for each movement position, to obtain an AF evaluated value. The AF evaluated value thus obtained is analyzed (step 167), and a focusing position (the position of the lens constituting the zoom lens 1A such that the subject image is focused) is operated using the results of the analysis (step 168). The lens constituting the zoom lens 1A is positioned at the operated focusing position (step 169).

Figure 26:
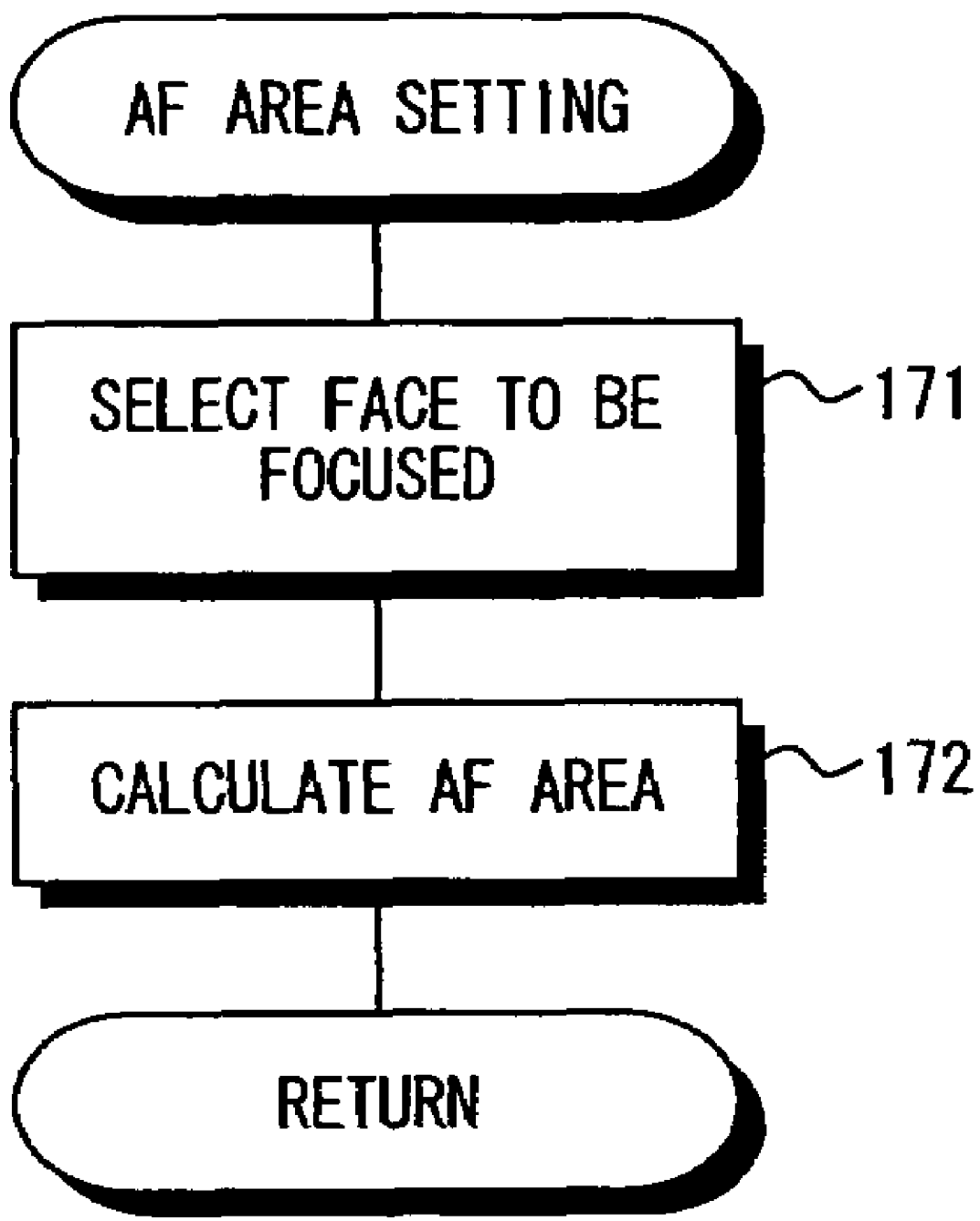
FIG. 26 is a flow chart showing the procedure for AF area setting processing.

FIG. 26 is a flow chart showing the procedure for AF area setting processing (the procedure for the processing in the step 160 shown in FIG. 25).

In a case where there are a plurality of faces, the face to be focused is selected (step 171). When the face is selected, an AF area is calculated in the above-mentioned manner in correspondence with the selected face (step 172). Focusing control is carried out such that an image within the calculated AF area is focused.

When there are a plurality of faces, focusing control may be carried out such that the respective brightnesses of the faces are calculated, the weighted average of the obtained brightnesses is calculated, and the face with the brightness closest to the obtained average is focused. The weighted average will be taken such that the larger the size of the face is, the larger the value of the likeness to the face is, and the shorter the distance from the center of the face is, the larger the weighting amount is made.

Figure 27:
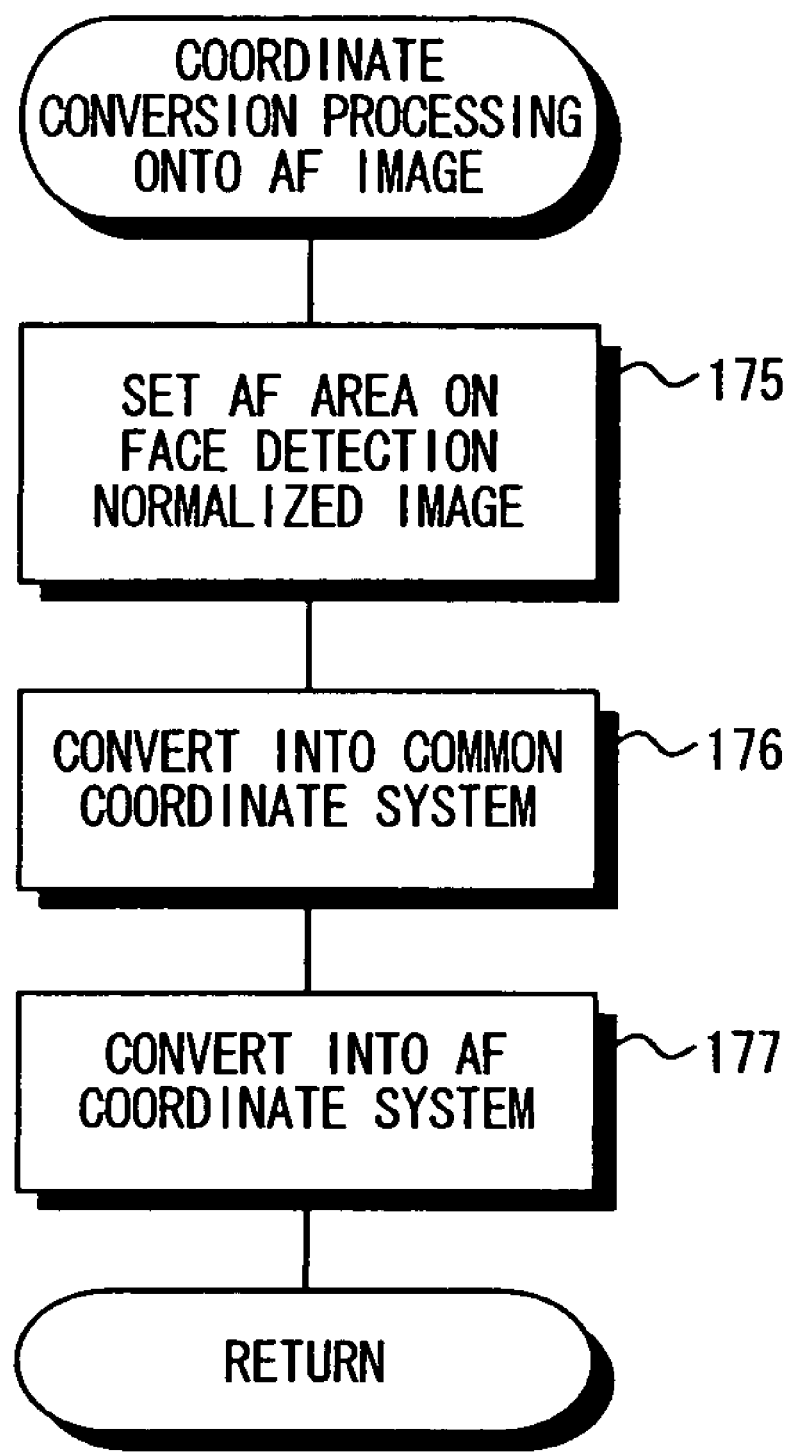
FIG. 27 is a flow chart showing the procedure for coordinate conversion processing.
Figure 28:
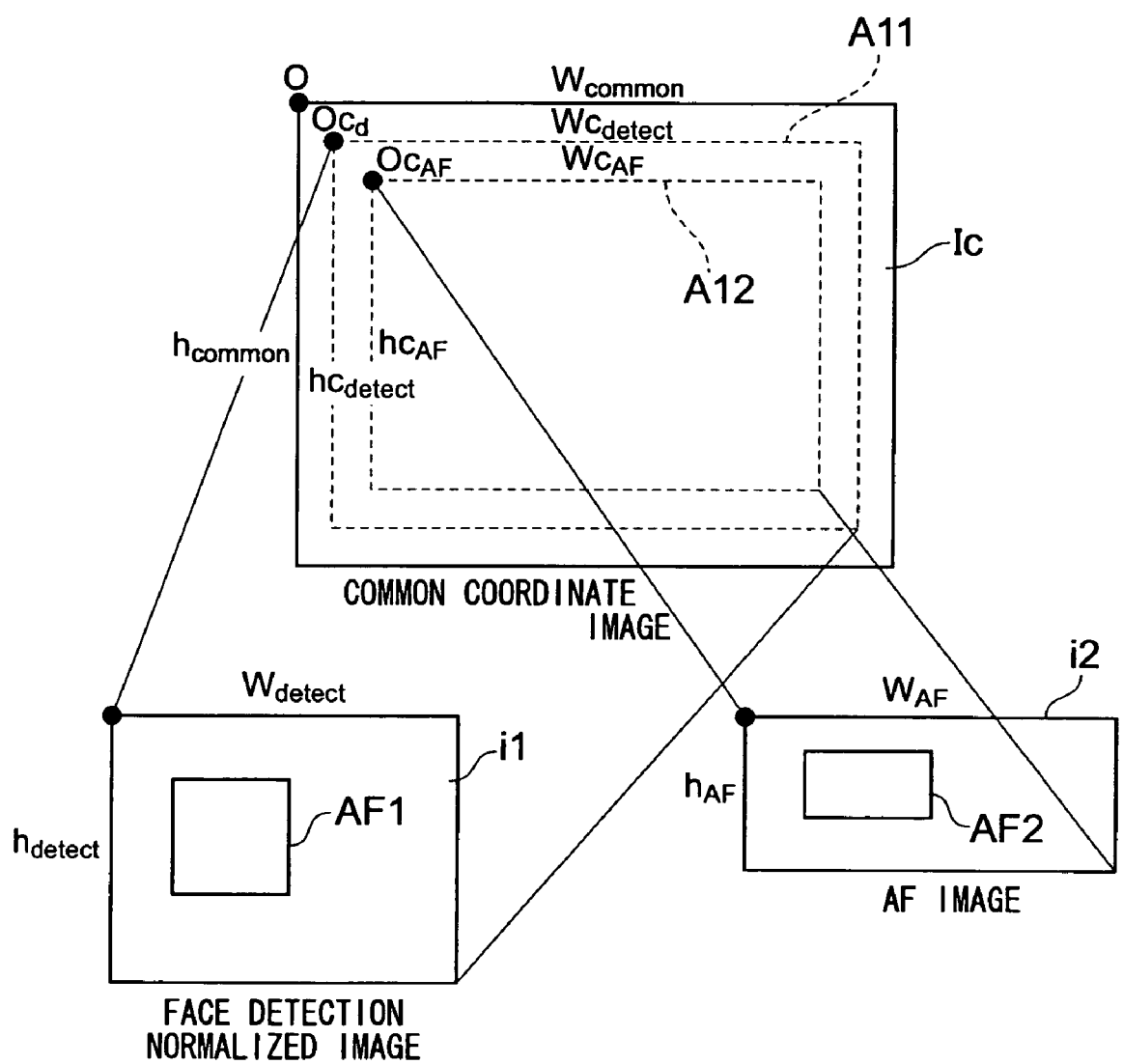
FIG. 28 shows the relationship among a face detection normalized image, a common coordinate image, and an AF image.

FIG. 27 is a flow chart showing coordinate conversion processing onto an AF image (the processing in the step 161 shown in FIG. 25), and FIG. 28 shows how an AF area set on a face detection normalized image is set on the AF image.

First, an AF area AF1 is first set on a face detection normalized image i1 (step 175). Coordinate conversion processing is performed such that the AF area AF1 on the face detection normalized image i1 is set on an image in a common coordinate system (a common coordinate image Ic) (step 176). When the AF area AF1 is set on the common coordinate image Ic, coordinate conversion processing is performed such that an AF area AF2 is set on an AF image i2 (step 177).

Referring to FIG. 28, the AF area AF1 is set on the face detection normalized image i1. It is assumed that the face detection normalized image i1 corresponds to an image portion of an area A11 in the common coordinate image Ic. Consequently, coordinates (xd, yd) on the face detection normalized image are changed into coordinates (xc, yc) on the common coordinate image. Here, $xc=(xd+0.5) \times wc\_detect/wdetect-0.5+oc\_d\_x$, and $yc=(yd+0.5) \times hc\_detect/0.5+oc\_d\_y$. The AF area AF1 is coordinate-converted into an AF area AF1 in a common coordinate system in accordance with the equations.

The AF area AF1 set in the common coordinate system is coordinate-converted into an AF area AF2 in an AF coordinate system. Coordinates (xc, yc) on the common coordinate image are changed into coordinates (xAF, yAF) of an AE image i2. Here, $xAF=(xc-oc\_AF\_x+0.5) \times wAF/wc\_AF-0.5$, and $yAF=(yc-oc\_AF\_y+0.5) \times hAF/hc\_AF-0.5$. The AF area AF1 is set on the AF image i2 in accordance with the equations.

In the foregoing equations, however, Wc_detect indicates the transverse length of the area A1 in the common coordinate image, Wdetect indicates the transverse length of the face detection normalized image, hc_detect indicates the longitudinal length of the area A1 in the common coordinate image, hdetect indicates the longitudinal length of the face detection normalized image, Oc_d_x indicates the x-coordinate of the origin of the area A1, Oc_d_y indicates the y-coordinate of the origin of the area A1, Oc_AF_x indicates the x-coordinate of the origin of the area A2, Oc_AF_y indicates the y-coordinate of the origin of the area A2, wAF indicates the transverse length of the AF image, hAF indicates the longitudinal length of the AF image, wc_AF indicates the transverse length of the area A2, and wc_AF indicates the longitudinal length of the area A2.

If the face detection normalized image and the AF image are in the same coordinate system, it goes without saying that no coordinate conversion processing is required.

Figure 29:
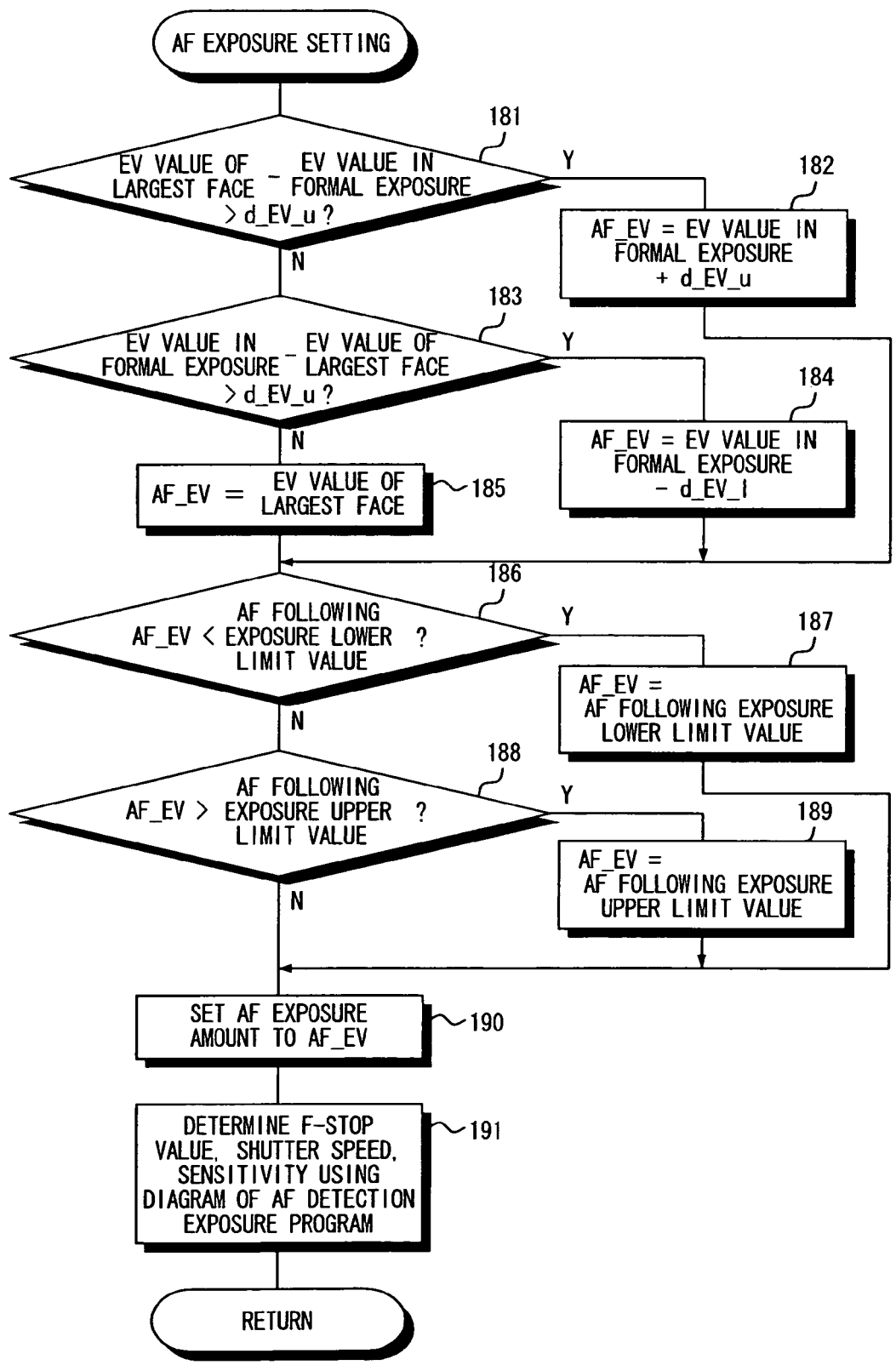
FIG. 29 is a flow chart showing the procedure for AF exposure setting processing.

FIG. 29 is a flow chart showing the procedure for AF exposure setting processing (the procedure for the processing in the step 163 shown in FIG. 25). This processing is for reducing exposure variations during imaging by accommodating the difference between an amount of exposure at the time of formal exposure and an amount of AF exposure within a predetermined range.

As described above, face detection AE is carried out before face detection AF processing, to obtain an EV (Exposure) value in formal exposure. It is confirmed whether or not a first difference value obtained by subtracting the EV value in formal exposure from an EV value of the largest one of detected faces is larger than a predetermined upper-limit value dEVu (step 181).

If the first difference value is larger than the upper-limit value dEVu (YES in step 181), it is considered that they are too spaced apart from each other because the EV value of the largest face is larger than the EV value in formal exposure. Therefore, an AF exposure amount AFEV is temporarily determined to be a value obtained by adding the upper-limit value dEVu to the EV value in formal exposure (step 182).

If the first difference value is less than the upper-limit value dEVu (NO in step 181), a second difference value obtained by subtracting the EV value of the largest face from the EV value in formal exposure is less than a predetermined lower-limit value dEVl (step 183).

If the second difference value is larger than the lower-limit value dEVl (YES in step 183), it is considered that they are too spaced apart from each other because the EV value of the largest face is smaller than the EV value in formal exposure. Therefore, the AF exposure amount AFEV is temporarily determined to be a value obtained by subtracting the lower-limit value dEVl from the EV value in formed exposure (step 184) The AF exposure amount AFEV is accommodated within a predetermined range from the EV value in formal exposure.

If the second difference value is less than the lower-limit value dEVl (NO in step 183), it is considered that the EV value of the largest face is not too spaced apart from the EV value in formal exposure. The EV value of the largest face is temporarily determined to be the AF exposure amount AFEV (step 185).

The limit values dEVu and dEVl can be stored as design parameters in the EEPROM 4A.

It is then confirmed whether or not the AF exposure amount AFEV temporarily determined is within a range in which the AF exposure amount AFEV can be set.

First, it is confirmed whether or not the AF exposure amount temporarily determined is less than an AF following exposure lower-limit value that is a settable minimum value (step 186). If it is less than the AF following exposure lower-limit value (YES in step 186), the AF exposure amount AFEV is determined to be the AF following exposure lower-limit value (step 187).

If the AF exposure amount temporarily determined is not less than the AF following exposure lower-limit value (NO in step 186), it is confirmed whether or not the AF exposure amount is more than an AF following exposure upper-limit value that is a settable maximum value (step 188). If it is more than the AF following exposure upper-limit value (YES in step 188), the AF exposure amount AFEV is determined to be the AF following exposure upper-limit value (step 189).

If the AF exposure amount AFEV temporarily determined is between the AF following exposure upper-limit value and the AF following exposure lower-limit value (NO in both steps 186 and 188), the determined AF exposure amount AFEV is set (stored) (step 190). An f-stop value, a shutter speed, and sensitivity are determined using a diagram of an AF detection exposure program (step 191).

Although in the above-mentioned embodiment, AF exposure setting processing is performed using the EV value of the largest face, AF exposure setting processing may be performed using EV values of the faces determined in descending order of priorities, for example, the EV value of the face having the strongest likeness to the face and the EV value of the face closest to the center.

Figure 30A:
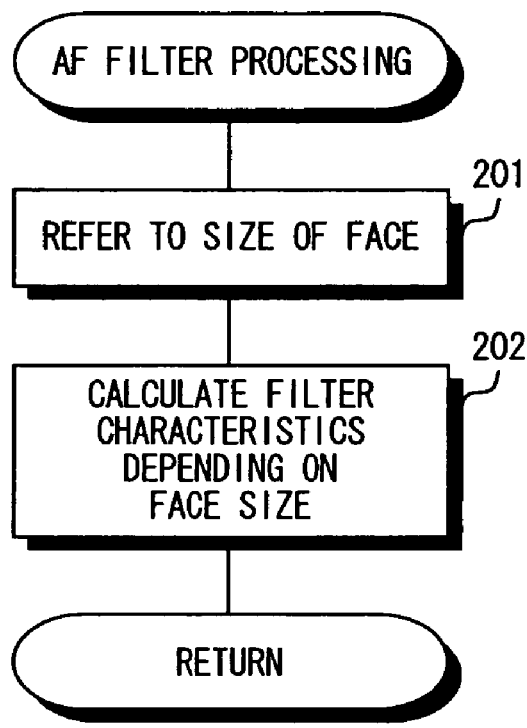
FIGS. 30A and 30B are respectively flow charts showing the procedure for AF filter setting processing.
Figure 30B:
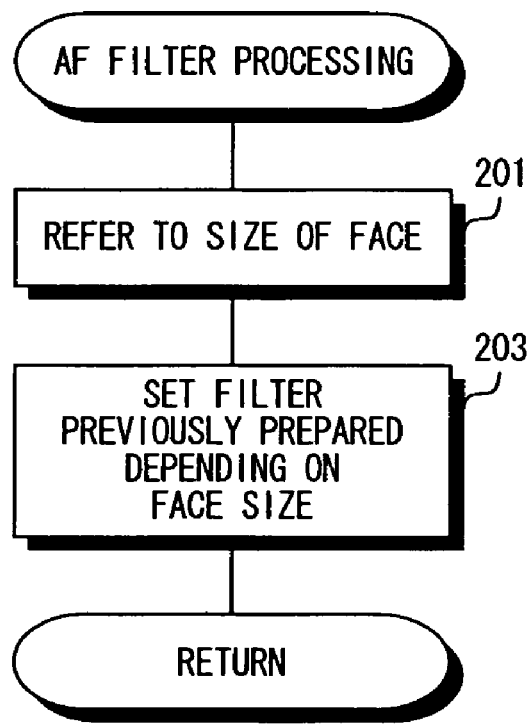

FIGS. 30A and 30B are flow charts showing the procedure for AF filter setting processing (the procedure for the processing in the step 164 shown in FIG. 25).

FIG. 30A shows processing in a case where filter characteristics can be arbitrarily set. The size of the face already selected is referred to (step 201), and the filter characteristics are calculated depending on the face size referred to (step 202). The calculated filter characteristics are set in a digital filter.

FIG. 30B shows processing in a case where filter characteristics are previously determined depending on the size of the face. As in FIG. 30A, the size already selected is referred to (step 201), and the filter characteristics are set depending on to the face size referred to out of the filter characteristics already determined (step 203).

Although the digital filter can be realized by operating the CPU 2 by software, it goes without saying that it may be realized by hardware.

Figure 31:
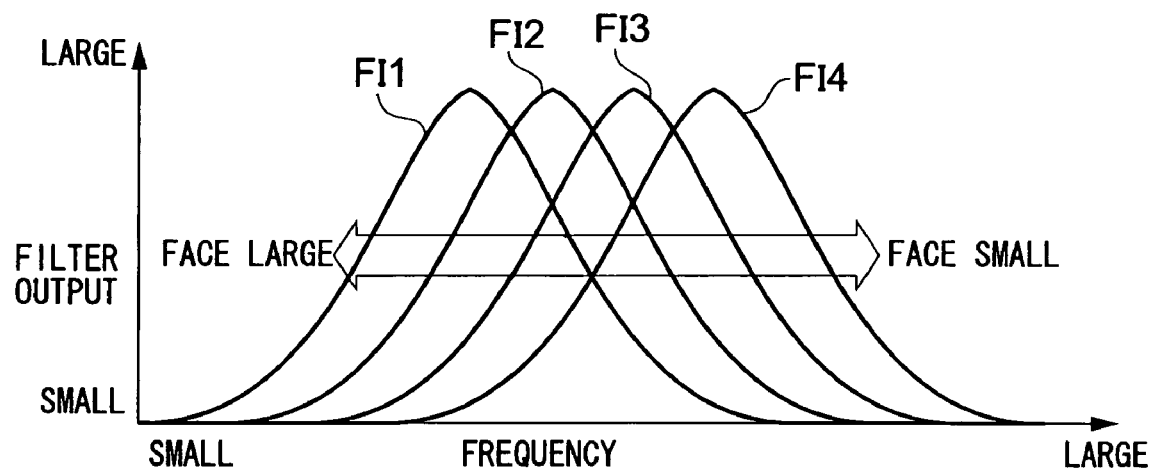
FIGS. 31 and 32 show the characteristics of a filter.

FIG. 31 shows the filter characteristics of a band-pass filter.

Four filter characteristics FI1 to FI4 are defined. A high-frequency component that can be passed increases from the filter characteristics FI1 to the filter characteristics FI4. As described above, it is considered that the larger the face size referred to is, the smaller the number of high-frequency components of a subject image is. Therefore, such characteristics FI1, FI2, etc. that the high-frequency component that can be passed become relatively low are set in the digital filter. Conversely, it is considered that the smaller the face size is, the larger the number of high-frequency components of a subject image is. Therefore, such characteristics FI3, FI4, etc. that the high-frequency component that can be passed become relatively high are set in the digital filter.

Figure 32:
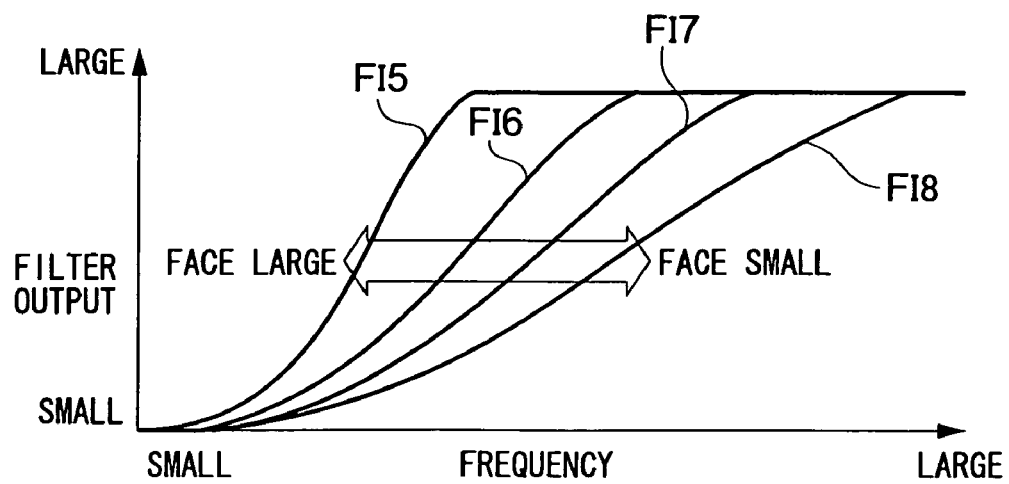

FIG. 32 show the filter characteristics of a high-pass filter.

Four filter characteristics FI5 to FI8 are defined. A frequency band that can be passed increases from the filter characteristics FI5 to the filter characteristics FI8. Such characteristics FI5, FI6, etc. that the larger the face size is, the lower the frequency band that can be passed relatively becomes are set in the digital filter and such characteristics FI7, FI8, etc. that the smaller the face size is, the larger the high-frequency component that can be passed relatively becomes are set in the digital filter, as in the above-mentioned band-pass filter.

Figure 33:
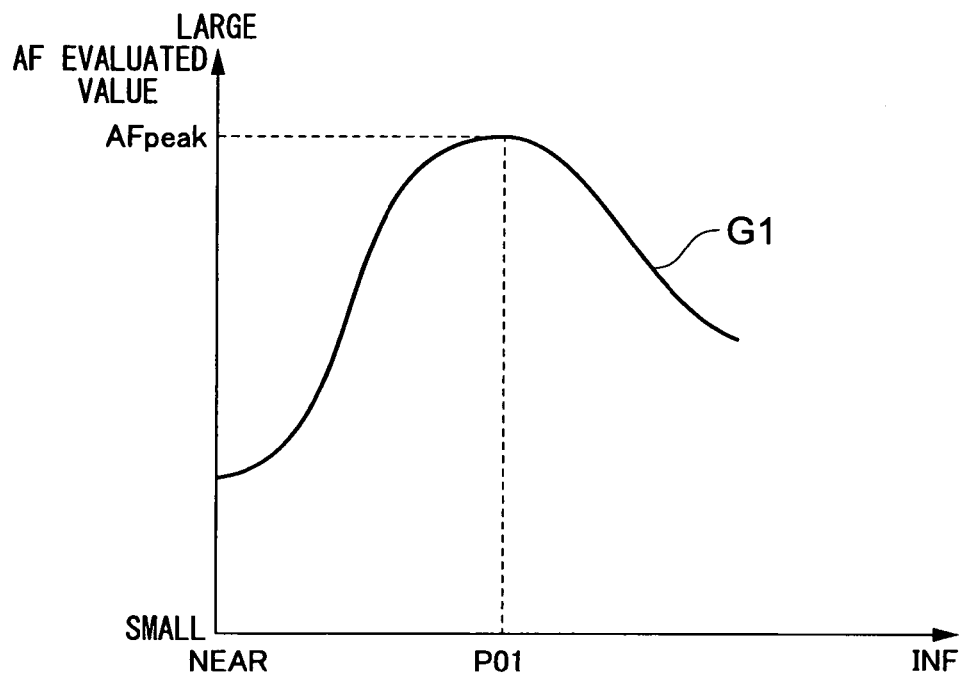
FIGS. 33 and 34 show the relationship between an AF evaluated value and a focus lens.
Figure 34:
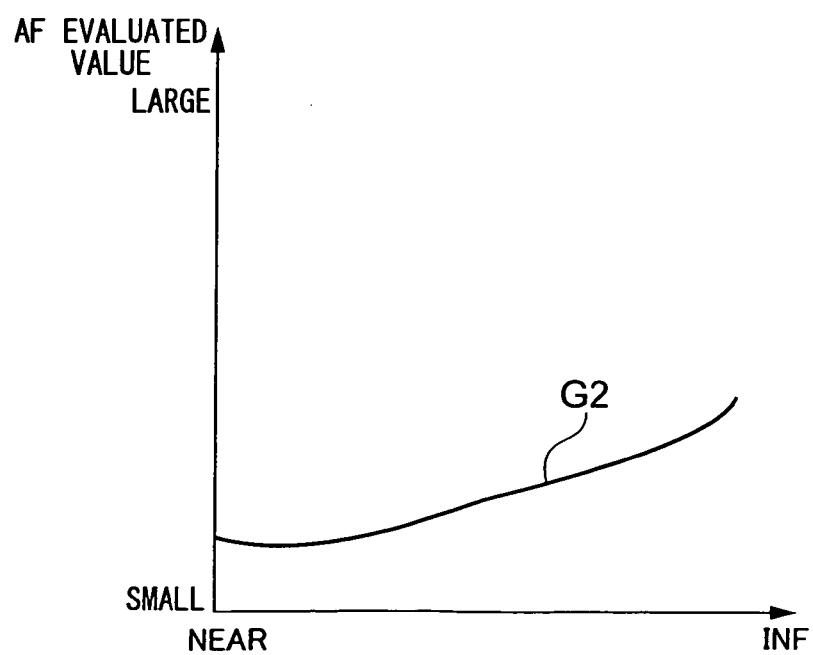

FIGS. 33 and 34 respectively show examples of the relationship between the position of an imaging lens constituting the zoom lens 8 and an AF evaluated value obtained from the position.

Referring to FIG. 33, the imaging lens is moved a predetermined distance at a time from the NEAR side to the INF side, so that a subject is imaged for each movement position. A high-frequency component of image data obtained by the imaging is obtained, and an AF evaluated value is calculated from the obtained high-frequency component. The AF evaluated value is calculated while the imaging lens is being moved from the NEAR side to the INF side, to obtain a graph G1.

In the graph G1, the AF evaluated value gradually increases as the imaging lens moves from the NEAR side to the INF side, and reaches its maximum AFpeak when the imaging lens is at a position PO1. Further, when the imaging lens moves toward the INF side, the AF evaluated value gradually decreases. In the example shown in FIG. 33, it is thus considered that the peak value AFpeak of the AF evaluated value exists.

Similarly in FIG. 34, a graph G1 representing the relationship between the position of the imaging lens and the AF evaluated value is obtained. However, as the imaging lens moves from the NEAR side to the INF side, the AF evaluated value merely increases, so that there exists no portion where the transition from increase to decrease occurs. In such a case, it is assumed that no peak exists in the AF evaluated value.

Figure 35:
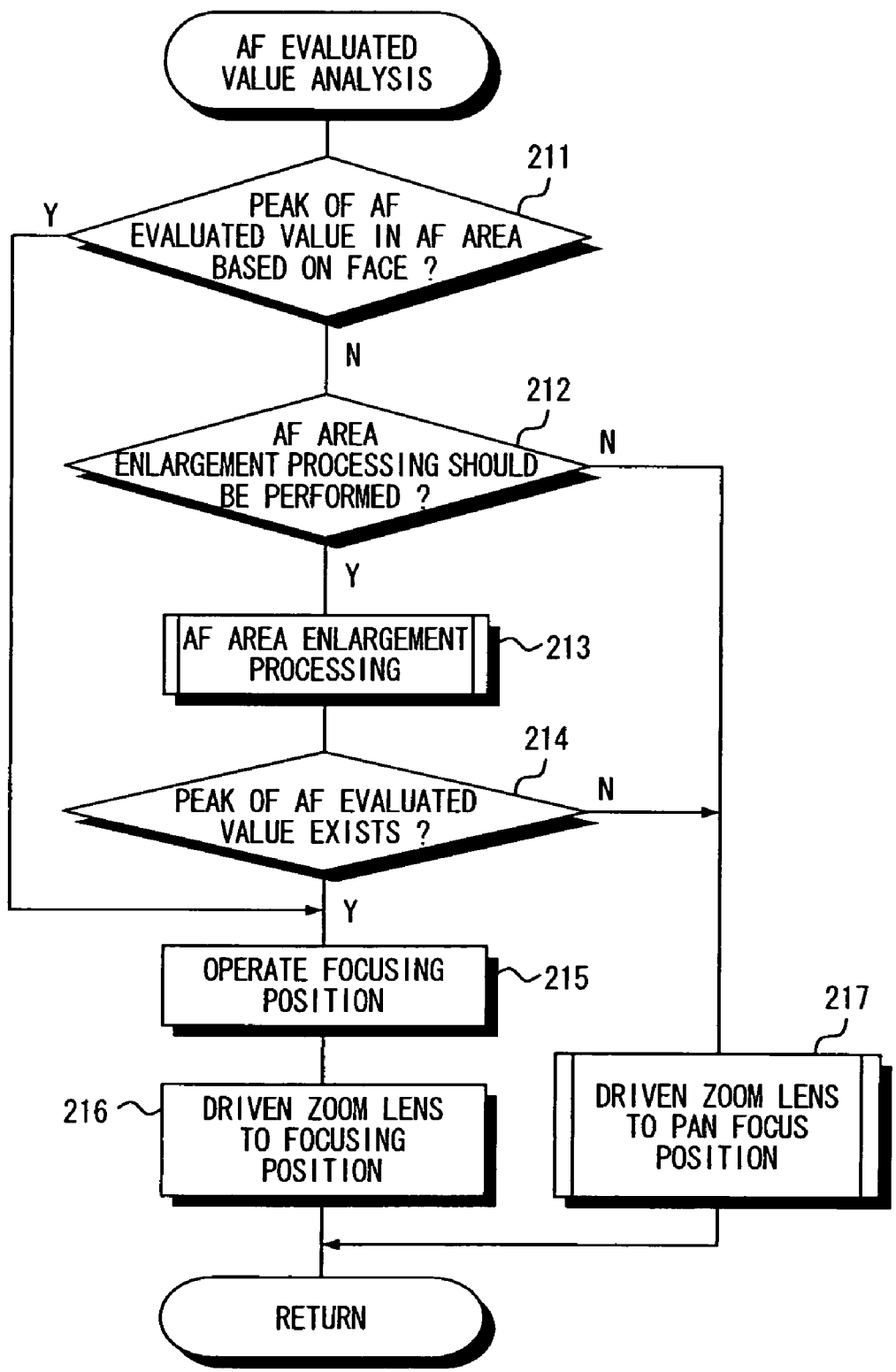
FIGS. 35 and 36 are respectively flow charts showing the procedure for AF evaluated value analysis processing.

FIG. 35 is a flow chart showing the procedure for AF evaluated value analysis processing (the procedure for the processing in the step 167 shown in FIG. 25).

This processing is for enlarging, in a case where no peak exists in an AF evaluated value obtained from an AF area corresponding to a face image portion (in a case as shown in FIG. 34), the AF area to not only the face image portion but also a body image portion.

It is confirmed whether or not a peak exists in an AF evaluated value obtained on the basis of an AF area determined on the basis of a face (step 211).

If there is no peak in the AF area (NO in step 211), it is determined whether or not processing for enlarging the AF area should be performed (step 212). Determination whether or not the AF area enlargement processing should be performed will be based on setting previously performed. In a case where the AF area enlargement processing is performed (YES in step 212), the AF area enlargement processing is performed (step 212). The AF area enlargement processing will be described in detail later. The AF evaluated value is obtained, as described above, on the basis of the enlarged AF area.

If a peak exists in an AF evaluated value newly obtained (YES in step 214), or a peak exists in the AF evaluated value obtained from the AF area set on the basis of the face (YES in step 211), a focusing position is operated on the basis of the peak of the obtained AF evaluated value (step 215). The zoom lens is driven so as to be at the obtained focusing position (step 216).

If the AF area enlargement processing cannot be performed (NO in step 212), or no peak exists in the AF evaluated value obtained from the enlarged AF area (NO in step 214), the zoom lens is driven so as to be at a pan focus position (step 217).

Figure 36:
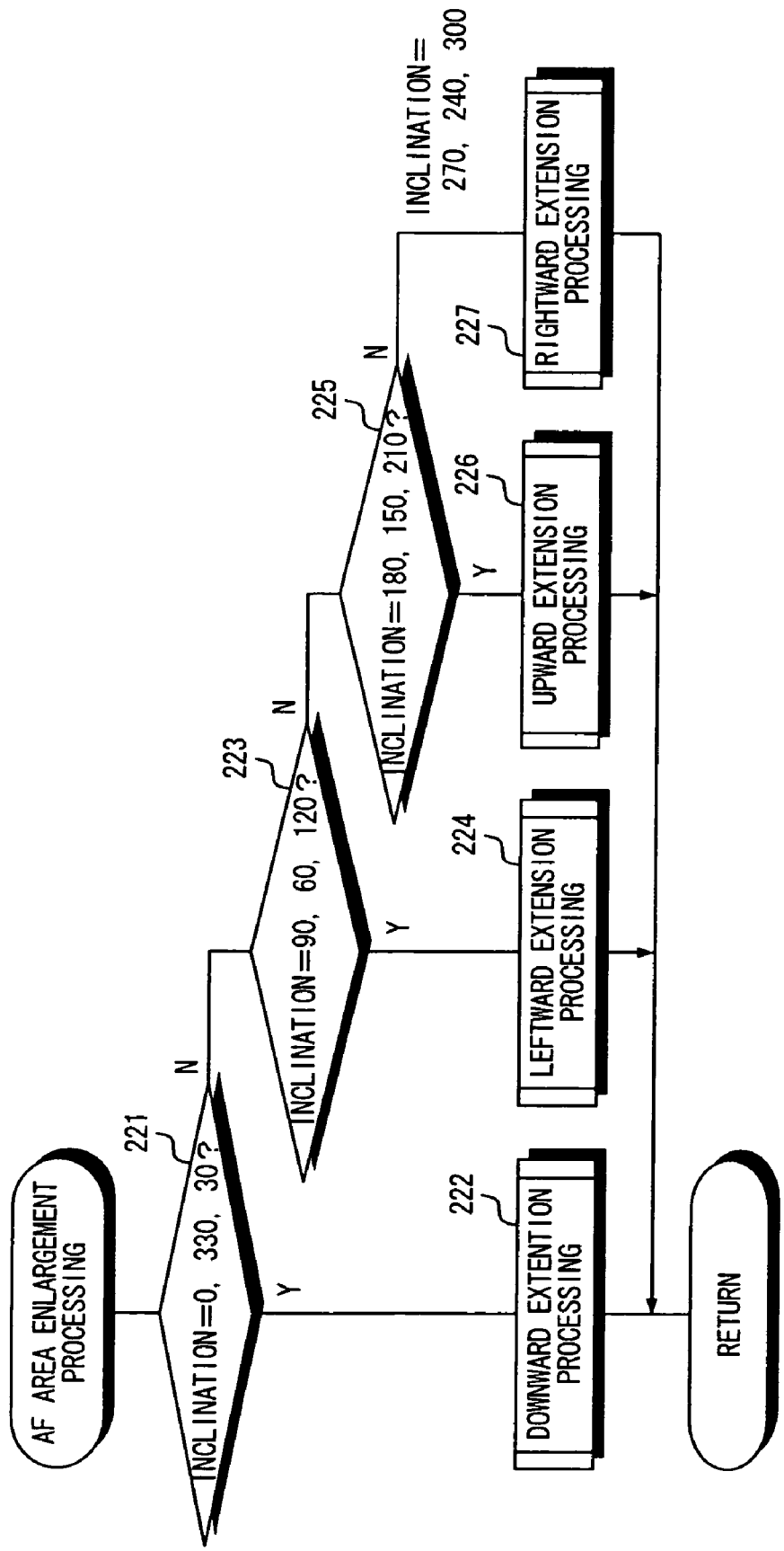

FIG. 36 is a flow chart showing the procedure for AF area enlargement processing (the procedure for the processing in the step 213 shown in FIG. 35).

The positional relationship between a face and a body also varies depending on the inclination of a detected face (selected face), so that the direction of enlargement varies depending on the inclination in the AF area enlargement processing.

In a case where the inclination of the face is zero degree, 330 degrees, or 30 degree (YES in step 221), it is considered that the face is elected or almost elected when a camera is held at a reference position, so that it is considered that the body is positioned below the face (see FIG. 37A). Therefore, downward extension processing for enlarging an AF area downward is performed (step 222).

Figure 37B:
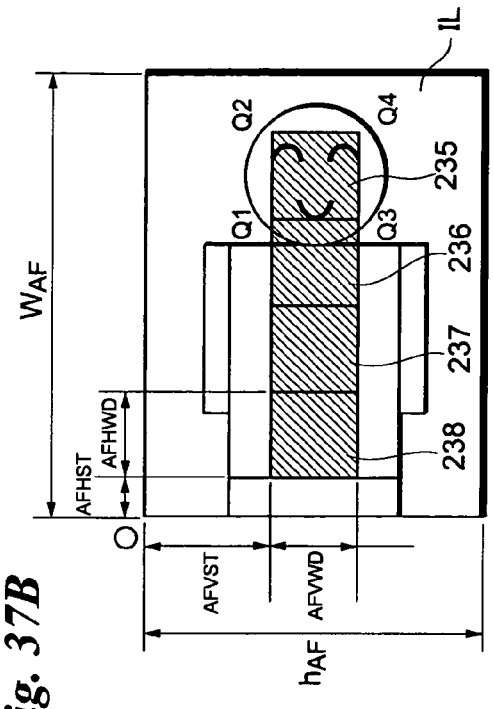
FIGS. 37A to 37D show the relationship between a subject image and an AF area.

In a case where the inclination of the face is 90 degrees, 60 degrees, or 120 degree (NO in step 221, and YES in step 223), it is considered that the face is inclined at 90 degrees or approximately 90 degrees when a camera is held at a reference position, so that it is considered that the body is positioned at the left of the face when an image obtained at the reference position is arranged in the same direction as the reference position (see FIG. 37B). Therefore, leftward extension processing for enlarging an AF area leftward is performed (step 224).

Figure 37D:
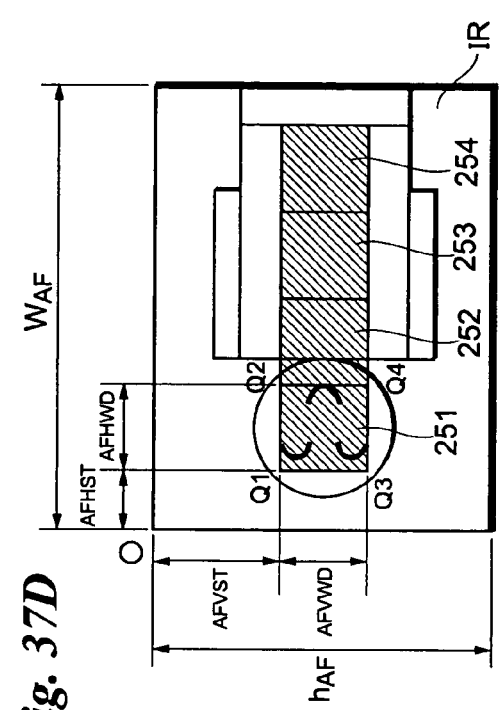
Figure 37A:
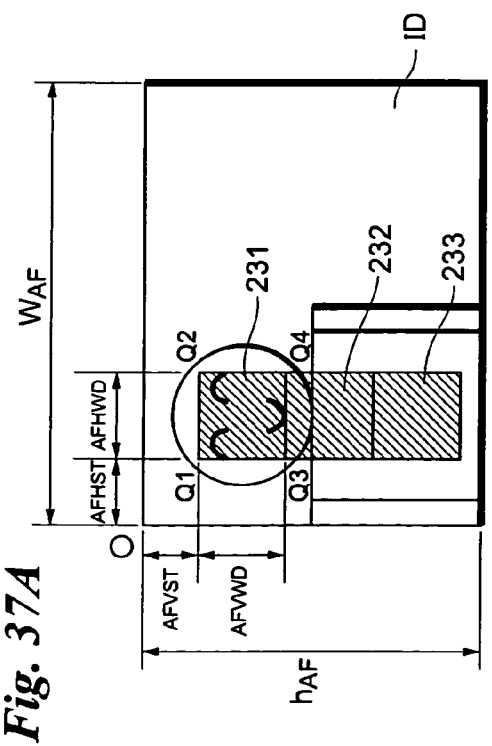
Figure 37C:
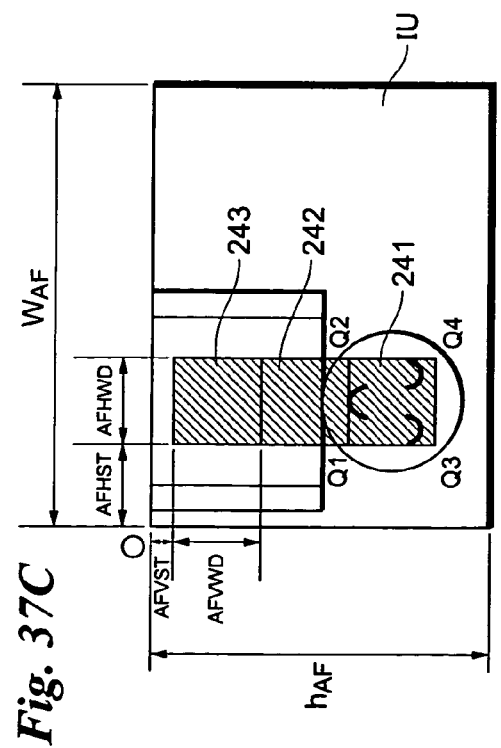

In a case where the inclination of the face is 180 degrees, 150 degrees, or 210 degrees (NO in step 223, and YES in step 225), it is similarly considered that the face is inverted or almost inverted, so that it is considered that the body is positioned above the face in an image at a reference position (see FIG. 37C). Therefore, upward extension processing for enlarging an AF area upward is performed (step 226).

In a case where the inclination of the face is 270 degrees, 240 degrees, or 300 degrees (NO in step 225), it is similarly considered that the face is positioned at the right of the face in an image at a reference position (see FIG. 37D). Therefore, rightward extension processing for enlarging an AF area rightward is performed (step 227).

FIGS. 37A to 37D respectively show examples of a subject image.

A subject image ID shown in FIG. 37A is obtained by imaging with a camera held at a reference position. A subject image IL shown in FIG. 37B is obtained by imaging with the camera held at a position rotated through 90 degrees rightward (or leftward) from the reference position. A subject image IU shown in FIG. 37C is obtained by imaging with the camera inverted (rotated through 180 degrees) from the reference position. A subject image IR shown in FIG. 37D is obtained by imaging with the camera held at a position rotated through 90 degrees leftward (rightward) from the reference position. The subject images IL to IR respectively arranged at horizontally long positions, as shown in FIGS. 37B to 37D, are referred to as reference position images, similarly to the subject image ID obtained by imaging with the camera held at the reference position, as shown in FIG. 37A. AF enlargement processing is performed in the reference position images ID to IR. The reference position images ID to IR are illustrated, letting wAF and hAF be respectively the width and the height thereof.

An AF area 231 shown in FIG. 37A, an AF area 235 shown in FIG. 37B, an AF area 241 shown in FIG. 37C, and an AF area 251 shown in FIG. 37D are determined on the basis of the face, as described above. The respective vertexes at the upper left, upper right, lower left, and lower right of each of the AF areas 231, 235, 241, and 251 in the reference position images ID, IL, IU, and IR are indicated by Q1, Q2, Q3, and Q4, and upper, lower, left, and right positional relationships in the reference position images ID, IL, IU, and IR respectively correspond to upper, lower, left, and right positional relationships in the AF areas 231, 235, 241, and 251.

In the reference position images ID, IL, IU, and IR, enlarged AF areas 232, 233, 234, 236, 237, 238, 242, 243, 252, 253, and 254 are also illustrated in addition to the AF areas 231, 235, 241, and 251 determined on the basis of the face. The widths AFHWD and the heights AFVWD of the respective AF areas are equal to each other. When the respective upper left vertexes of the reference position images ID, IL, IU, and IR are taken as origins O, the X-coordinate and the Y-coordinate of a position closest to the origin O in each of the AF areas 231, 235, 241, and 251 determined on the basis of the face and the enlarged AF area 233 and others are respectively indicated by AFHST and AFVST.

Referring to FIG. 37A, in the case of the reference position image ID, when no peak exists in an AF evaluated value obtained from the AF area 231 determined on the basis of the face, peak detection processing is performed using AF evaluated values obtained from the area 232 and 233 below the AF area 231, as described above.

Referring to FIG. 37B, in the case of the reference position image IL, when no peak exists in an AF evaluated value obtained from the AF area 235 determined on the basis of the face, peak detection processing is performed using AF evaluated values obtained from the areas 236, 237, and 238 at the left of the AF area 235, as described above.

Referring to FIG. 37C, in the case of the reference position image IU, when no peak exists in an AF evaluated value obtained from the AF area 241 determined on the basis of the face, peak detection processing is performed using AF evaluated values obtained from the areas 243 and 244 above the AF area 241, as described above.

Referring to FIG. 37D, in the case of the reference position image IR, when no peak exists in an AF evaluated value obtained from the AF area 251 determined on the basis of the face, peak detection processing is performed using AF evaluated values obtained from the areas 252, 253, and 254 below the AF area 251, as described above.

However, the AF evaluated value is not calculated from the AF area 232 or the like enlarged by driving the zoom lens again when no peak exists in the AF evaluated value obtained from the AF area 231 or the like determined on the basis of the face, and the AF evaluated value obtained from the AF area 232 or the like enlarged when the AF evaluated value is calculated from the AF area 231 or the like determined on the basis of the face is simultaneously calculated. In a case where no peak exists in the AF area 231 or the like determined on the basis of the face, therefore, the zoom lens need not be driven again, so that the AF evaluated values can be quickly obtained from all the enlarged AF areas 232 and others.

FIG. 38 shows a plurality of items used for the AF area enlargement processing and ways of calculating the items for each processing (downward extension processing, leftward extension processing, upper extension processing, or rightward extension processing).

As described above, processing for enlarging the AF area varies for each face inclination Inplane. When the X-coordinates and Y-coordinates of the vertexes Q1, Q2, Q3, and Q4 of one of the AF areas determined on the basis of the face are respectively taken as (Q1$x$, Q1$y$), (Q2$x$, Q2$y$), (Q3$x$, Q3$y$), and (Q4$x$, Q4$y$), the width AFHWD of the AF area is indicated by Q2$x$−Q1$x$, and the height AFVWD of the AF area is indicated by Q3$y$−Q1$y$.

A horizontal starting point calculation variable Kx and a vertical starting point calculation variable Ky that are used for extracting high-frequency components within all the AF areas so as to calculate the AF evaluated values from all the AF areas (both the AF areas determined on the basis of the face and the enlarged AF areas) are respectively indicated by INT (Q1$x$/AFHWD) and INT(Q3$y$/AFVWD) (INT indicates an integer). Further, a horizontal starting point AFHST in the AF area at which extraction of the high-frequency component is started (the X-coordinate of a point closest to the origin O of the reference position image in a case where all the AF areas are considered, as described above) is indicated by Q1$x$−Kx×AFHWD, and a vertical starting point AFVST (the Y-coordinate of a point closest to the origin O of the reference position image in a case where all the AF areas are considered) is indicated by Q1$y$−Ky×AFVWD.

Furthermore, the respective numbers of AF areas that can be enlarged in the reference position images ID to IR differ depending on the sizes of the reference position images ID to IR and the positions of the AF area 231 and others determined on the basis of the face. A horizontal area calculation variable Nx for calculating the number of AF areas is expressed by INT{(wAF−AFHST)/AFHWD}+1, and a vertical area calculation variable Ny is expressed by INT{(hAF−AFVST)/AFVWD}+1. Out of all the AF areas, the number of AF areas Hnum in the horizontal direction and the number of AF areas Vnum in the vertical direction are determined depending on the contents of processing using the variables Nx and Ny. In the downward extension processing, the leftward extension processing, the upward extension processing, and the rightward extension processing, the numbers of areas in the horizontal direction are respectively 1, Nx, 1, and Nx, and the numbers of areas in the vertical direction are respectively Ny, 1, Ny, and 1.

Furthermore, an integration area arrangement Area for defining the AF areas for calculating the AF evaluated values is indicated by Area[Hnum][Vnum]. A face area AF evaluated value FaceAFvalue is indicated by Area[0] [0], Area[Nx−1] [0], Area[0] [Ny−1] and Area[0] [0], respectively, in the downward extension processing, the leftward extension processing, the upward extension processing, and the rightward extension processing.

Figure 39:
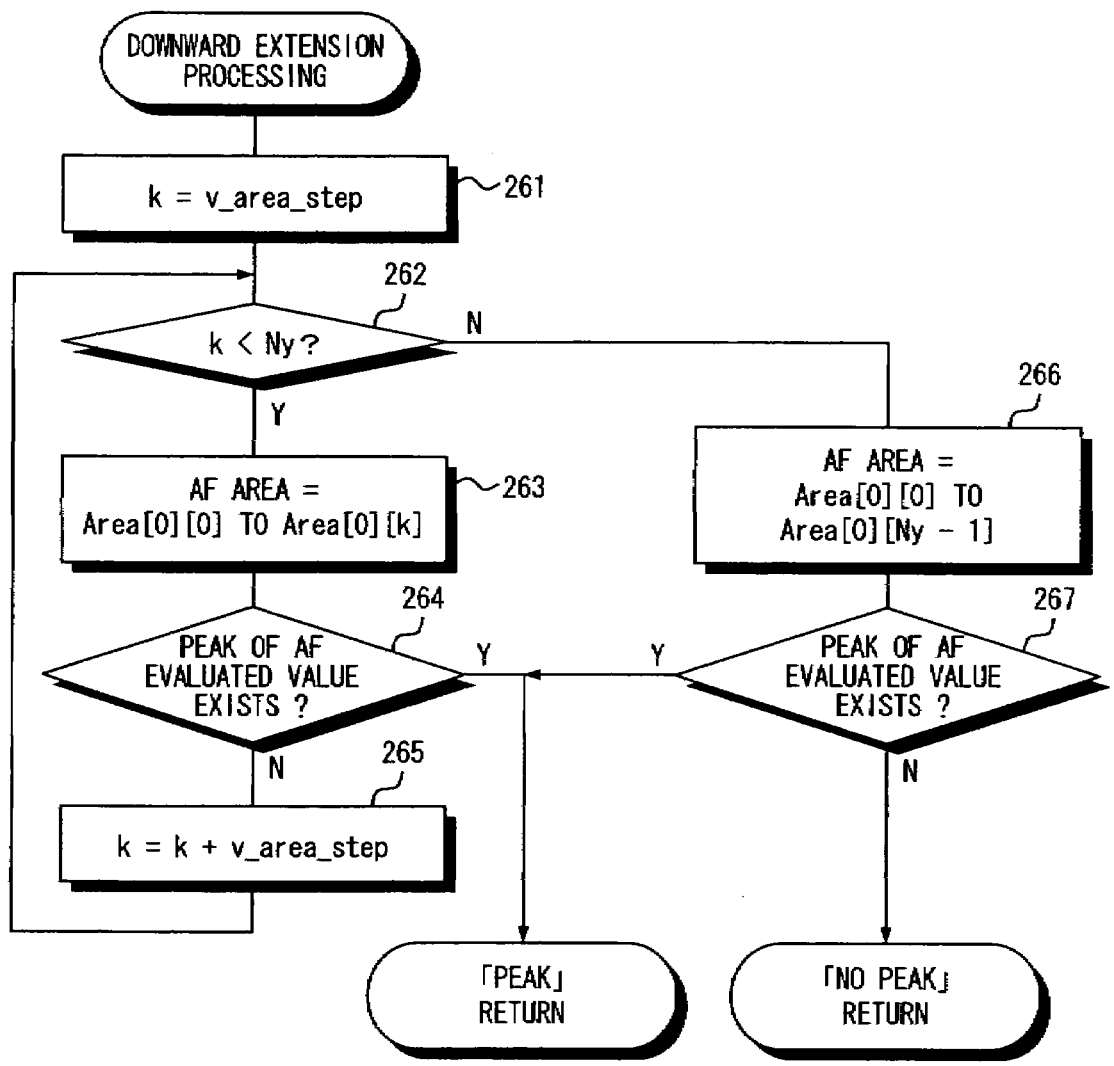
FIG. 39 is a flow chart showing the procedure for downward extension processing.
Figure 40A:
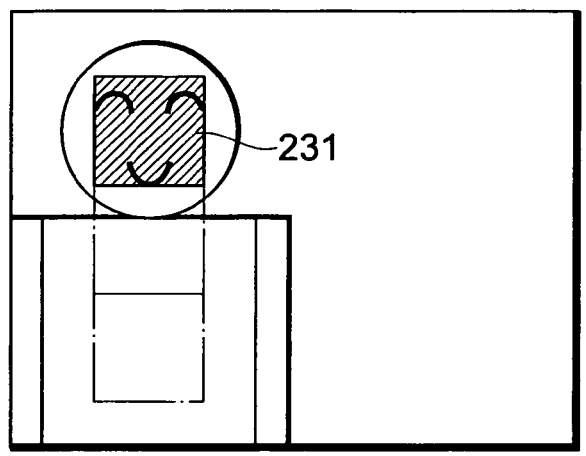
FIGS. 40A to 40C show an example of a subject image.
Figure 40B:
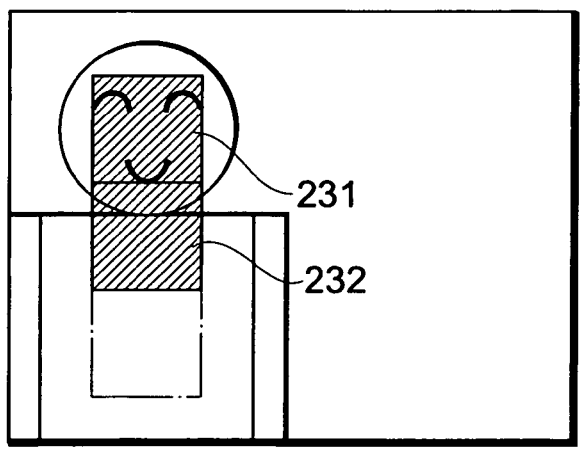
Figure 40C:
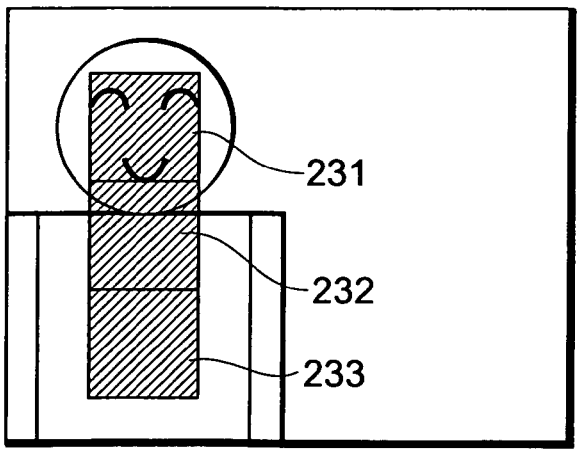

FIG. 39 is a flow chart showing the procedure for downward extension processing (the procedure for the processing in the step 222 shown in FIG. 36), and FIGS. 40A, 40B, and 40C show how an AF area used for detecting the peak of an AF evaluated value is enlarged. When a high-frequency component is extracted from the AF area 231 based on the face, as described above, high-frequency components are also extracted from the enlarged AF areas 232 and 233, and a zoom lens is not driven again after the AF areas are enlarged.

The number of steps vareastep for determining the number of AF areas to be enlarged in the vertical direction is set to a predetermined variable k (step 261). When the variable k is not less than the vertical area calculation variable Ny, it is considered that the number of AF areas that can be enlarged reaches a limit.

If the variable k is less than the vertical area calculation variable Ny (YES in step 262), even the AF area determined by the variable k is enlarged (step 263). If there is a peak in the AF evaluated value obtained from the enlarged AF area (YES in step 264), the downward extension processing is terminated. If there is no peak in the AF evaluated value obtained from the enlarged AF area (NO in step 264), the number of enlarged areas is increased by the number of steps vareastep (step 265), and processing for detecting the peak of the AF evaluated value is performed again.

When the variable k is not less than the vertical area calculation variable Ny (NO in step 262), it is confirmed whether or not a peak exists in the AF evaluated value obtained from the AF area defined by the vertical area calculation variable Ny (step 267).

The focusing position is operated, as described above, and the zoom lens is driven so as to be focused when the peak is detected, while the zoom lens is driven to the pan focus position when the peak is not detected (see FIGS. 216 and 217 in FIG. 35).

Such downward extension processing allows the peak to be detected on the basis of the AF evaluated values obtained from the AF areas 232 and 233 enlarged as shown in FIGS. 40B and 40C from the AF area 231 based on the face shown in FIG. 40A.

Figure 41:
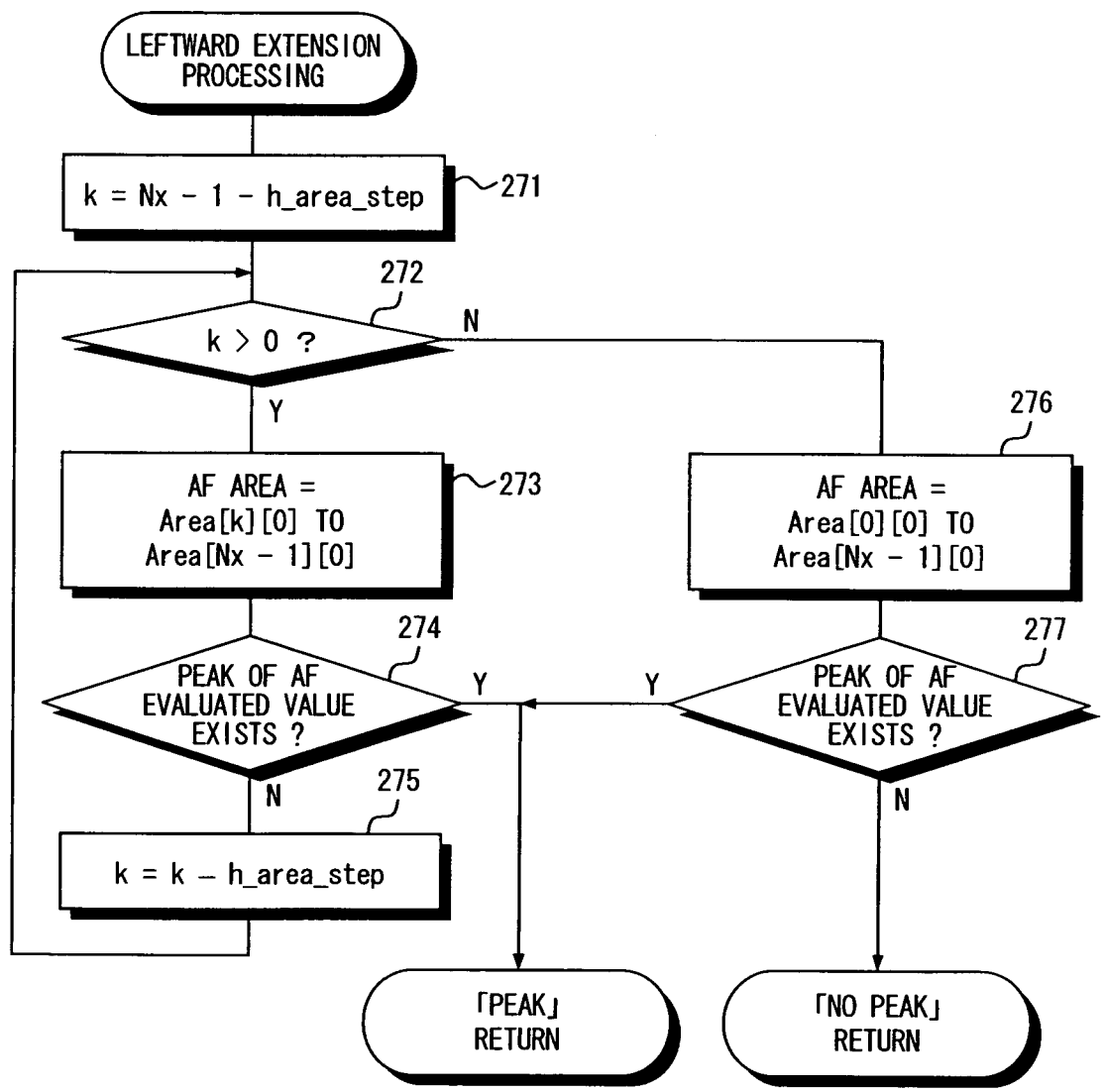
FIG. 41 is a flow chart showing the procedure for leftward extension processing.
Figure 42A:
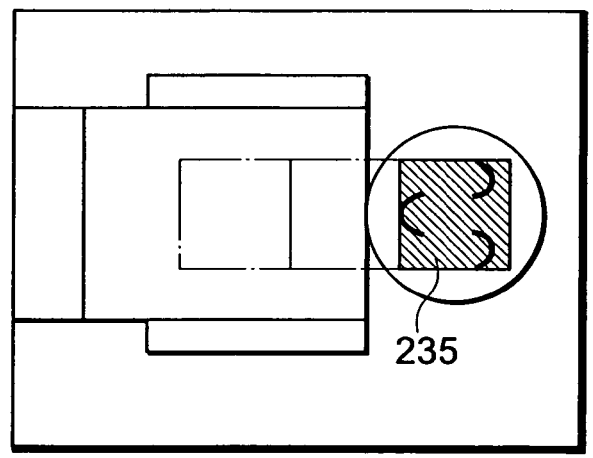
FIGS. 42A to 42C respectively show examples of a subject image.
Figure 42B:
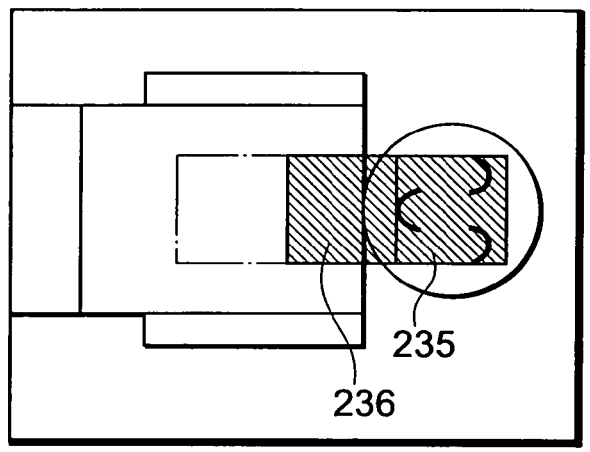
Figure 42C:
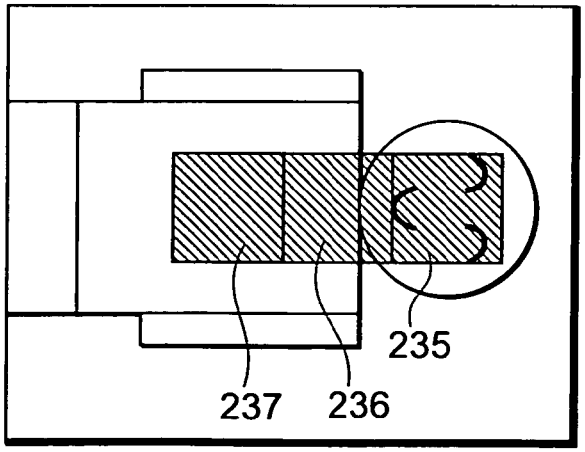

FIG. 41 is a flow chart showing the procedure for leftward extension processing (the procedure for the processing in the step 224 shown in FIG. 36), and FIGS. 42A, 42B, and 42C show how an AF area used for detecting the peak of an AF evaluated value is enlarged.

An AF area is enlarged leftward because of the leftward extension processing. Therefore, a predetermined variable k is set to a value obtained by subtracting one and the number of steps hareastep for determining the number of AF areas to be enlarged in the horizontal direction from the horizontal area calculation variable Nx (step 271). When the variable k is not less than the horizontal area calculation variable Nx, it is considered that the number of AF areas that can be enlarged reaches a limit.

If the variable k is more than zero (YES in step 272), even the AF area determined by the variable k is enlarged (step 273). If there is a peak in the AF evaluated value obtained from the enlarged AF area (YES in step 274), the leftward extension processing is terminated. If there is no peak in the AF evaluated value obtained from the enlarged AF area (NO in step 274), the number of enlarged areas is reduced by the number of steps hareastep because of the leftward extension processing, and processing for detecting the peak of the AF evaluated value is performed again.

When the variable k is not more than zero (NO in step 272), it is confirmed whether or not a peak exists in the AF evaluated value obtained from the AF area defined by the horizontal area calculation variable Nx (step 277).

Such leftward extension processing allows the peak to be detected on the basis of the AF evaluated values obtained from the AF areas 236 and 238 enlarged as shown in FIGS. 42B and 42C from the AF area 235 based on the face shown in FIG. 42A.

Figure 43:
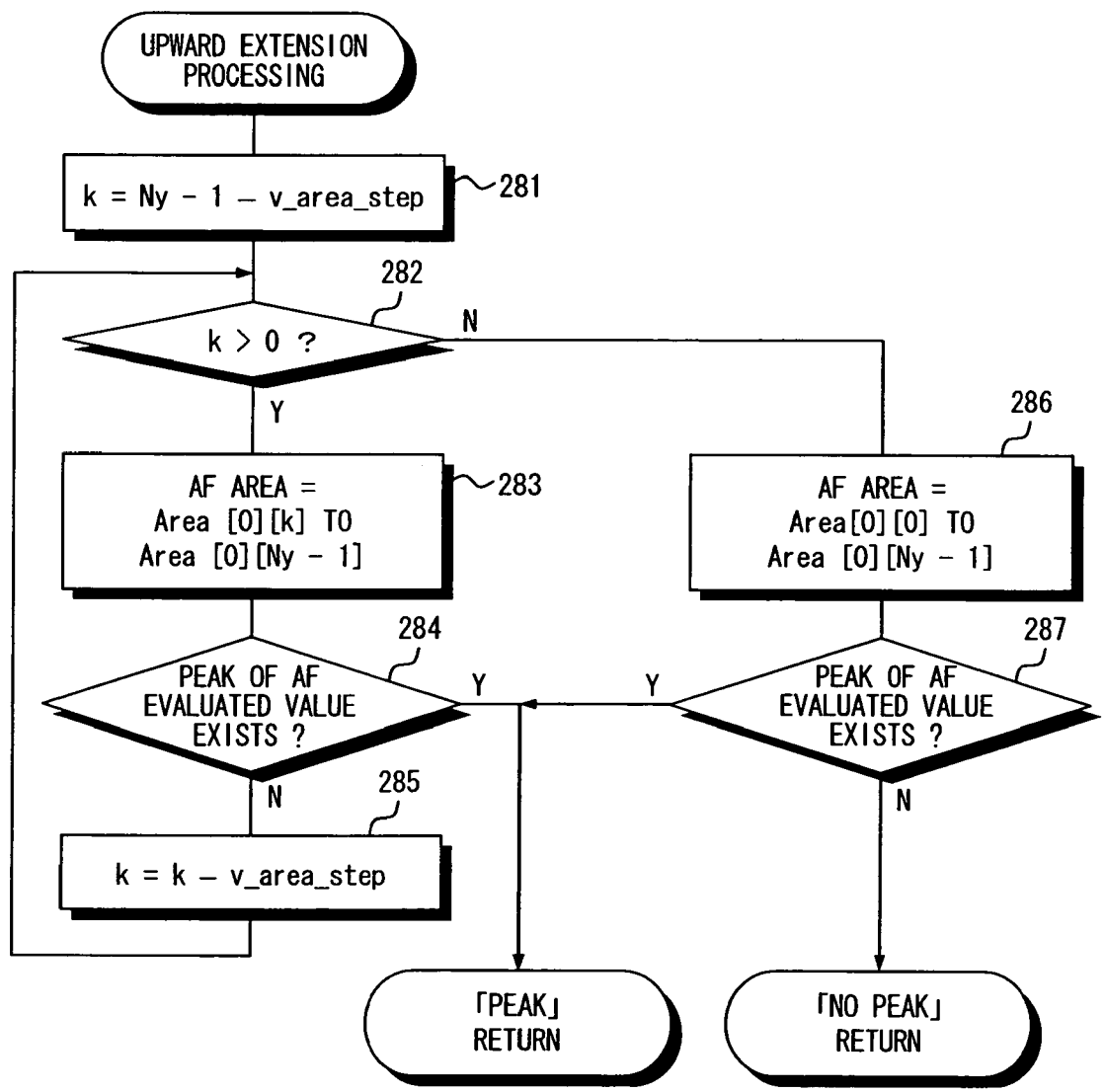
FIG. 43 is a flow chart showing the procedure for upward extension processing.
Figure 44A:
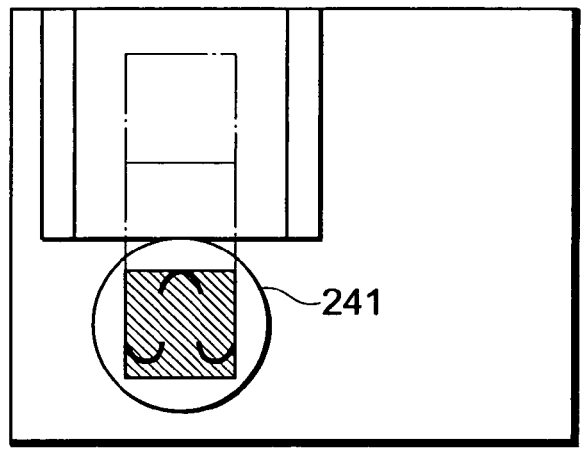
FIGS. 44A to 44C respectively show examples of a subject image.
Figure 44B:
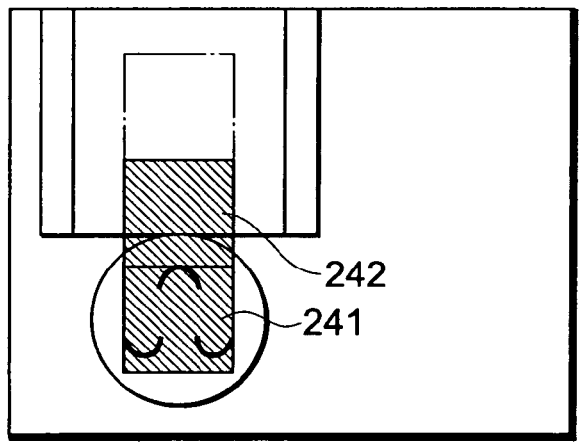
Figure 44C:
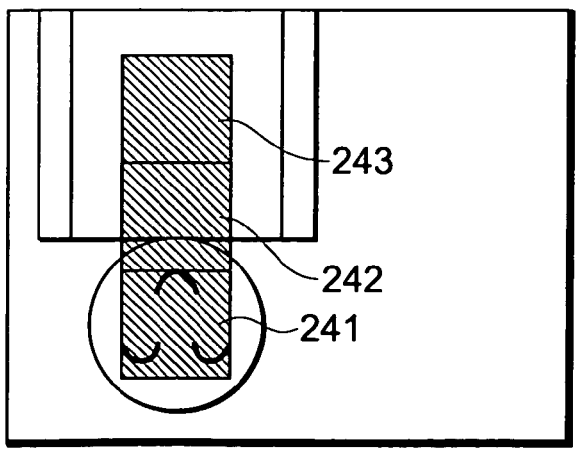

FIG. 43 is a flow chart showing the procedure for upward extension processing (the procedure for the processing in the step 226 shown in FIG. 36), and FIGS. 44A, 44B, and 44C show how an AF area used for detecting the peak of an AF evaluated value is enlarged.

An AF area is enlarged upward from below because of the upward extension processing. Therefore, a predetermined variable k is set by subtracting one and the number of steps vareastep for determining the number of AF areas to be enlarged in the vertical direction from the vertical area calculation variable Ny (step 281). When the variable k is not more than zero, it is considered that the number of AF areas that can be enlarged reaches a limit.

If the variable k is more than zero (YES in step 282), even the AF area determined by the variable k is enlarged (step 283). If there is a peak in the AF evaluated value obtained from the enlarged AF area (YES in step 284), the upward extension processing is terminated. If there is no peak in the AF evaluated value obtained from the enlarged AF area (No in step 284), the number of steps vareastep is subtracted from the variable k so that the number of enlarged areas is increased by the number of steps vareastep (step 285), and processing for detecting the peak of the AF evaluated value is performed again.

When the variable k is not less than zero (NO in step 282), it is confirmed whether or not a peak exists in the AF evaluated value obtained from the AF area defined by the vertical area calculation variable Ny (step 287).

Such upward extension processing allows the peak to be detected on the basis of the AF evaluated values obtained from the AF areas 242 and 243 enlarged as shown in FIGS. 44B and 44C from the AF area 241 based on the face shown in FIG. 44A.

Figure 45:
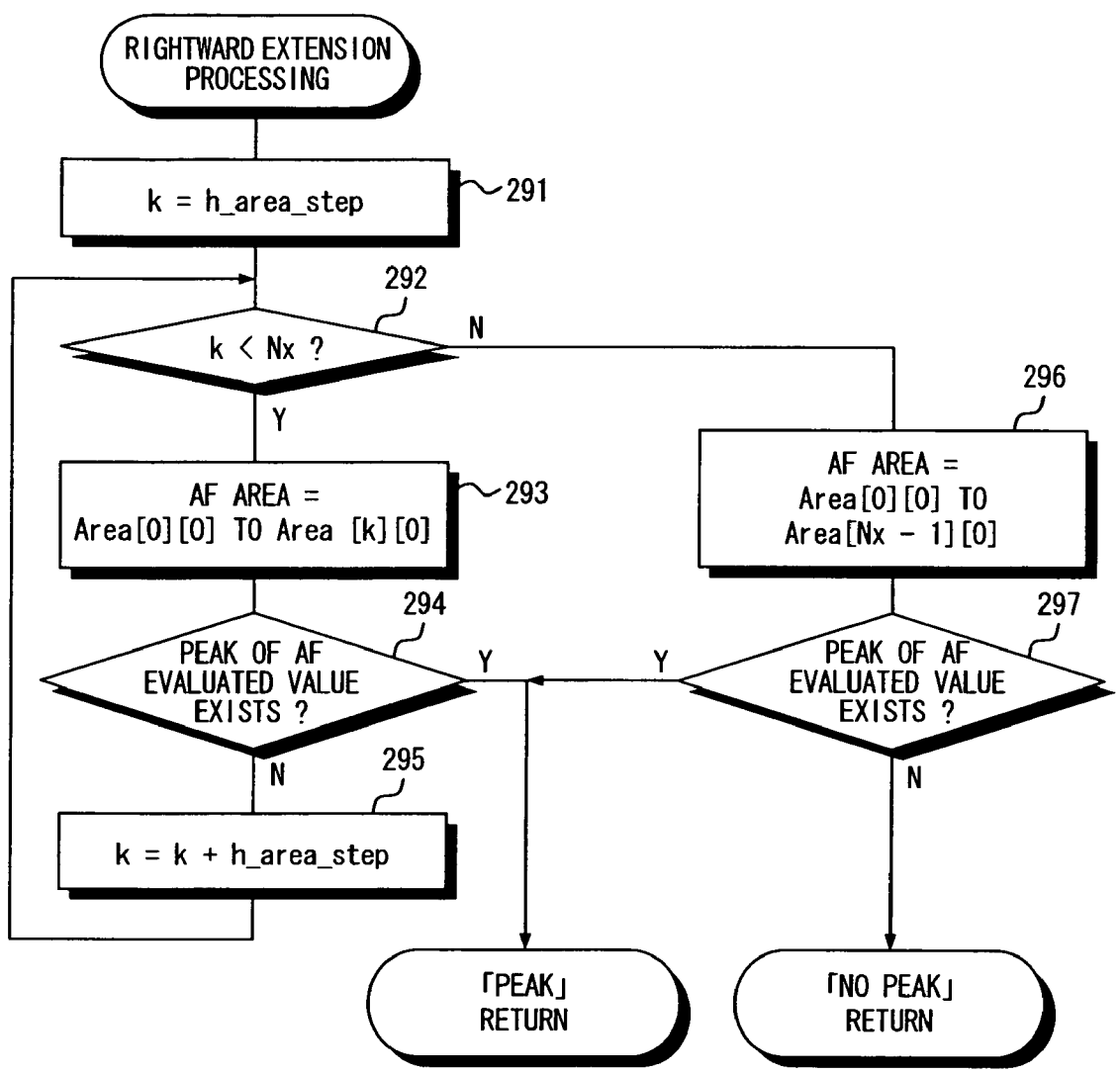
FIG. 45 is a flow chart showing the procedure for rightward extension processing.
Figure 46A:
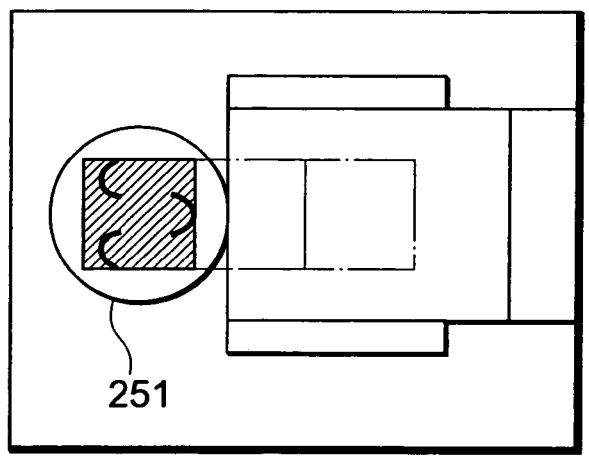
FIGS. 46A to 46C respectively show examples of a subject image.
Figure 46B:
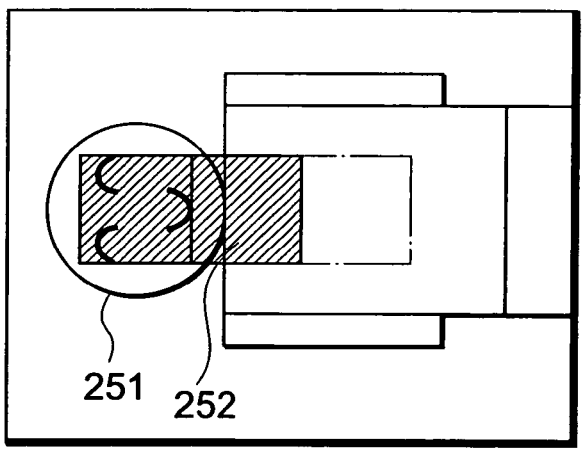
Figure 46C:
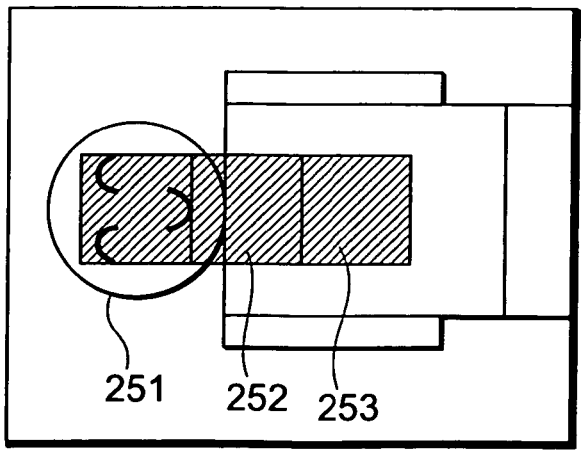

FIG. 45 is a flow chart showing the procedure for rightward extension processing (the procedure for the processing in the step 227 shown in FIG. 36), and FIGS. 46A, 46B, and 46C show how an AF area used for detecting the peak of an AF evaluated value is enlarged.

The number of steps hareastep for determining the number of AF areas to be enlarged in the horizontal direction is set to a predetermined variable k (step 291). When the variable k is not less than a horizontal area calculation variable Nx, it is considered that the number of AF areas that can be enlarged reaches a limit.

If the variable k is less than the horizontal area calculation variable Nx (YES in step 272), even the AF area determined by the variable k is enlarged (step 273). If there is a peak in the AF evaluated value obtained from the enlarged AF area (YES in step 274), the rightward extension processing is terminated. If there is no peak in the AF evaluated value obtained from the enlarged AF area (No in step 274), the number of enlarged areas is increased by the number of steps hareastep (step 275), and processing for detecting the peak of the AF evaluated value is performed again.

When the variable k is not less than the horizontal area calculation variable Nx (NO in step 292), it is confirmed whether or not a peak exists in the AF evaluated value obtained from the AF area defined by the horizontal area calculation variable Nx (step 297).

Such rightward extension processing allows the peak to be detected on the basis of the AF evaluated values obtained from the AF areas 252 and 253 enlarged as shown in FIGS. 46B and 46C from the AF area 251 based on the face shown in FIG. 46A.

Although in the above-mentioned embodiment, the number of AF areas to be enlarged is increased one at a time, it goes without saying that it may be increased two or the other number at a time.

Figure 47:
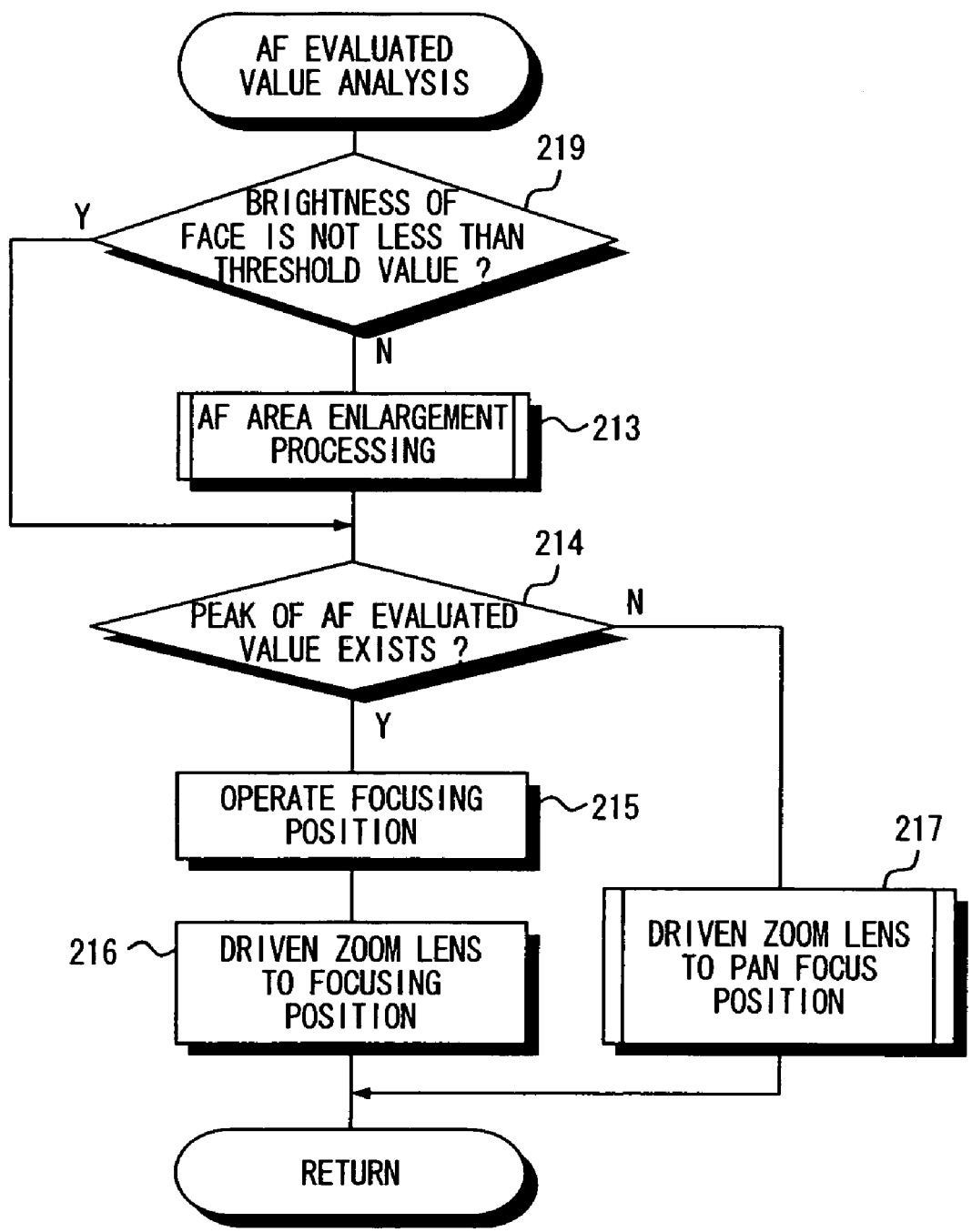
FIG. 47 is a flow chart showing the procedure for AF evaluated value analysis processing.

FIG. 47 is a flow chart showing another example of the procedure for AF evaluated value analysis processing. In FIG. 47, the same processing steps as the processing steps shown in FIG. 35 are assigned the same reference numerals and hence, the description thereof is not repeated.

In the AF evaluated value analysis processing shown in FIG. 35, the processing for enlarging the AF area is performed when there is no peak in the AF evaluated value determined on the basis of the face. On the other hand, in the processing shown in FIG. 47, it is considered that if the brightness of a face (the brightness within an AF area determined on the basis of a face) is not less than a threshold value (NO in step 219), focusing control cannot be carried out using an AF evaluated value obtained on the basis of the AF area determined on the basis of the face because the face is dark (step 213).

A pan focus position (a predetermined focus lock position) can be found in the following manner by calculating the distance to a subject (hereinafter referred to as subject distance).

Figure 48:
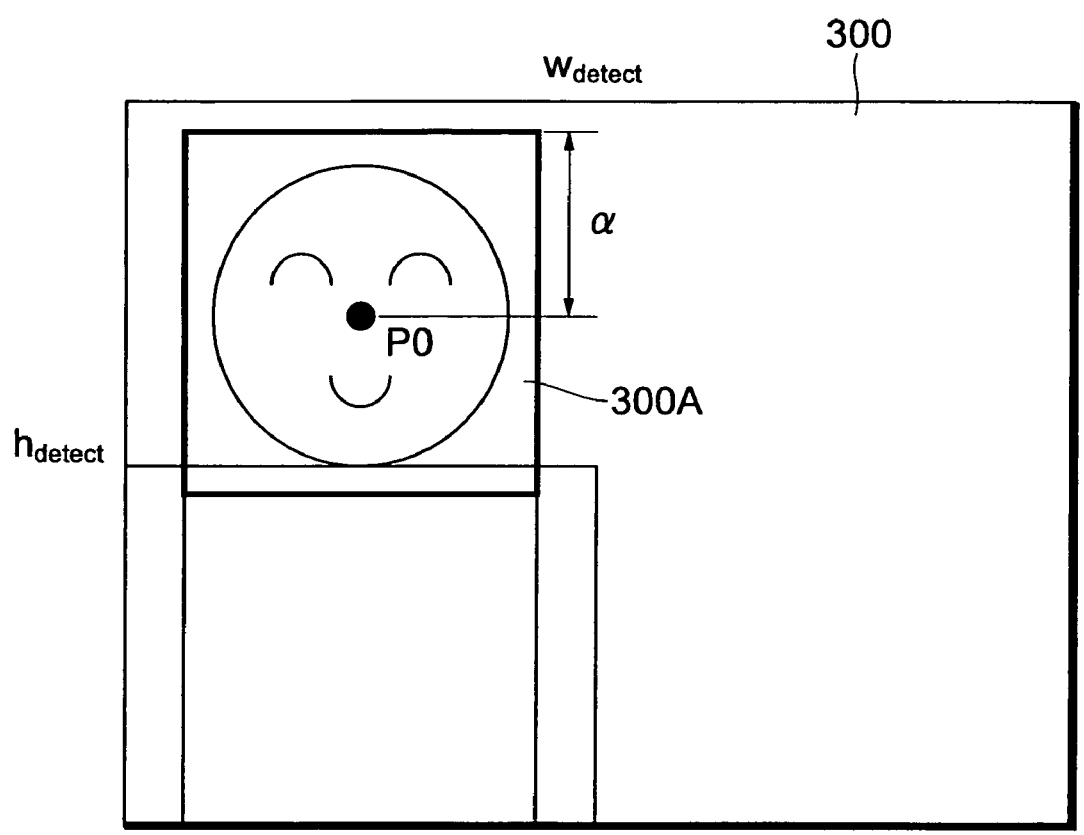
FIG. 48 shows an example of a face detection normalized image.

FIG. 48 shows an example of a face detection normalized image 300.

Let Wdetect and hdetect be respectively the width and the height of the face detection normalized image 300, and let α and PO be respectively the length of the half of one side of and the center of an AF area 300A set in the image 300. Consequently, a subject screen ratio pa is calculated from the equation 1:

$$pa = \text{(length of one side of AF area)/(height of image)} = 2\alpha/h\text{detect} \qquad \text{equation 1}$$

An AF area (an area representing a face) does not necessarily indicate the accurate size of the face. Therefore, the subject screen ratio pa is adjusted, as shown in the following equation 2, using an adjustment factor kp in order to bring the size of the face close to the accurate size. The adjusted subject screen ratio pa is taken as pb.

$$pb = kp \times pa \qquad \text{equation 2}$$

In order to calculate the subject distance, the subject screen ratio must be converted to a focal length obtained by preliminary experiments. In a case where a zoom ratio is changed with the subject distance made constant, the relationship of "focal length" ratio="subject screen ratio" ratio holds. Therefore, a subject screen ratio reference power reduced value pc for conversion to the focal length is found from the following equation 3. Ztest indicates a focal length at the time of preliminary experiments, Z0 indicates a focal length at the time of imaging of a target subject, which can be calculated at a zoom position.

$$pc=pb \times Ztest/Z0 \quad \text{equation 3}$$

In a case where the subject distance is changed with the zoom ratio made constant, the relationship of "subject distance" ratio=reciprocal of "subject screen ratio" ratio="reciprocal of subject screen ratio" ratio holds. Consequently, the reciprocal of a subject distance ILcalc is calculated from the following equation 4. kiIcalc is a distance reciprocal conversion factor.

$$ILcalc=pc \times kiIcalc \quad \text{equation 4}$$

The subject distance Lcalc is expressed by the following equation 5 from the equation 4:

$$Lcalc=1/ILcalc \quad \text{equation 5}$$

Figure 49:
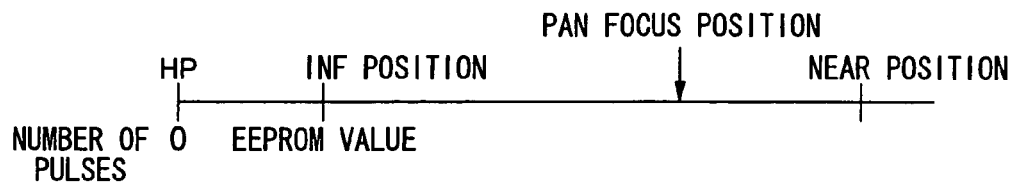
FIG. 49 shows the relationship between the position of a focus lens and the number of pulses.

FIG. 49 shows the relationship between the number of pulses and the pan focus position of a focus lens in the zoom lens.

A position referred to as a home position HP is defined in the focus lens, and the moving distance of the focus lens is determined depending on the number of pulses from a state where the focus lens is at the home position. An INF position is a position of the focus lens that can be focused at the farthest subject distance. The number of pulses to the INF position is set in an EEPROM 4A in consideration of a zoom ratio and an adjusted value. An NEAR position is a position of the focus lens that can be focused at the closest subject distance. The pan focus position where the focus lens is positioned is obtained by adding the number of pulses required to move to the pan focus position from the INF position to the number of pulses required to move to the INF position from the home position HP. The number of pulses required to move to the pan focus position from the INF position can be calculated using data previously stored in an approximate expression and an LUT (Look-up Table).

Figure 50:
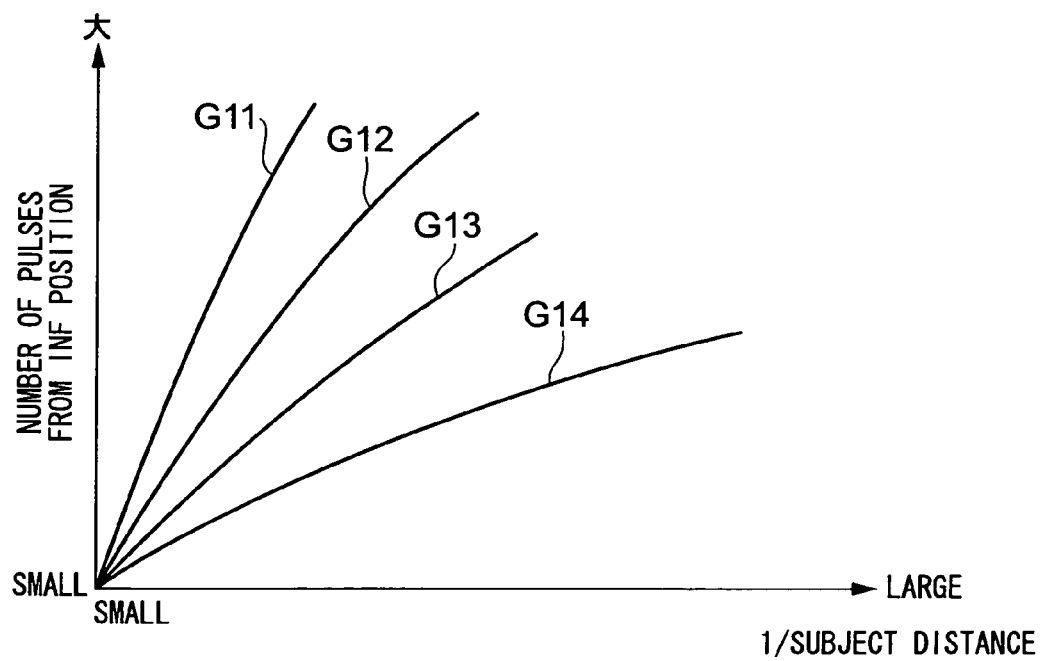
FIG. 50 shows the relationship between the reciprocal of the distance to a subject and the number of pulses from an INF position.

FIG. 50 is a graph showing the relationship between the reciprocal of the subject distance and the number of pulses required to move the focus lens to the pan focus position from the INF position.

The relationship differs depending on a zoom ratio. Therefore, graphs G11 to G14 respectively showing the relationships for zoom ratios are shown. It will be understood that the reciprocal of the subject distance is calculated in the above-mentioned manner, using the graphs G11 to G14 so that the number of pulses is calculated and the focus lens can be put at the pan focus position. A method of deriving the number of pulses from the reciprocal of the subject distance need not be particularly limited. For example, an LUT (Look-Up Table) may be used, or an approximate expression may be used.

Figure 51:
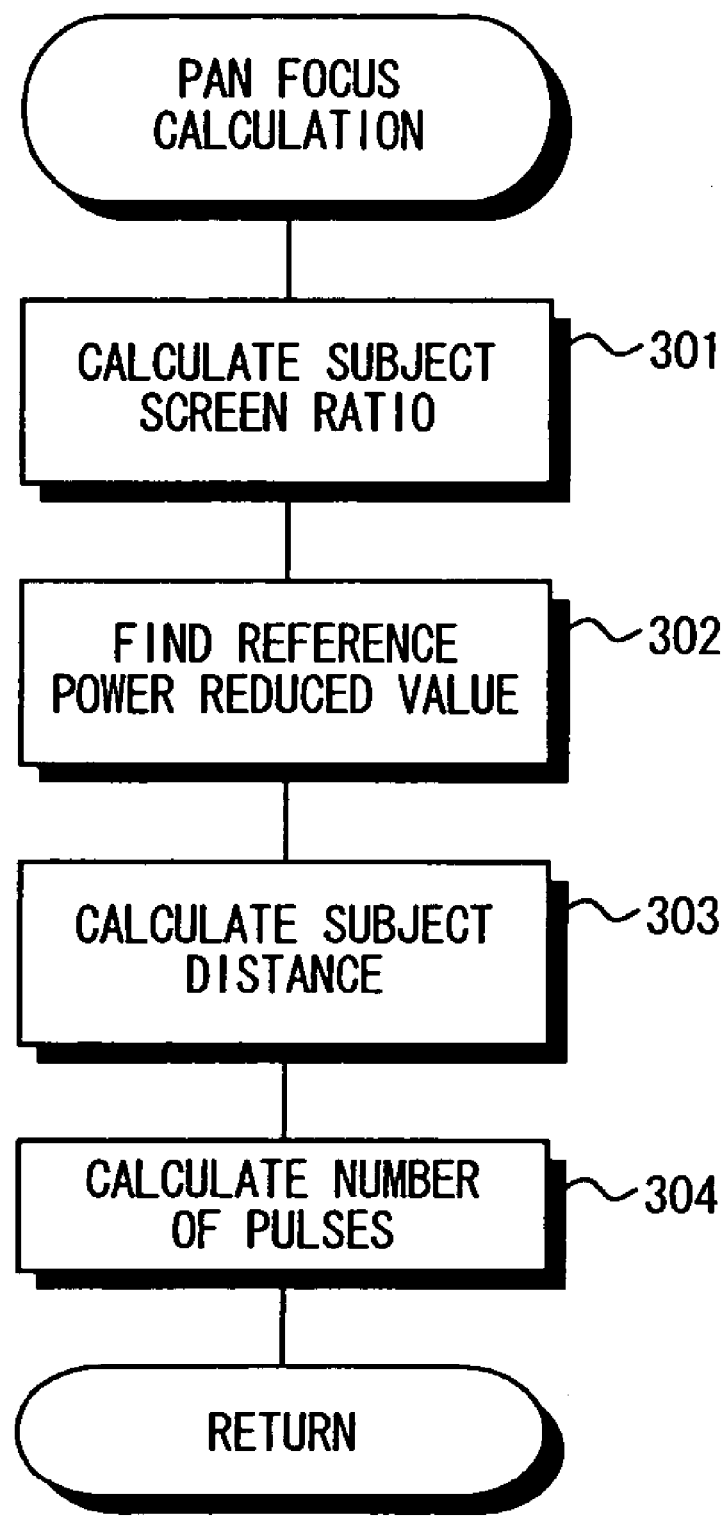
FIG. 51 is a flow chart showing the procedure for pan focus calculation processing.

FIG. 51 is a flow chart showing the procedure for pan focus calculation processing (the procedure for the processing in the step 217 shown in FIG. 35).

A subject screen ratio is first calculated in the above-mentioned manner (step 301), and a reference power reduced value is found (step 302). The subject distance is then calculated in the above-mentioned manner (step 303), and the number of pulses is calculated (step 304). The focus lens will be moved by a distance based on the calculated number of pulses.

In a case where there are a plurality of faces in a subject image, it is possible to calculate the above-mentioned subject screen ratio to the subject image using the plurality of faces to calculate a plurality of distances to a subject, for example. Focusing control can be carried out using any one of the plurality of distances. For example, the face at the closest place, a face at an intermediate place, a face at the farthest place, and so on can be focused. The plurality of faces are assigned priorities for the size, the likeness to the face, the position from the center, the brightness, the inclination, the direction, and so on so that the face assigned the high priority can be focused. Further, focusing control can be also carried out using the distance obtained on the basis of the weighted average of the plurality of distances.

Figure 52:
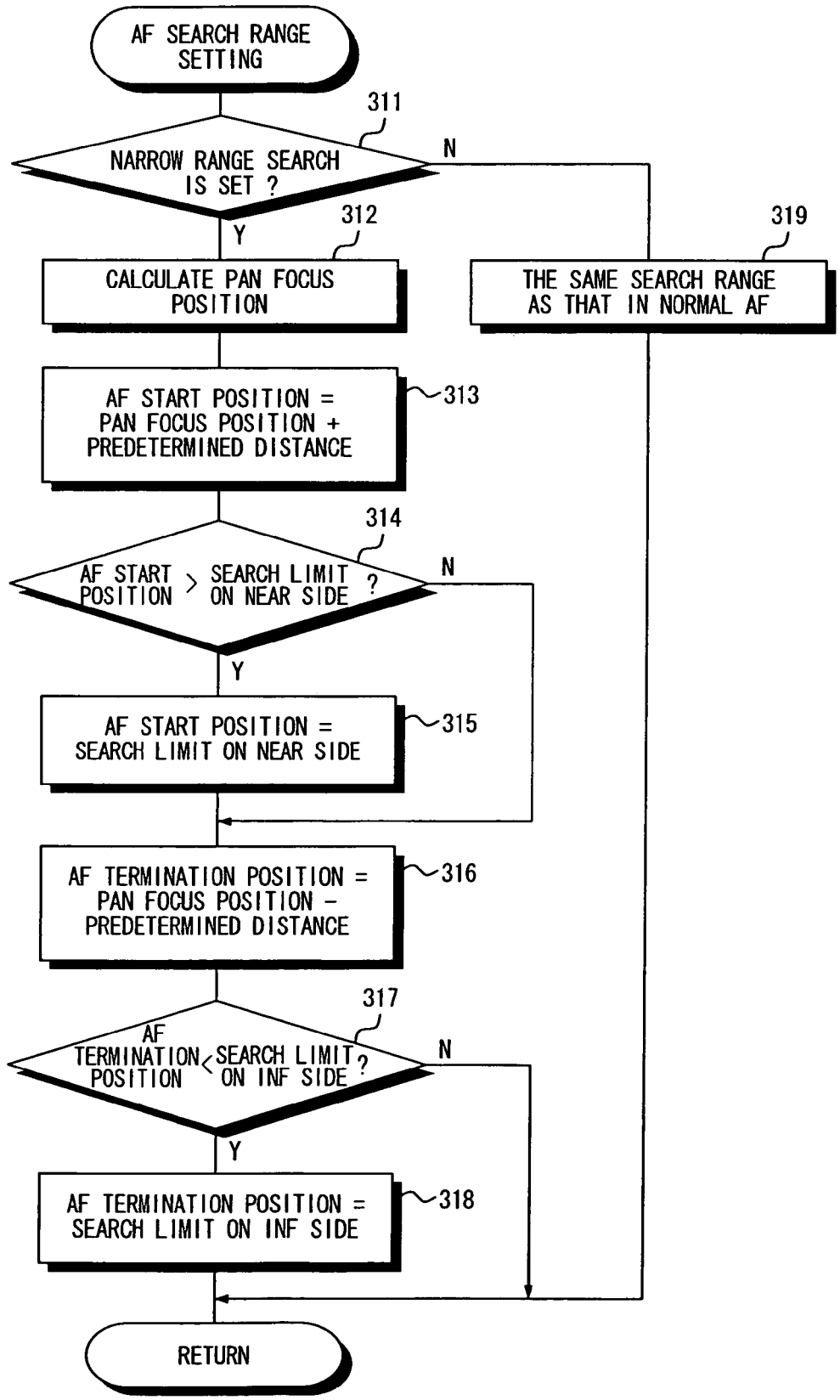
FIGS. 52 and 53 are respectively flow charts showing the procedure for AF search range setting processing.

FIG. 52 is a flow chart showing the procedure for AF search range setting processing (the procedure for the processing in the step 165 shown in FIG. 25). A range ahead of and behind the pan focus position determined in the above-mentioned manner is set as an AF search range. The focus lens is moved within the range to perform extraction of a high-frequency component, calculation of an AF evaluated value, and son on, as described above. Such a search is referred to as a narrow range search.

Unless the narrow range search is set (NO in step 311), the focus lens is moved in a search range used in normal AF (step 319).

When the narrow range search is set (YES in step 311), the pan focus position is calculated in the above-mentioned manner (step 312). An AF start position (a movement start position of the focus lens) is defined to a position obtained by adding a predetermined distance to the pan focus position on the NEAR side (step 313). When the set AF start position exceeds a limit position on the NEAR side (step 313), the AF start position is set to the limit position on the NEAR side (step 315).

An AF termination position (a movement termination position of the focus lens) is defined to a position obtained by adding only a predetermined distance to the pan focus position on the INF side (step 316). When the set AF termination position exceeds a limit position on the INF side (YES in step 317), the AF termination position is set to the limit position on the INF side (step 318).

Since a range in which the focus lens is moved is limited to a range centered at the pan focus position, the AF search is terminated relatively quickly.

Figure 53:
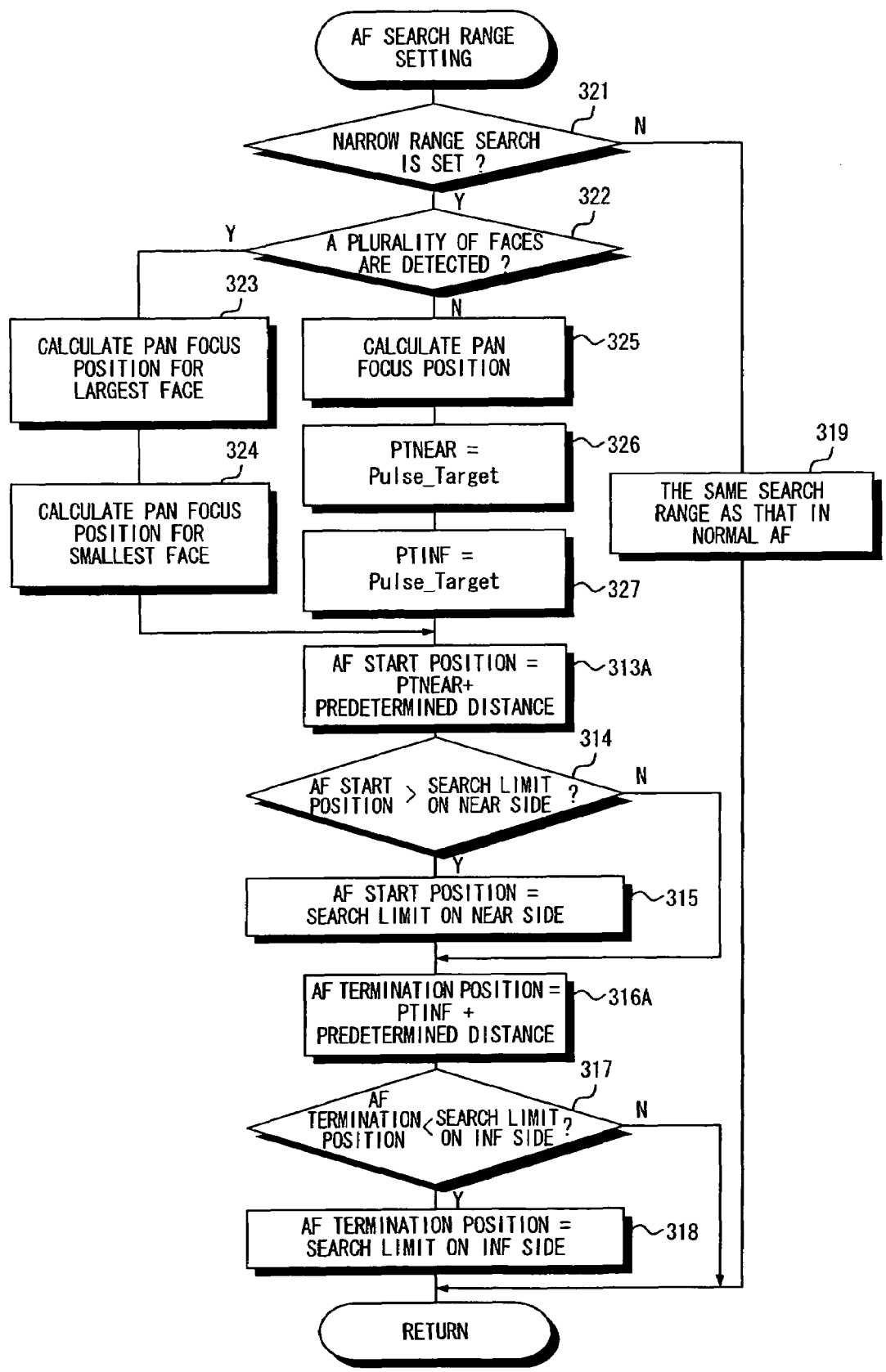

FIG. 53 is a flow chart showing the procedure for another AF search range setting processing. In FIG. 53, the same processing steps as the processing steps shown in FIG. 52 are assigned the same reference numerals and hence, the description thereof is not repeated. This processing indicates a case where a plurality of faces are detected.

In a case where a plurality of faces are detected (YES in step 322), a pan focus position for the largest one of the detected faces is detected (step 323). The detected pan focus position is set to a first variable PTNEAR. Then, a pan focus position for the smallest one of the detected faces is detected (step 324). The detected pan focus position is set to a second variable PTINF.

A position obtained by adding a predetermined distance to the first variable PTNEAR thus set is set to an AF start position (step 313A). A position obtained by subtracting a predetermined distance from the set second variable PTINF is set to an AF termination position (step 316A). The largest face is considered to be positioned on this side. An AF start position on the NEAR side is determined using the face positioned on this side as a reference. The smallest face is considered to be far, and is set to an AF termination position on the INF side using the far face as a reference. A range of the AF search is set in consideration of the largest face and the smallest face.

In a case where a plurality of faces are detected (NO in step 322), a pan focus position is calculated in the above-mentioned manner (step 325), and is set to the first variable PTNEAR and the second variable PTINF (steps 326 and 327). Consequently, an AF start position and an AF termination position are determined, as in FIG. 52 (steps 313A and 316A).

Figure 54:
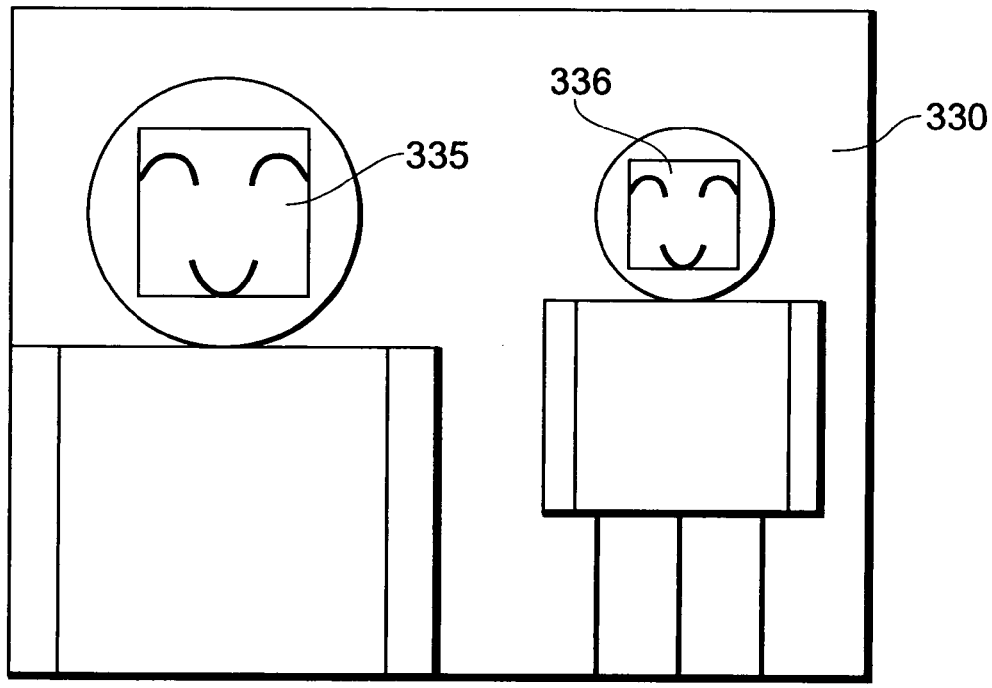
Figure 55:
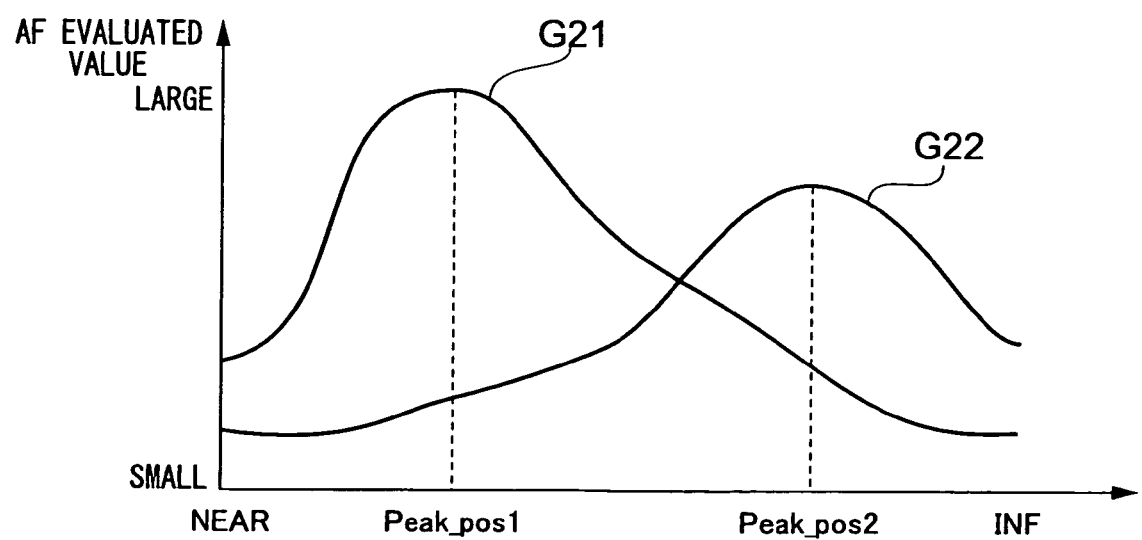
Figure 56:
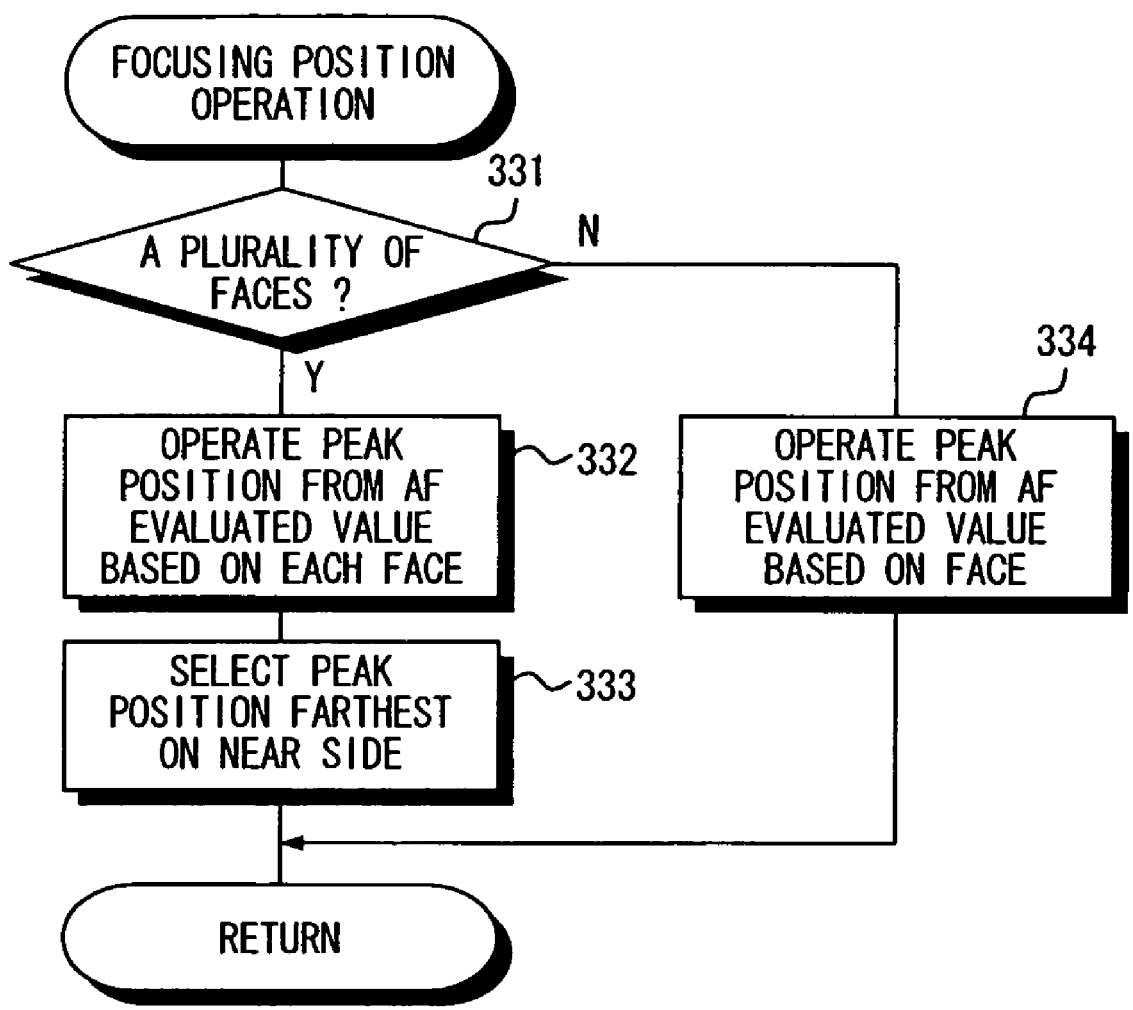

FIGS. 54 to 56 show how a focusing position is detected.

FIG. 54 shows an example of a subject image.

It is assumed that a subject image 330 includes two person images, and face detection processing is performed so that faces 335 and 336 are detected.

FIG. 55 shows the relationship between AF evaluated values respectively obtained from the faces 335 and 336 and a focus lens.

The face 335 is relatively large, and a subject is on this side, so that a peak position Peakpos1 of a graph G21 of an AF evaluated value is positioned relatively on the NEAR side. On the other hand, the face 336 is relatively small, and a subject is far, so that a peak position Peakpos2 of a graph G22 of an AF evaluated value is positioned relatively on the INF side.

In a case where there are thus a plurality of peaks when there are a plurality of faces, the peak position farthest on the NEAR side is selected, and the focus lens is positioned at the peak position.

FIG. 56 is a flow chart showing the procedure for focusing position operation processing (the procedure for the processing in the step 168 shown in FIG. 25).

Unless there are a plurality of faces in a subject image obtained by imaging (NO in step 331), an AF evaluated value based on one of the faces is subjected to peak position operation processing (step 334).

In a case where there are a plurality of faces in the subject image obtained by the imaging (YES in step 331), peak positions are respectively operated from AF evaluated values based on the plurality of faces (step 332). The peak position farthest on the NEAR side out of the obtained peak positions is selected (step 333), and the focus lens is put at the peak position. In a case where there are a plurality of peak positions, the focus lens may be put at a position intermediate thereamong.

In a case where there are a plurality of faces, one or more of the plurality of faces assigned higher priorities for the size, the likeness to the face, the position, the brightness, the inclination, and the direction so that the focus lens can be positioned using data representing an image of the determined face.

Figure 57:
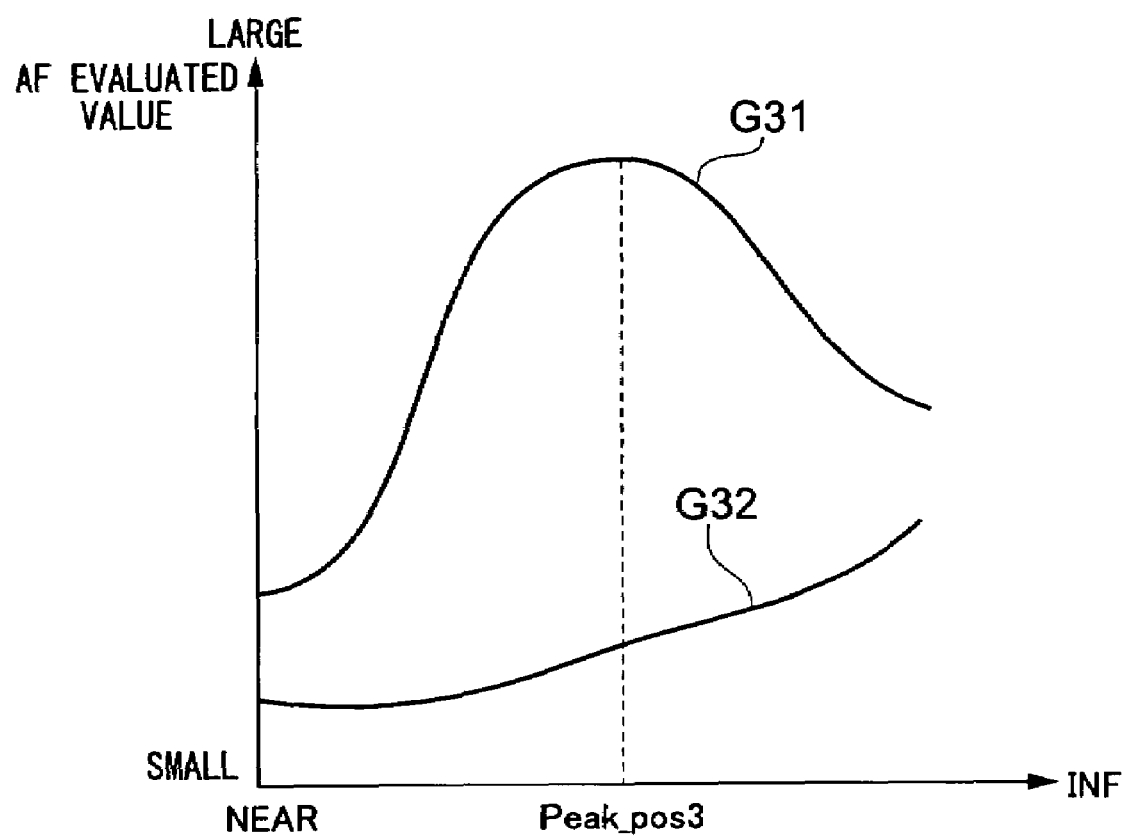
Figure 58:
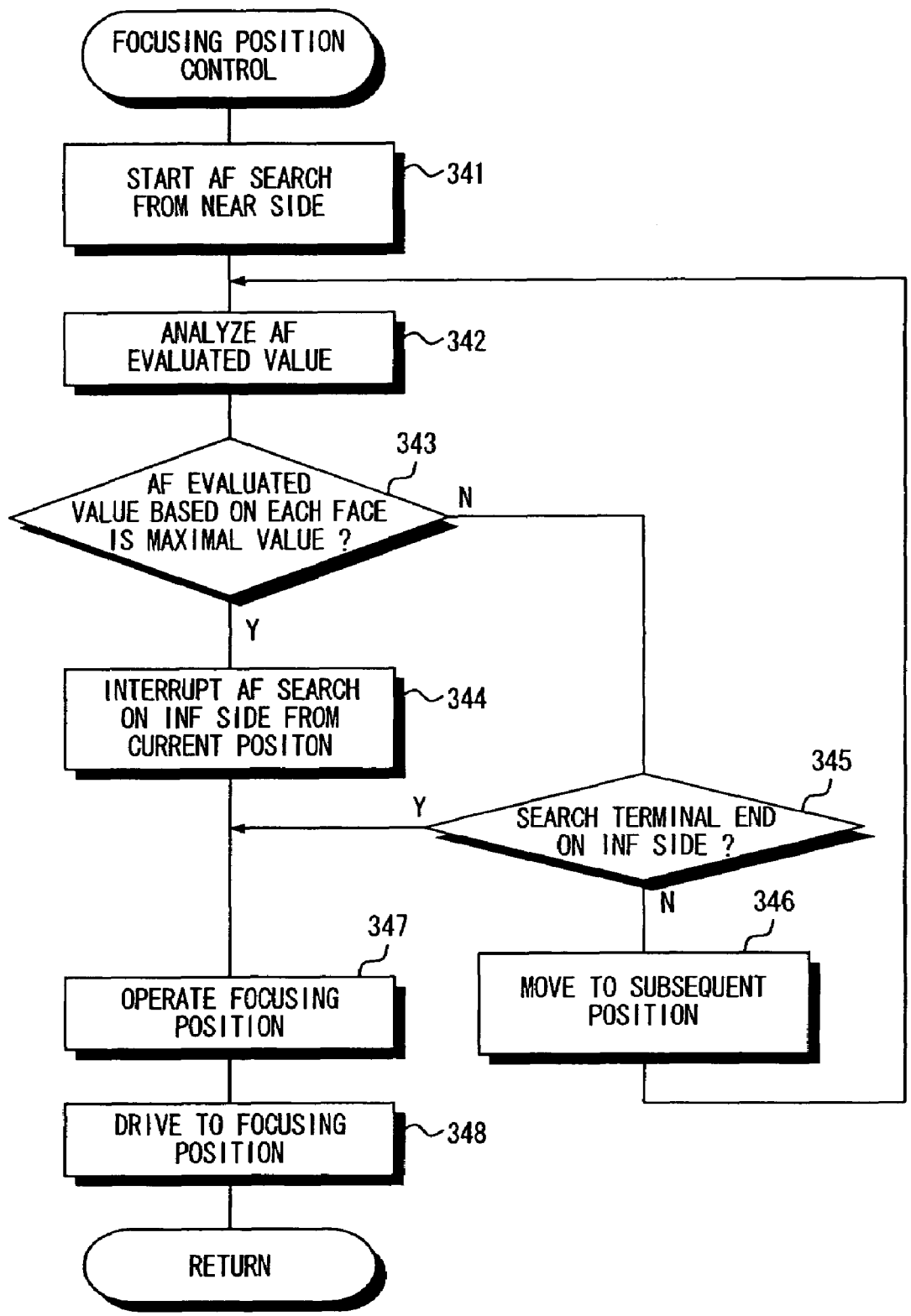

FIGS. 57 and 58 show another example of processing in a case where there are a plurality of faces.

FIG. 57 shows graphs G31 and G32 of AF evaluated values respectively obtained from the two faces, as described above.

A focus lens is moved a predetermined distance at a time from the NEAR side toward the INF side (step 341), and an AF evaluated value is obtained for each movement position. The AF evaluated value is obtained so that the graphs G31 and G32 of the AF evaluated values are gradually generated, as shown in FIG. 57. The obtained AF evaluated value is analyzed to determine whether or not it is a maximal value (steps 342 and 343).

Unless the AF evaluated value is a maximal value (NO in step 343), it is confirmed whether or not the focus lens is at a search terminal end (a limit position) on the INF side (step 345). Unless the focus lens is at the terminal end (NO in step 345), the focus lens is moved to the subsequent position so that the AF evaluated value is calculated and analyzed, for example, again (steps 346, 342, and 343). If the focusing position is the terminal end (YES in step 345), there is no maximal value so that a peak value is not detected. Therefore, a pan focus position is operated as a focusing position, and the focus lens is moved to the position (steps 347 and 348).

When it is judged that the AF evaluated value is a maximal value (YES in step 343), the subsequent AF search is interrupted (step 344). It is judged that a peak position Peakpos3 at which the obtained maximal value is given is a focusing position, and the focusing position is operated (step 347). The focus lens is moved to the operated focusing position.

In a case where it is judged that the AF evaluated value is a maximal value, the subsequent AF search (movement of the focus lens, etc.) is interrupted so that the focusing position is operated. Therefore, the focus lens can be quickly positioned.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An autofocus control apparatus comprising:
   a solid-state electronic imaging device that images a subject and outputs image data representing a subject image formed by an imaging lens that is provided ahead of a light receiving surface of the solid-state electronic imaging device and is movable along its optical axis;
   a first control device that controls said solid-state electronic imaging device so as to image the subject while the imaging lens is being moved within a focusing range, in response to a pre-imaging command and output pre-image data representing the subject image;
   a pre-focusing evaluated value calculating device that calculates a pre-focusing evaluated value from the pre-image data outputted from the solid-state electronic imaging device at every position during movement of the imaging lens;
   an object image detection device that detects an image portion including the whole or a part of an object in a pre-image represented by the pre-image data outputted from said solid-state electronic imaging device;
   an object image pre-focusing evaluated value calculating device that images the subject while the imaging lens is being moved in a range, which range is a range the imaging lens is moved when the object image was detected by said object image detection device and the pre-focusing evaluated value calculated by said pre-focusing evaluated value calculating device is more than a threshold value, and calculates a focusing evaluated value of an object image portion detected by said object image detection device from the image data representing the image subject at every position of the imaging lens; and
   a position control device that controls the position of said imaging lens so as to move to a focusing position on the basis of the object image focusing evaluated value calculated by said object image focusing evaluated value calculating device.

2. The autofocus control apparatus according to claim 1, further comprising
   a recording control device that records on a recording medium the image data outputted from said solid-state electronic imaging device by positioning said imaging lens using said position control device and formally imaging the subject image in response to a formal imaging command.

3. The autofocus control apparatus according to claim 1, further comprising
an AF object area determination device that determines one or a plurality of AF object areas each including the whole or a part of the object area detected by said object image detection device and being of the same or different sizes, and
a weighting factor determination device that determines a weighting factor, which increases toward said object area, in the one or plurality of AF object areas determined by said AF object area determination device,
said position control device controlling the position of said imaging lens so as to adjust the level of data corresponding to each of the one or plurality of AF object areas in response to the weighting factor determined by the weighting factor determination device and move to the focusing position on the basis of the adjusted data.

4. The autofocus control apparatus according to claim 3, wherein
said weighting factor determination device is determined on the basis of at least one of the likeness to the object, the size of the object, the brightness of the object, and the position of the object.

5. The autofocus control apparatus according to claim 1, further comprising
an imaging mode setting device, and
a third control device that controls said solid-state electronic imaging device so as to image the subject in a predetermined period depending on the setting of the imaging mode by said imaging mode setting device and output through image data representing the subject image in a predetermined period.

6. The autofocus control apparatus according to claim 5, further comprising
a focusing range determination device that determines a focusing range in which said imaging lens moves under the control of said position control device on the basis of the through image data outputted from said solid-state electronic imaging device under the control of said third control device.

7. The autofocus control apparatus according to claim 5, wherein
said position control device is so adapted that said imaging lens moves within a focusing range determined on the basis of the position of said imaging lens in a case where the through image data is outputted from said solid-state electronic imaging device under the control of said third position control device.

8. The autofocus control apparatus according to claim 5, wherein
said position control device is so adapted that said imaging lens moves to a focusing search starting point determined on the basis of the position of said imaging lens in a case where the through image data is outputted from said solid-state electronic imaging device under the control of said third position control device.

9. The autofocus control apparatus according to claim 1, wherein
said position control device moves said imaging lens within a predetermined focusing range.

10. The autofocus control apparatus according to claim 9, further comprising a manual focus dial that positions said imaging lens,
said focusing range being determined on the basis of said manual focus dial.

11. The autofocus control apparatus according to claim 9, wherein
said imaging lens is a zoom lens,
said focusing range being determined on the basis of a focusing position corresponding to the position of said zoom lens.

12. The autofocus control apparatus according to claim 1, wherein
the object area detected by said object image detection device is detected on the basis of at least one to the likeness to the object, the size of the object, the brightness of the object, and the position of the object.

13. The autofocus control apparatus according to claim 1, further comprising
a display device that displays the subject image represented by the image data outputted from said solid-state electronic imaging device, and
a display control device that controls said display device such that the object area detected by said object image detection device is clearly shown on the subject image displayed on said display device.

14. The autofocus control apparatus according to claim 1, wherein
an image of said object is an image of a face or eyes.

15. The autofocus control apparatus according to claim 1, wherein
said object image detection device comprises
an AE control device that carries out AB control on the basis of luminance data obtained from the image data outputted from said solid-state electronic imaging device under the control of said first control device, said object area being detected on the basis of said luminance data.

16. The autofocus control apparatus according to claim 1, further comprising
an exposure amount calculation device that calculates the amount of exposure of said solid-state electronic imaging device on the basis of the data corresponding to the object area detected by an object area detection device, and
a fourth control device that controls said solid-state electronic imaging device so as to control exposure such that the amount of exposure of said solid-state electronic imaging device becomes the amount of exposure calculated by said exposure amount calculation device and image the subject to output the image data representing the subject image,
said position control device controlling the position of said imaging lens so as to move to the focusing position on the basis of the data corresponding to the object area detected by said object area detection device in the image data outputted from said solid-state electronic imaging device under the control of said fourth control device.

17. The autofocus control apparatus according to claim 16, further comprising
an AF object area determination device that determines an AF object area on the basis of the object area detected by said object area detection device,
said exposure amount calculation device calculating the amount of exposure of said solid-state electronic imaging device on the basis of data corresponding to the AF object area determined by said AF object area determination device.

18. The autofocus control apparatus according to claim 17, wherein
said AF object area determination device determines said AF object area such that said AF object area is within said object area.

19. The autofocus control apparatus according to claim 17, wherein
said AF object area determination device determines said AF object area on the basis of said object area assigned a high priority in a case where a plurality of object areas are detected by said object area detection device.

20. The autofocus control apparatus according to claim 19, wherein
said priority depends on at least one of the size of the object, the likeness to the object, and the position, the brightness, the inclination, and the direction of the object.

21. The autofocus control apparatus according to claim 17, wherein
said AF object area determination device determines, when the plurality of object areas are detected by said object area detection device, said AF object area on the basis of the weighted average of the brightnesses of a plurality of object image portions.

22. The autofocus control apparatus according to claim 21, wherein
said weighted average is taken using at least one of the size of the object, the likeness to the object, and the position, the brightness, the inclination, and the direction of said object.

23. The autofocus control apparatus according to claim 16, further comprising
an exposure amount correction device that corrects the amount of exposure calculated by said exposure amount calculation device such that the difference between the amount of exposure at the time of said formal imaging and the amount of exposure in a case where the subject is imaged before said formal imaging is within a predetermined range.

24. The auto focus control apparatus according to claim 1, further comprising
an AF object area determination device that determines an AF object area on the basis of the object area detected by said object area detection device,
said position control device controlling the position of said imaging lens so as to move to the focusing position on the basis of data corresponding to the AF object area determined by said AF object area determination device.

25. The autofocus control apparatus according to claim 24, wherein
said AF object area determination device determines said AF object area on the basis of at least one of the inclination and the direction of said object.

26. The autofocus control apparatus according to claim 24, wherein
a range that can be covered by said AF object area determined by said AF object area determination device is previously determined on the basis of said object image portions.

27. The autofocus control apparatus according to claim 1, further comprising
a digital filter whose filter characteristics can be changed and that passes a desired frequency band component of the data corresponding to the object area detected by said object area detection device, and
a filter control device that controls said digital filter such that said filter characteristics are changed on the basis of the size of the object area detected by said object area detection device,
said position control device controlling the position of said imaging lens so as to move to the focusing position on the basis of the desired frequency band component of the data, which has been passed through said digital filter, corresponding to said object area.

28. The autofocus control apparatus according to claim 27, wherein
said filter control device controls said digital filter so as to have such filter characteristics that the desired frequency band that passes through the digital filter in a case where the size of the object area detected by said object area detection device is small is higher than that in a case where it is large.

29. The autofocus control apparatus according to claim 1, wherein said object is a face, and further comprising
a body area detection device that detects a body area of said face on the basis of the object area detected by said object area detection device, and
an AF object area determination device that determines an AF object area on the basis of the object area detected by said object area detection device and the area of the body portion detected by said body area detection device,
said position control device controlling the position of said imaging lens so as to move to the focusing position on the basis of the data corresponding to the AF object area determined by said AF object area determination device.

30. The autofocus control apparatus according to claim 1, wherein said object is a face, and further comprising
a body area detection device that detects a body area of said face on the basis of the object area detected by said object area detection device, and
a digital filter that passes a desired frequency band component of the data corresponding to the object area detected by said object area detection device and a desired frequency band component of data corresponding to the body area detected by said body area detection device,
said position control device carrying out said focusing position control on the basis of the desired frequency band component corresponding to said object area or the desired frequency band components corresponding to both said object area and said body area.

31. The autofocus control apparatus according to claim 1, wherein said object is a face, and further comprising
a body area detection device that detects a body area of said face on the basis of the object area detected by said object area detection device,
a digital filter that previously passes a desired frequency band component of the data corresponding to the object area detected by said object area detection device and a desired frequency band component of data corresponding to the body area detected by said body area detection device, and
a focusing position control judgment device that judges whether or not focusing position control of said imaging lens can be carried out on the basis of the desired frequency band component corresponding to the object area that has been passed by said digital filter,
said position control device carrying out the focusing position control on the basis of the desired frequency band component corresponding to said object area depending on the judgment that the focusing position control can be carried out by said focusing position control judgment device and carrying out said focusing position control on the basis of the desired frequency band component corresponding to said body area that has been previously passed depending on the judgment that the focusing position control cannot be carried out by said position control judgment device.

32. The autofocus control apparatus according to claim 1, wherein said object is a face, and further comprising a body area detection device that detects a body area of said face on the basis of the object area detected by said object area detection device, a digital filter that passes a desired frequency band component of the data corresponding to the object area detected by said object area detection device and a desired frequency band component of data corresponding to the body area detected by said body area detection device, and a brightness judgment device that judges whether or not the brightness of said subject image or the object area detected by said object area detection device is not more than a predetermined value, said position control device carrying out said focusing control on the basis of the desired frequency band component corresponding to the object area and the desired frequency band component corresponding to the body area, which have been passed through said digital filter, depending on the judgment that the brightness is not more than the predetermined value by said brightness judgment device.

33. The autofocus control apparatus according to claim 1, further comprising a storage device that previously stores the relationship among the ratio of the subject image in a case where the subject is imaged to the object included in the subject image, the focal length of the lens in a case where the subject is imaged, and the distance to the subject, a first ratio calculation device that calculates a first ratio of the object area detected by said object area detection device to the subject image, and a distance calculation device that calculates the distance to the subject on the basis of the first ratio calculated by the first ratio calculation device, the focal length of said lens in a case where said first ratio is calculated by said first ratio calculation device, and said ratio, said focal length, and the distance to said subject that are stored in said storage device.

34. The autofocus control apparatus according to claim 33, further comprising a movement range determination device that determines the movement range of said imaging lens by said position control device on the basis of the distance to the subject that is calculated by said distance calculation device.

35. The autofocus control apparatus according to claim 34, wherein said first ratio calculation device calculates, when a plurality of object areas are detected by said object area detection device, said two first ratios using the object area of the largest size and the object area of the smallest size, said distance calculation device calculates two distances to the subject on the basis of said two first ratios, and said movement range determination device determines the movement range of said imaging lens on the basis of the two distances to said subject.

36. The autofocus control apparatus according to claim 33, wherein said position control device controls the position of said imaging lens so as to move to the focusing position on the basis of the distance calculated by said distance calculation device.

37. The autofocus control apparatus according to claim 33, wherein said first ratio calculation device calculates, when a plurality of object areas are detected by said object area detection device, said one or plurality of first ratios using said one or plurality of object areas each assigned a high priority, said distance calculation device calculates said one or plurality of distances to the subject on the basis of said one or plurality of first ratios, and said position control device controls the position of said imaging lens so as to move to the focusing position on the basis of said one or plurality of distances.

38. The autofocus control apparatus according to claim 37, wherein said priority depends on at least one of the size of the object, the likeness to the object, and the position, the brightness, the inclination, and the direction of the object.

39. The autofocus control apparatus according to claim 37, wherein said position control device controls the position of said imaging lens on the basis of a value obtained by the weighted average of said plurality of distances.

40. The autofocus control apparatus according to claim 1, further comprising an area definition device that defines, when the size of an AF image for obtaining data corresponding to said object area used for the position control of the imaging lens in said position control device and the size of the subject image used for the detection processing in said object detection device differ from each other, an area corresponding to the object area detected by said object area detection device on said AF image, said position control device controlling the position of said imaging lens so as to move to the focusing position on the basis of data corresponding to the area defined by said area definition device.

41. The autofocus control apparatus according to claim 1, wherein said position control device controls, when a plurality of object areas are detected by said object area detection device, the position of said imaging lens so as to move to the focusing position on the basis of data corresponding to said one or plurality of object areas each assigned a high priority.

42. The autofocus control apparatus according to claim 41, wherein said priority depends on at least one of the size of the object, the likeness to the object, and the position, the brightness, the inclination, and the direction of the object.

43. The autofocus control apparatus according to 1, further comprising an exposure control device that controls, when a plurality of object areas are detected by said object area detection device, the amount of exposure of said solid-state electronic imaging device on the basis of data corresponding to any one or more of the plurality of object areas, said position control device positioning said imaging lens so as to move to the focusing position on the basis of the data corresponding to the object area used for the exposure control in said exposure control device.

44. The autofocus control apparatus according to claim 16, wherein said exposure amount calculation device calculates, when a plurality of object areas are detected by said object area detection device, the amount of exposure of said solid-state electronic imaging device on the basis of data corresponding to any one or more of the plurality of the object areas.

45. The autofocus control apparatus according to claim 1, wherein
said position control device controls, when a plurality of object areas are detected by said object area detection device, the position of said imaging lens so as to move to the focusing position on the basis of data corresponding to the plurality of object areas.

46. The autofocus control apparatus according to claim 45, wherein
said position control device puts said imaging lens at the farthest position on the NEAR side out of the positions of said imaging lens that are determined on the basis of the data corresponding to the plurality of object areas.

47. The autofocus control apparatus according to claim 1, wherein
said position control device moves said imaging lens a predetermined distance at a time toward the INF side from the NEAR side, detects the level of a desired frequency band component of the data corresponding to said object area obtained by imaging the subject for each movement position, and puts said imaging lens at a position where the maximal value is first given.

48. The autofocus control apparatus according to claim 45, wherein
said position control device puts said imaging lens at a position intermediate between the farthest position on the NEAR side and the farthest position on the INF side out of the positions of said imaging lens that are determined on the basis of the data corresponding to the plurality of object areas.

49. A method of controlling an autofocus control apparatus, comprising the steps of:
imaging a subject using a solid-state electronic imaging device in response to an imaging command, to obtain image data representing a subject image formed by an imaging lens that is provided ahead of a light receiving surface of said solid-state electronic imaging device and is movable along its optical axis to output pre-image data representing the subject image;
calculating a pre-focusing evaluated value from the pre-image data outputted from said solid-state electronic imaging device at every position during movement of the imaging lens;
detecting an image portion including the whole or a part of an object in a pre-image represented by the pre-image data outputted from said solid-state electronic imaging device;
imaging the subject while the imaging lens is being moved within a focusing range, which range is a range the imaging lens is moved when the object image was detected by an object image detection device and the pre-focusing evaluated value calculated by a pre-focusing evaluated value calculating device is more than a threshold value, and calculates a focusing evaluated value of the object image portion detected by said object image detection device from the image data representing the image subject at every position of the imaging lens; and
controlling the position of said imaging lens so as to move to a focusing position on the basis of the object image focusing evaluated value calculated by an object image focusing evaluated value calculating device.

* * * * *